US009841968B1

(12) United States Patent
Riedl

(10) Patent No.: US 9,841,968 B1
(45) Date of Patent: *Dec. 12, 2017

(54) INTEGRATED DEVELOPMENT TOOL WITH PREVIEW FUNCTIONALITY FOR AN INTERNET OF THINGS (IOT) SYSTEM

(71) Applicant: AFERO, INC., Los Altos, CA (US)

(72) Inventor: Erhard Riedl, San Jose, CA (US)

(73) Assignee: AFERO, INC., Los Altos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/172,459

(22) Filed: Jun. 3, 2016

(51) Int. Cl.
*G06F 9/44* (2006.01)
*G06F 9/445* (2006.01)
*H04L 29/08* (2006.01)
*G06F 3/0484* (2013.01)

(52) U.S. Cl.
CPC .............. *G06F 8/65* (2013.01); *G06F 3/0484* (2013.01); *H04L 67/34* (2013.01)

(58) Field of Classification Search
CPC . G06F 8/65; G06F 8/61; G06F 3/0484; H04L 67/34; H04L 29/08981
USPC .................................................. 717/172, 111
See application file for complete search history.

(56) References Cited

U.S. PATENT DOCUMENTS

| 8,340,633 | B1 * | 12/2012 | Rege ...................... H04W 4/26 455/405 |
| 8,380,359 | B2 | 2/2013 | Duchene et al. |
| 2011/0161478 | A1 | 6/2011 | Formo et al. |
| 2014/0108943 | A1 | 4/2014 | Lee et al. |
| 2015/0019342 | A1 | 1/2015 | Gupta |
| 2015/0019553 | A1 | 1/2015 | Shaashua et al. |
| 2015/0195365 | A1 | 7/2015 | Choi et al. |
| 2015/0295897 | A1 | 10/2015 | Chang et al. |
| 2015/0370615 | A1 | 12/2015 | Pi-Sunyer et al. |
| 2016/0072873 | A1 * | 3/2016 | Hu ........................ H04L 67/025 715/740 |
| 2016/0073059 | A1 * | 3/2016 | Bader-Natal ............. H04N 7/15 348/14.03 |
| 2016/0147402 | A1 | 5/2016 | Muench |
| 2016/0149767 | A1 | 5/2016 | Britt et al. |

(Continued)

OTHER PUBLICATIONS

International Search Report and Written Opinion for Application No. PCT/US2017/034734, dated Aug. 24, 2017, 14 pages.

*Primary Examiner* — Anna Deng
(74) *Attorney, Agent, or Firm* — Nicholson De Vos Webster & Elliott LLP

(57) ABSTRACT

A system and method are described for generating an interactive preview for an IoT device. For example, one embodiment of a system comprises: an Internet of Things (IoT) development application comprising a graphical user interface (GUI) through which a user is to specify a configuration for a new IoT device, the development application including a preview GUI component to allow a user to render a mobile UI preview on a mobile client; an IoT service including virtual device generation logic to generate a virtual device responsive to the configuration specified for the new IoT device, the virtual device comprising a virtualized representation of the new IoT device; and the virtual device to establish a communication channel with a mobile app executed on a client, the virtual device to dynamically communicate updates to the mobile app as the user makes changes to IoT device attributes and/or presentation definitions from the preview GUI.

18 Claims, 47 Drawing Sheets

(56) References Cited

U.S. PATENT DOCUMENTS

2016/0246787 A1* 8/2016 Zhang .............. G06F 17/3028
2017/0005820 A1 1/2017 Zimmerman et al.

* cited by examiner

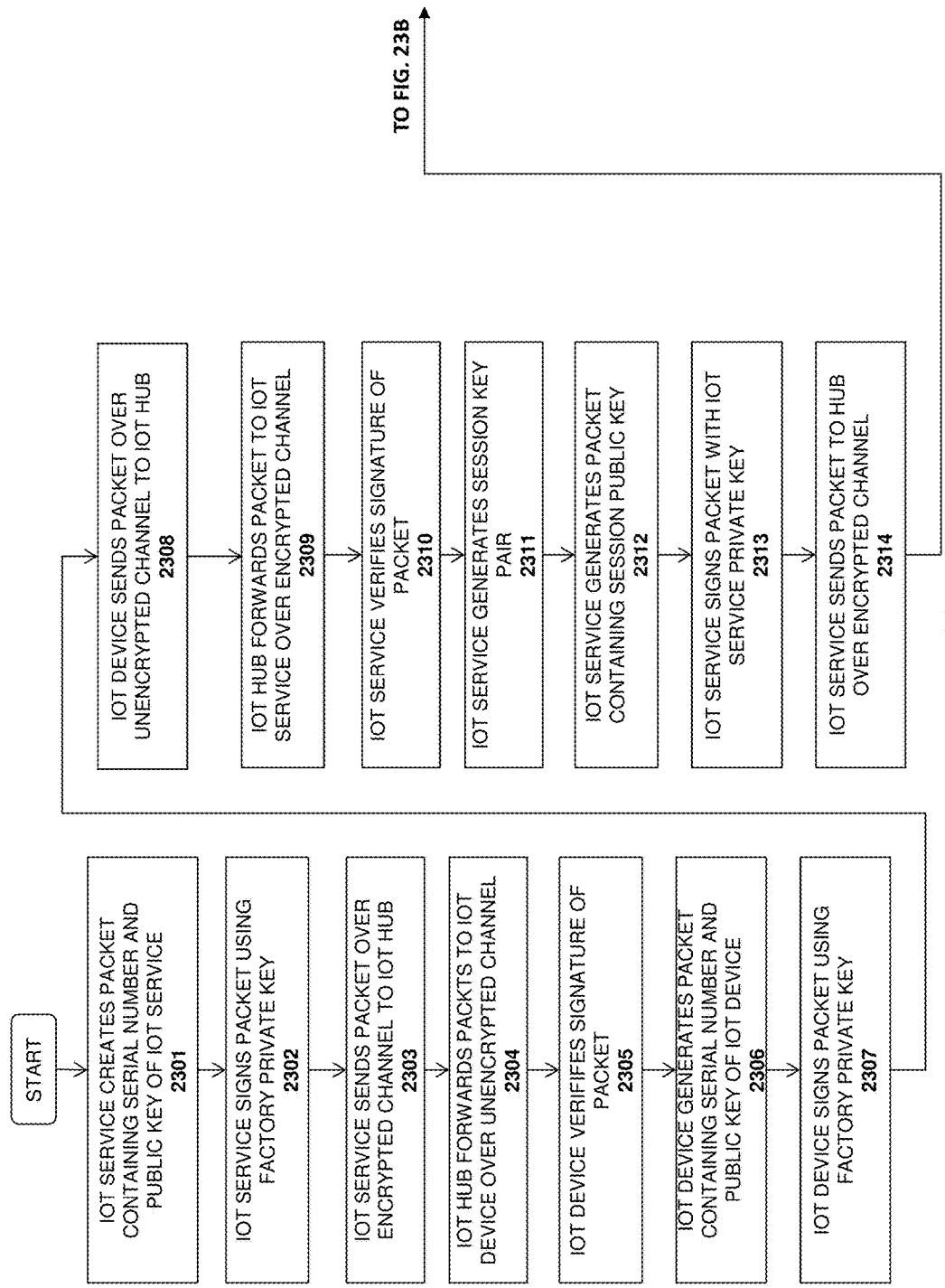

INTEGRATED DEVELOPMENT TOOL WITH PREVIEW FUNCTIONALITY FOR AN INTERNET OF THINGS (IOT) SYSTEM

BACKGROUND

Field of the Invention

This invention relates generally to the field of computer systems. More particularly, the invention relates to an integrated development tool with preview functionality for an Internet of Things (IoT) system.

Description of the Related Art

The "Internet of Things" refers to the interconnection of uniquely-identifiable embedded devices within the Internet infrastructure. Ultimately, IoT is expected to result in new, wide-ranging types of applications in which virtually any type of physical thing may provide information about itself or its surroundings and/or may be controlled remotely via client devices over the Internet.

IoT development and adoption has been slow due to issues related to connectivity, power, and a lack of standardization. For example, one obstacle to IoT development and adoption is that no standard platform exists to allow developers to design and offer new IoT devices and services. In order enter into the IoT market, a developer must design the entire IoT platform from the ground up, including the network protocols and infrastructure, hardware, software and services required to support the desired IoT implementation. As a result, each provider of IoT devices uses proprietary techniques for designing and connecting the IoT devices, making the adoption of multiple types of IoT devices burdensome for end users. Moreover, developers are expected to generate one set of program code for the IoT device, another set of program code for an IoT service, and yet another set of program code for a client-based user interface, resulting in significant inefficiencies.

BRIEF DESCRIPTION OF THE DRAWINGS

A better understanding of the present invention can be obtained from the following detailed description in conjunction with the following drawings, in which:

FIGS. 23A-C illustrate a method for secure pairing in accordance with one embodiment of the invention;

DETAILED DESCRIPTION

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

One embodiment of the invention comprises an Internet of Things (IoT) platform which may be utilized by developers to design and build new IoT devices and applications. In particular, one embodiment includes a base hardware/software platform for IoT devices including a predefined networking protocol stack and an IoT hub through which the IoT devices are coupled to the Internet. In addition, one embodiment includes an IoT service through which the IoT hubs and connected IoT devices may be accessed and managed as described below. In addition, one embodiment of the IoT platform includes an IoT app or Web application (e.g., executed on a client device) to access and configured the IoT service, hub and connected devices. Existing online retailers and other Website operators may leverage the IoT platform described herein to readily provide unique IoT functionality to existing user bases.

Figure 1A:
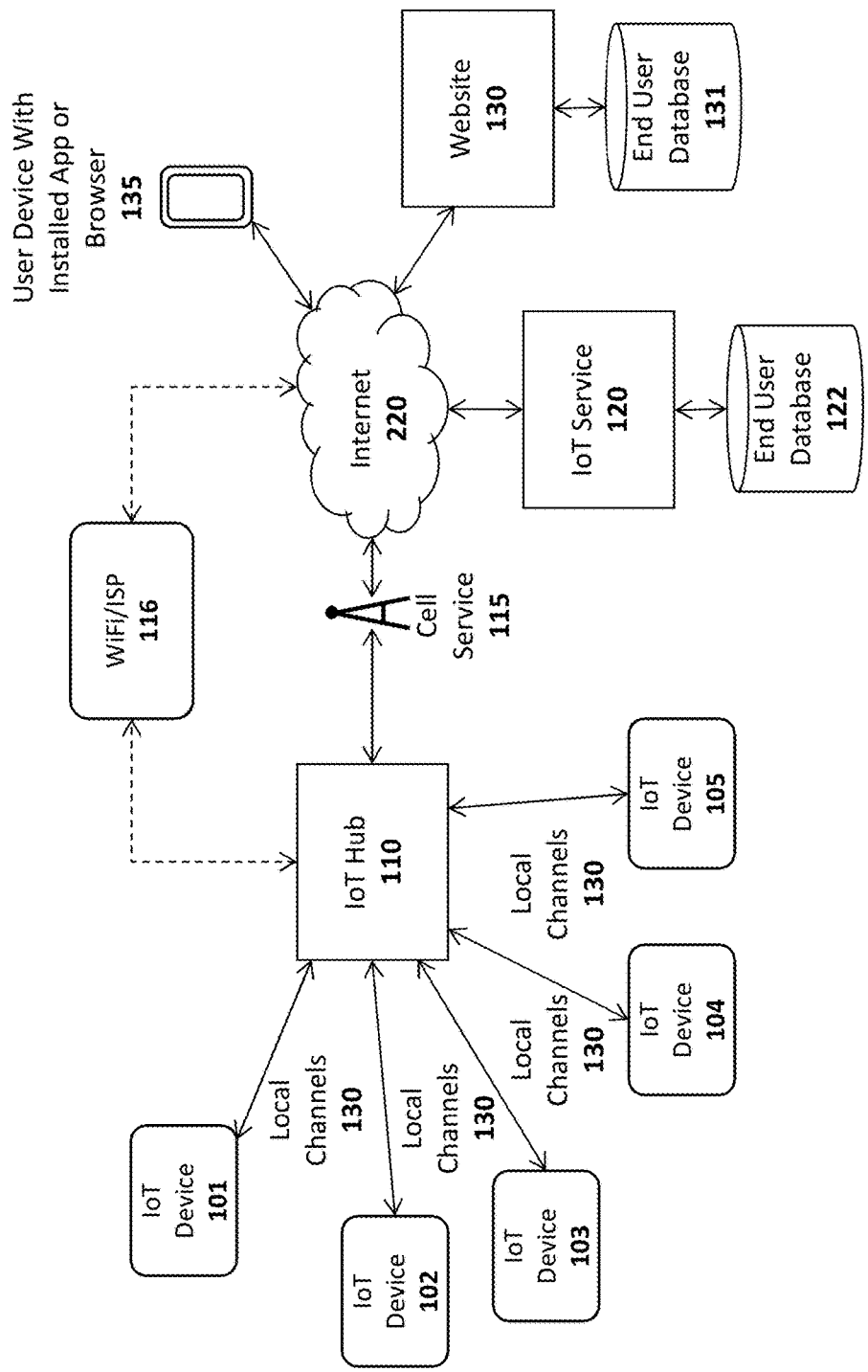
FIGS. 1A-B illustrates different embodiments of an IoT system architecture.

FIG. 1A illustrates an overview of an architectural platform on which embodiments of the invention may be implemented. In particular, the illustrated embodiment includes a plurality of IoT devices 101-105 communicatively coupled over local communication channels 130 to a central IoT hub 110 which is itself communicatively coupled to an IoT service 120 over the Internet 220. Each of the IoT devices 101-105 may initially be paired to the IoT hub 110 (e.g., using the pairing techniques described below) in order to enable each of the local communication channels 130. In one embodiment, the IoT service 120 includes an end user database 122 for maintaining user account information and data collected from each user's IoT devices. For example, if the IoT devices include sensors (e.g., temperature sensors, accelerometers, heat sensors, motion detectors, etc), the database 122 may be continually updated to store the data collected by the IoT devices 101-105. The data stored in the database 122 may then be made accessible to the end user via the IoT app or browser installed on the user's device 135 (or via a desktop or other client computer system) and to web clients (e.g., such as websites 130 subscribing to the IoT service 120).

The IoT devices 101-105 may be equipped with various types of sensors to collect information about themselves and their surroundings and provide the collected information to the IoT service 120, user devices 135 and/or external Websites 130 via the IoT hub 110. Some of the IoT devices 101-105 may perform a specified function in response to control commands sent through the IoT hub 110. Various specific examples of information collected by the IoT devices 101-105 and control commands are provided below. In one embodiment described below, the IoT device 101 is a user input device designed to record user selections and send the user selections to the IoT service 120 and/or Website.

In one embodiment, the IoT hub 110 includes a cellular radio to establish a connection to the Internet 220 via a cellular service 115 such as a 4G (e.g., Mobile WiMAX, LTE) or 5G cellular data service. Alternatively, or in addition, the IoT hub 110 may include a WiFi radio to establish a WiFi connection through a WiFi access point or router 116 which couples the IoT hub 110 to the Internet (e.g., via an Internet Service Provider providing Internet service to the end user). Of course, it should be noted that the underlying principles of the invention are not limited to any particular type of communication channel or protocol.

In one embodiment, the IoT devices 101-105 are ultra low-power devices capable of operating for extended periods of time on battery power (e.g., years). To conserve power, the local communication channels 130 may be implemented using a low-power wireless communication technology such as Bluetooth Low Energy (LE). In this embodiment, each of the IoT devices 101-105 and the IoT hub 110 are equipped with Bluetooth LE radios and protocol stacks.

As mentioned, in one embodiment, the IoT platform includes an IoT app or Web application executed on user devices 135 to allow users to access and configure the connected IoT devices 101-105, IoT hub 110, and/or IoT service 120. In one embodiment, the app or web application may be designed by the operator of a Website 130 to provide IoT functionality to its user base. As illustrated, the Website may maintain a user database 131 containing account records related to each user.

Figure 1B:
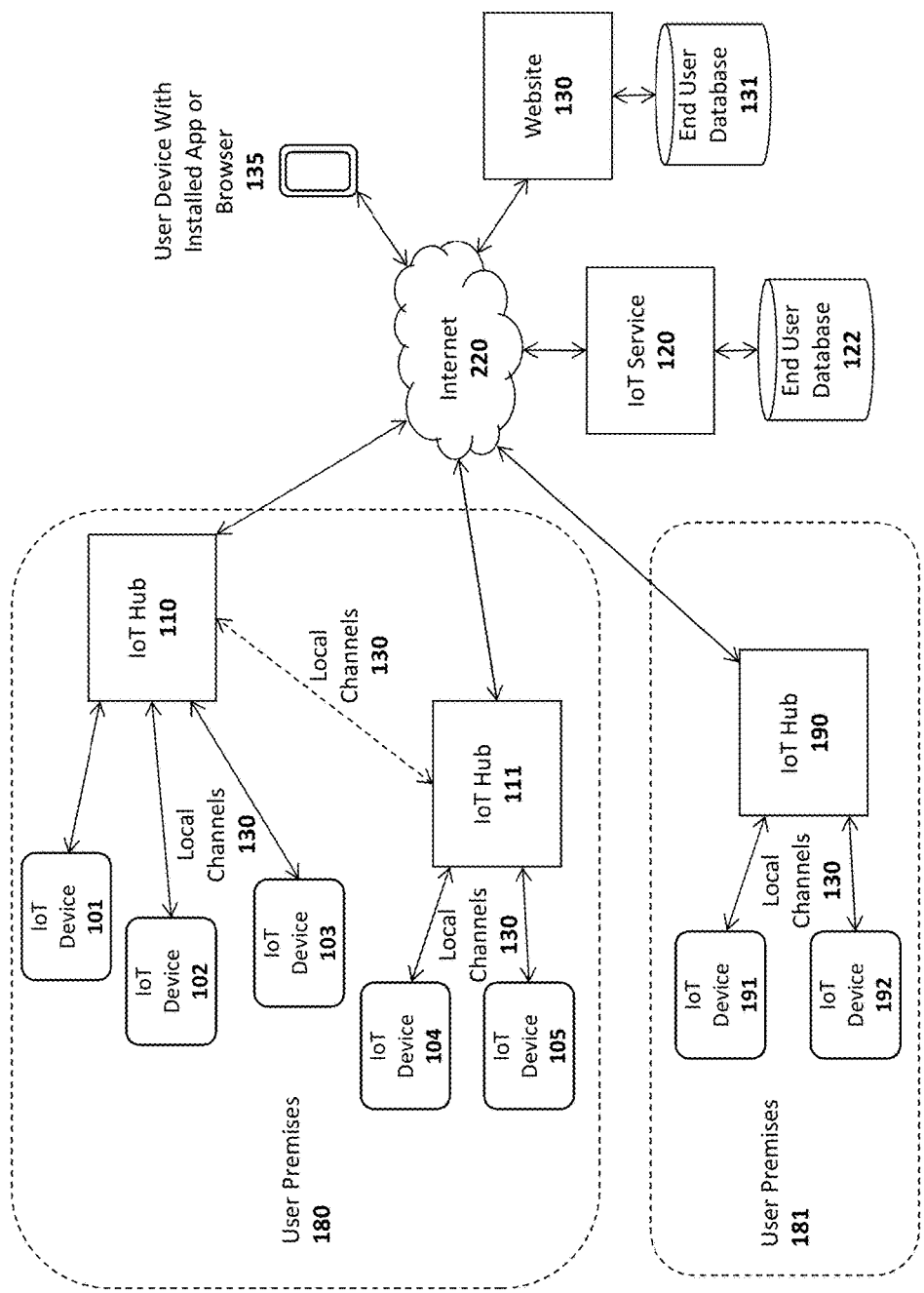

FIG. 1B illustrates additional connection options for a plurality of IoT hubs 110-111, 190 In this embodiment a single user may have multiple hubs 110-111 installed onsite at a single user premises 180 (e.g., the user's home or business). This may be done, for example, to extend the wireless range needed to connect all of the IoT devices 101-105. As indicated, if a user has multiple hubs 110, 111 they may be connected via a local communication channel (e.g., Wifi, Ethernet, Power Line Networking, etc). In one embodiment, each of the hubs 110-111 may establish a direct connection to the IoT service 120 through a cellular 115 or WiFi 116 connection (not explicitly shown in FIG. 1B). Alternatively, or in addition, one of the IoT hubs such as IoT hub 110 may act as a "master" hub which provides connectivity and/or local services to all of the other IoT hubs on the user premises 180, such as IoT hub 111 (as indicated by the dotted line connecting IoT hub 110 and IoT hub 111). For example, the master IoT hub 110 may be the only IoT hub to establish a direct connection to the IoT service 120. In one embodiment, only the "master" IoT hub 110 is equipped with a cellular communication interface to establish the connection to the IoT service 120. As such, all communication between the IoT service 120 and the other IoT hubs 111 will flow through the master IoT hub 110. In this role, the master IoT hub 110 may be provided with additional program code to perform filtering operations on the data exchanged between the other IoT hubs 111 and IoT service 120 (e.g., servicing some data requests locally when possible).

Regardless of how the IoT hubs 110-111 are connected, in one embodiment, the IoT service 120 will logically associate the hubs with the user and combine all of the attached IoT devices 101-105 under a single comprehensive user interface, accessible via a user device with the installed app 135 (and/or a browser-based interface).

In this embodiment, the master IoT hub 110 and one or more slave IoT hubs 111 may connect over a local network which may be a WiFi network 116, an Ethernet network, and/or a using power-line communications (PLC) networking (e.g., where all or portions of the network are run through the user's power lines). In addition, to the IoT hubs 110-111, each of the IoT devices 101-105 may be interconnected with the IoT hubs 110-111 using any type of local network channel such as WiFi, Ethernet, PLC, or Bluetooth LE, to name a few.

FIG. 1B also shows an IoT hub 190 installed at a second user premises 181. A virtually unlimited number of such IoT hubs 190 may be installed and configured to collect data from IoT devices 191-192 at user premises around the world. In one embodiment, the two user premises 180-181 may be configured for the same user. For example, one user premises 180 may be the user's primary home and the other user premises 181 may be the user's vacation home. In such a case, the IoT service 120 will logically associate the IoT hubs 110-111, 190 with the user and combine all of the attached IoT devices 101-105, 191-192 under a single comprehensive user interface, accessible via a user device with the installed app 135 (and/or a browser-based interface).

Figure 2:
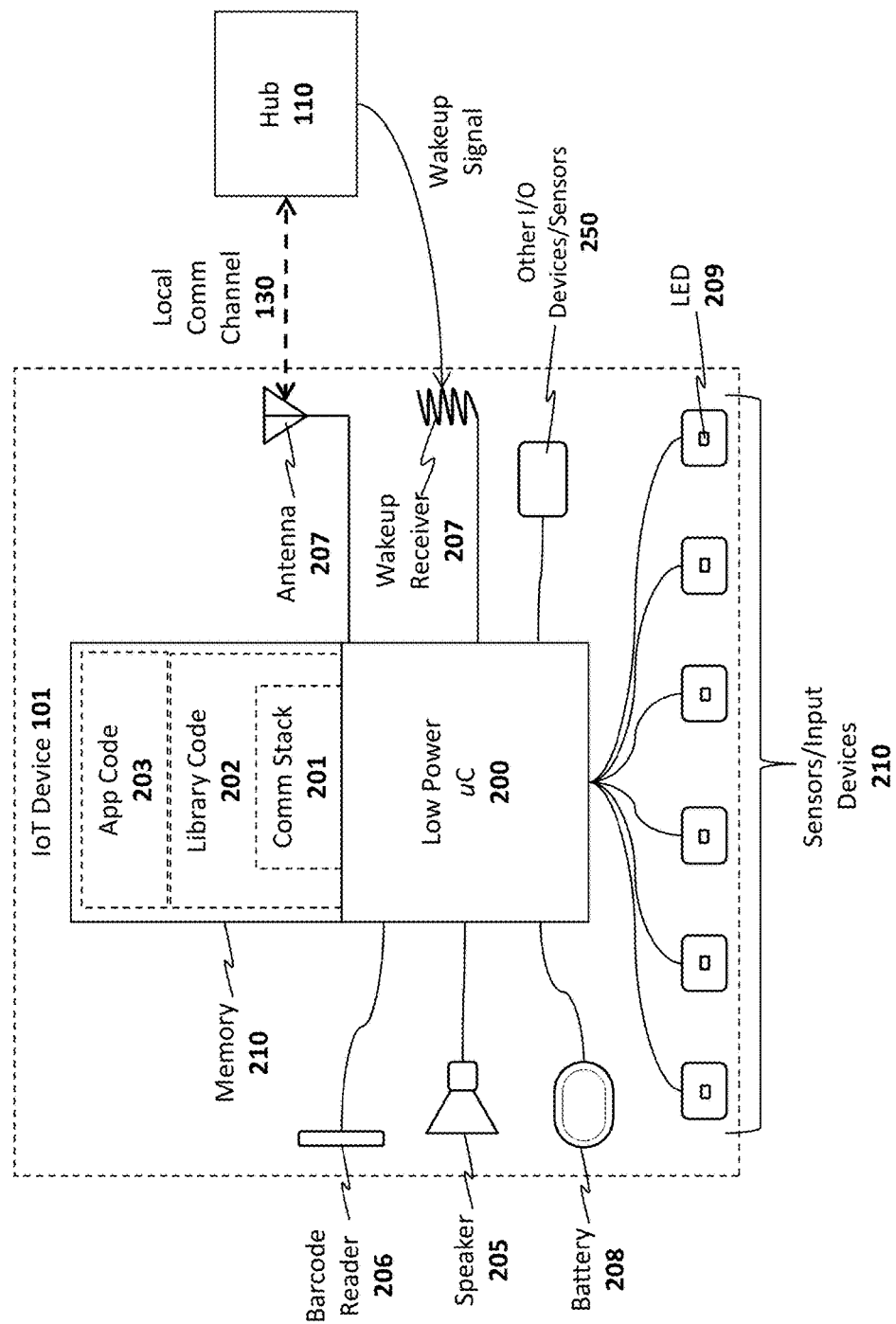
FIG. 2 illustrates an IoT device in accordance with one embodiment of the invention.

As illustrated in FIG. 2, an exemplary embodiment of an IoT device 101 includes a memory 210 for storing program code and data 201-203 and a low power microcontroller 200 for executing the program code and processing the data. The memory 210 may be a volatile memory such as dynamic random access memory (DRAM) or may be a non-volatile memory such as Flash memory. In one embodiment, a non-volatile memory may be used for persistent storage and a volatile memory may be used for execution of the program code and data at runtime. Moreover, the memory 210 may be integrated within the low power microcontroller 200 or may be coupled to the low power microcontroller 200 via a bus or communication fabric. The underlying principles of the invention are not limited to any particular implementation of the memory 210.

As illustrated, the program code may include application program code 203 defining an application-specific set of functions to be performed by the IoT device 201 and library code 202 comprising a set of predefined building blocks which may be utilized by the application developer of the IoT device 101. In one embodiment, the library code 202 comprises a set of basic functions required to implement an IoT device such as a communication protocol stack 201 for enabling communication between each IoT device 101 and the IoT hub 110. As mentioned, in one embodiment, the communication protocol stack 201 comprises a Bluetooth LE protocol stack. In this embodiment, Bluetooth LE radio and antenna 207 may be integrated within the low power microcontroller 200. However, the underlying principles of the invention are not limited to any particular communication protocol.

The particular embodiment shown in FIG. 2 also includes a plurality of input devices or sensors 210 to receive user input and provide the user input to the low power microcontroller, which processes the user input in accordance with the application code 203 and library code 202. In one embodiment, each of the input devices include an LED 209 to provide feedback to the end user.

In addition, the illustrated embodiment includes a battery 208 for supplying power to the low power microcontroller. In one embodiment, a non-chargeable coin cell battery is used. However, in an alternate embodiment, an integrated rechargeable battery may be used (e.g., rechargeable by connecting the IoT device to an AC power supply (not shown)).

A speaker 205 is also provided for generating audio. In one embodiment, the low power microcontroller 299 includes audio decoding logic for decoding a compressed audio stream (e.g., such as an MPEG-4/Advanced Audio Coding (AAC) stream) to generate audio on the speaker 205. Alternatively, the low power microcontroller 200 and/or the application code/data 203 may include digitally sampled snippets of audio to provide verbal feedback to the end user as the user enters selections via the input devices 210.

In one embodiment, one or more other/alternate I/O devices or sensors 250 may be included on the IoT device 101 based on the particular application for which the IoT device 101 is designed. For example, an environmental sensor may be included to measure temperature, pressure, humidity, etc. A security sensor and/or door lock opener may be included if the IoT device is used as a security device. Of course, these examples are provided merely for the purposes of illustration. The underlying principles of the invention are not limited to any particular type of IoT device. In fact, given the highly programmable nature of the low power microcontroller 200 equipped with the library code 202, an application developer may readily develop new application code 203 and new I/O devices 250 to interface with the low power microcontroller for virtually any type of IoT application.

In one embodiment, the low power microcontroller 200 also includes a secure key store for storing encryption keys for encrypting communications and/or generating signatures. Alternatively, the keys may be secured in a subscriber identify module (SIM).

Figure 3:
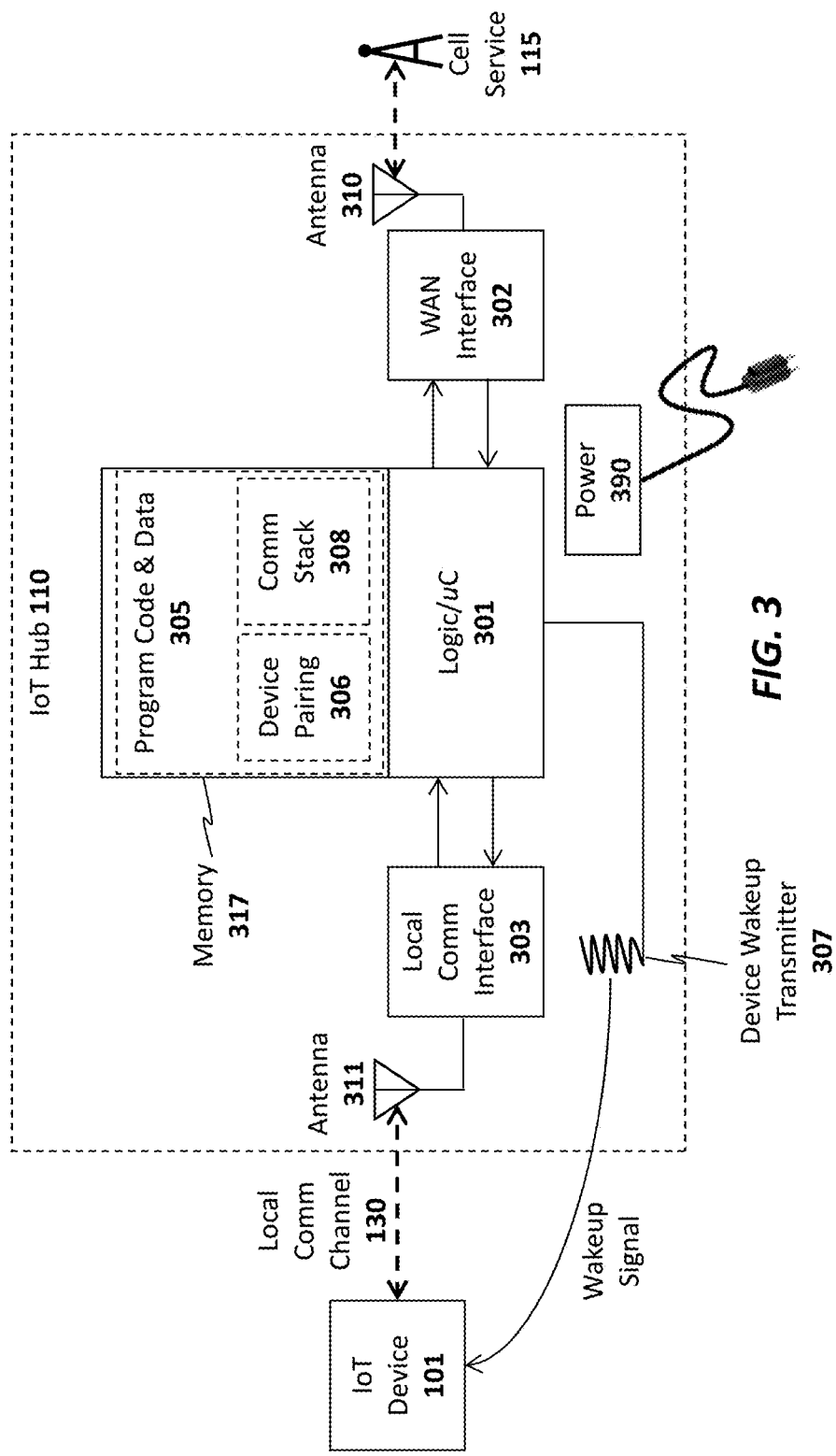
FIG. 3 illustrates an IoT hub in accordance with one embodiment of the invention.

A wakeup receiver 207 is included in one embodiment to wake the IoT device from an ultra low power state in which it is consuming virtually no power. In one embodiment, the wakeup receiver 207 is configured to cause the IoT device 101 to exit this low power state in response to a wakeup signal received from a wakeup transmitter 307 configured on the IoT hub 110 as shown in FIG. 3. In particular, in one embodiment, the transmitter 307 and receiver 207 together form an electrical resonant transformer circuit such as a Tesla coil. In operation, energy is transmitted via radio frequency signals from the transmitter 307 to the receiver 207 when the hub 110 needs to wake the IoT device 101 from a very low power state. Because of the energy transfer, the IoT device 101 may be configured to consume virtually no power when it is in its low power state because it does not need to continually "listen" for a signal from the hub (as is the case with network protocols which allow devices to be awakened via a network signal). Rather, the microcontroller 200 of the IoT device 101 may be configured to wake up after being effectively powered down by using the energy electrically transmitted from the transmitter 307 to the receiver 207.

As illustrated in FIG. 3, the IoT hub 110 also includes a memory 317 for storing program code and data 305 and hardware logic 301 such as a microcontroller for executing the program code and processing the data. A wide area network (WAN) interface 302 and antenna 310 couple the IoT hub 110 to the cellular service 115. Alternatively, as mentioned above, the IoT hub 110 may also include a local network interface (not shown) such as a WiFi interface (and WiFi antenna) or Ethernet interface for establishing a local area network communication channel. In one embodiment, the hardware logic 301 also includes a secure key store for storing encryption keys for encrypting communications and generating/verifying signatures. Alternatively, the keys may be secured in a subscriber identify module (SIM).

A local communication interface 303 and antenna 311 establishes local communication channels with each of the IoT devices 101-105. As mentioned above, in one embodiment, the local communication interface 303/antenna 311 implements the Bluetooth LE standard. However, the underlying principles of the invention are not limited to any particular protocols for establishing the local communication channels with the IoT devices 101-105. Although illustrated as separate units in FIG. 3, the WAN interface 302 and/or local communication interface 303 may be embedded within the same chip as the hardware logic 301.

In one embodiment, the program code and data includes a communication protocol stack 308 which may include separate stacks for communicating over the local communication interface 303 and the WAN interface 302. In addition, device pairing program code and data 306 may be stored in the memory to allow the IoT hub to pair with new IoT devices. In one embodiment, each new IoT device 101-105 is assigned a unique code which is communicated to the IoT hub 110 during the pairing process. For example, the unique code may be embedded in a barcode on the IoT device and may be read by the barcode reader 106 or may be communicated over the local communication channel 130. In an alternate embodiment, the unique ID code is embedded magnetically on the IoT device and the IoT hub has a magnetic sensor such as an radio frequency ID (RFID) or near field communication (NFC) sensor to detect the code when the IoT device 101 is moved within a few inches of the IoT hub 110.

In one embodiment, once the unique ID has been communicated, the IoT hub 110 may verify the unique ID by querying a local database (not shown), performing a hash to verify that the code is acceptable, and/or communicating with the IoT service 120, user device 135 and/or Website 130 to validate the ID code. Once validated, in one embodiment, the IoT hub 110 pairs the IoT device 101 and stores the pairing data in memory 317 (which, as mentioned, may include non-volatile memory). Once pairing is complete, the IoT hub 110 may connect with the IoT device 101 to perform the various IoT functions described herein.

In one embodiment, the organization running the IoT service 120 may provide the IoT hub 110 and a basic hardware/software platform to allow developers to easily design new IoT services. In particular, in addition to the IoT hub 110, developers may be provided with a software development kit (SDK) to update the program code and data 305 executed within the hub 110. In addition, for IoT devices 101, the SDK may include an extensive set of library code 202 designed for the base IoT hardware (e.g., the low power microcontroller 200 and other components shown in FIG. 2) to facilitate the design of various different types of applications 101. In one embodiment, the SDK includes a graphical design interface in which the developer needs only to specify input and outputs for the IoT device. All of the networking code, including the communication stack 201 that allows the IoT device 101 to connect to the hub 110 and the service 120, is already in place for the developer. In addition, in one embodiment, the SDK also includes a library code base to facilitate the design of apps for mobile devices (e.g., iPhone and Android devices).

In one embodiment, the IoT hub 110 manages a continuous bi-directional stream of data between the IoT devices 101-105 and the IoT service 120. In circumstances where updates to/from the IoT devices 101-105 are performed in real time (e.g., where a user needs to view the current status of security devices or environmental readings), the IoT hub may maintain an open TCP socket to provide regular updates to the user device 135 and/or external Websites 130. The specific networking protocol used to provide updates may be tweaked based on the needs of the underlying application. For example, in some cases, where may not make sense to have a continuous bi-directional stream, a simple request/response protocol may be used to gather information when needed.

In one embodiment, both the IoT hub 110 and the IoT devices 101-105 are automatically upgradeable over the network. In particular, when a new update is available for the IoT hub 110 it may automatically download and install the update from the IoT service 120. It may first copy the updated code into a local memory, run and verify the update before swapping out the older program code. Similarly, when updates are available for each of the IoT devices 101-105, they may initially be downloaded by the IoT hub 110 and pushed out to each of the IoT devices 101-105. Each IoT device 101-105 may then apply the update in a similar manner as described above for the IoT hub and report back the results of the update to the IoT hub 110. If the update is successful, then the IoT hub 110 may delete the update from its memory and record the latest version of code installed on each IoT device (e.g., so that it may continue to check for new updates for each IoT device).

In one embodiment, the IoT hub 110 is powered via A/C power. In particular, the IoT hub 110 may include a power unit 390 with a transformer for transforming A/C voltage supplied via an A/C power cord to a lower DC voltage.

Figure 4A:
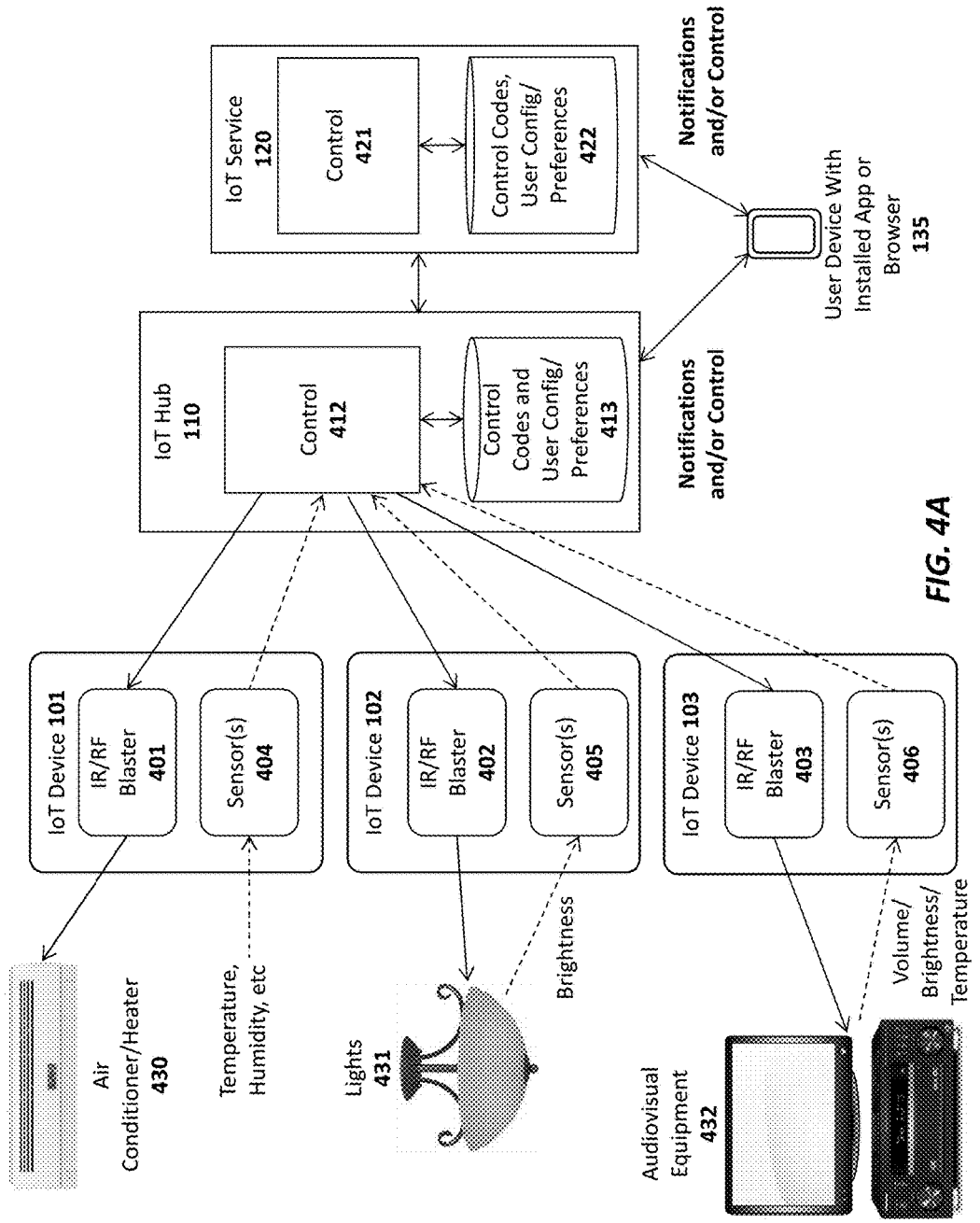
FIG. 4A-B illustrate embodiments of the invention for controlling and collecting data from IoT devices, and generating notifications.

FIG. 4A illustrates one embodiment of the invention for performing universal remote control operations using the IoT system. In particular, in this embodiment, a set of IoT devices 101-103 are equipped with infrared (IR) and/or radio frequency (RF) blasters 401-403, respectively, for transmitting remote control codes to control various different types of electronics equipment including air conditioners/heaters 430, lighting systems 431, and audiovisual equipment 432 (to name just a few). In the embodiment shown in FIG. 4A, the IoT devices 101-103 are also equipped with sensors 404-406, respectively, for detecting the operation of the devices which they control, as described below.

For example, sensor 404 in IoT device 101 may be a temperature and/or humidity sensor for sensing the current temperature/humidity and responsively controlling the air conditioner/heater 430 based on a current desired temperature. In this embodiment, the air conditioner/heater 430 is one which is designed to be controlled via a remote control device (typically a remote control which itself has a temperature sensor embedded therein). In one embodiment, the user provides the desired temperature to the IoT hub 110 via an app or browser installed on a user device 135. Control logic 412 executed on the IoT hub 110 receives the current temperature/humidity data from the sensor 404 and responsively transmits commands to the IoT device 101 to control the IR/RF blaster 401 in accordance with the desired temperature/humidity. For example, if the temperature is below the desired temperature, then the control logic 412 may transmit a command to the air conditioner/heater via the IR/RF blaster 401 to increase the temperature (e.g., either by turning off the air conditioner or turning on the heater). The command may include the necessary remote control code stored in a database 413 on the IoT hub 110. Alternatively, or in addition, the IoT service 421 may implement control logic 421 to control the electronics equipment 430-432 based on specified user preferences and stored control codes 422.

IoT device 102 in the illustrated example is used to control lighting 431. In particular, sensor 405 in IoT device 102 may photosensor or photodetector configured to detect the current brightness of the light being produced by a light fixture 431 (or other lighting apparatus). The user may specify a desired lighting level (including an indication of ON or OFF) to the IoT hub 110 via the user device 135. In response, the control logic 412 will transmit commands to the IR/RF blaster 402 to control the current brightness level of the lights 431 (e.g., increasing the lighting if the current brightness is too low or decreasing the lighting if the current brightness is too high; or simply turning the lights ON or OFF).

IoT device 103 in the illustrated example is configured to control audiovisual equipment 432 (e.g., a television, A/V receiver, cable/satellite receiver, AppleTV™, etc). Sensor 406 in IoT device 103 may be an audio sensor (e.g., a microphone and associated logic) for detecting a current ambient volume level and/or a photosensor to detect whether a television is on or off based on the light generated by the television (e.g., by measuring the light within a specified spectrum). Alternatively, sensor 406 may include a temperature sensor connected to the audiovisual equipment to detect whether the audio equipment is on or off based on the detected temperature. Once again, in response to user input via the user device 135, the control logic 412 may transmit commands to the audiovisual equipment via the IR blaster 403 of the IoT device 103.

It should be noted that the foregoing are merely illustrative examples of one embodiment of the invention. The underlying principles of the invention are not limited to any particular type of sensors or equipment to be controlled by IoT devices.

In an embodiment in which the IoT devices 101-103 are coupled to the IoT hub 110 via a Bluetooth LE connection, the sensor data and commands are sent over the Bluetooth LE channel. However, the underlying principles of the invention are not limited to Bluetooth LE or any other communication standard.

Figure 4B:
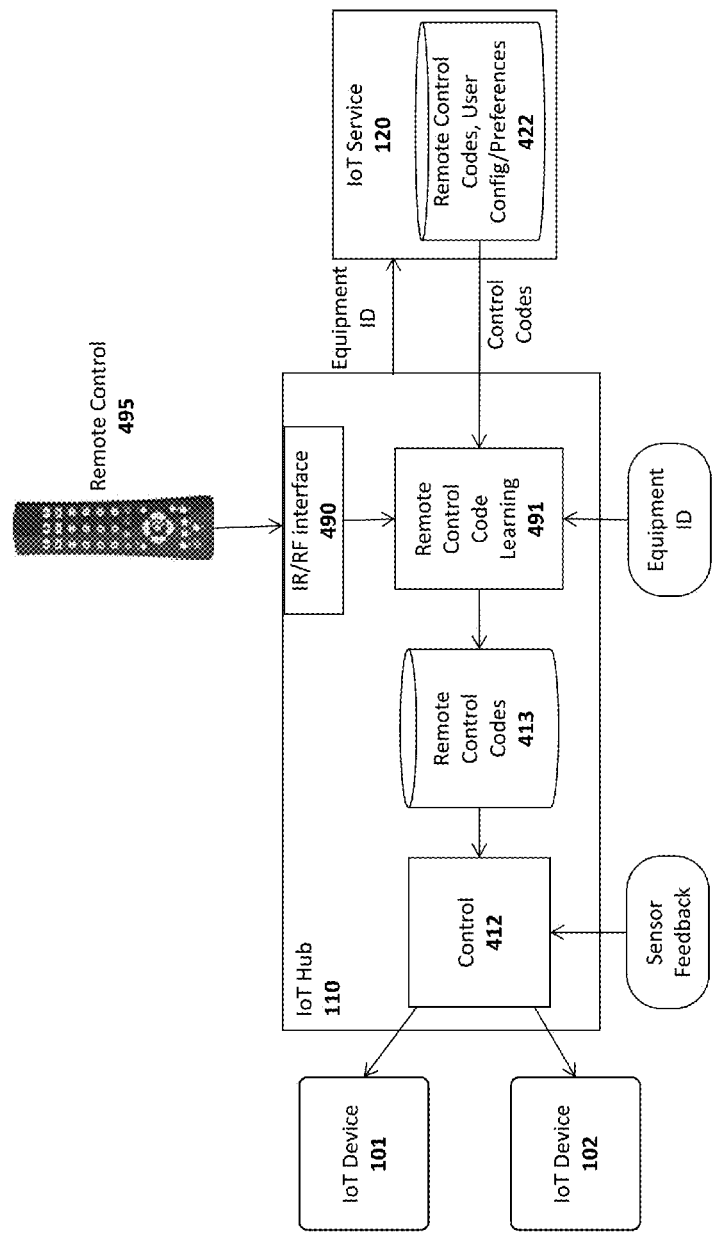

In one embodiment, the control codes required to control each of the pieces of electronics equipment are stored in a database 413 on the IoT hub 110 and/or a database 422 on the IoT service 120. As illustrated in FIG. 4B, the control codes may be provided to the IoT hub 110 from a master database of control codes 422 for different pieces of equipment maintained on the IoT service 120. The end user may specify the types of electronic (or other) equipment to be controlled via the app or browser executed on the user device 135 and, in response, a remote control code learning module 491 on the IoT hub may retrieve the required IR/RF codes from the remote control code database 492 on the IoT service 120 (e.g., identifying each piece of electronic equipment with a unique ID).

In addition, in one embodiment, the IoT hub 110 is equipped with an IR/RF interface 490 to allow the remote control code learning module 491 to "learn" new remote control codes directly from the original remote control 495 provided with the electronic equipment. For example, if control codes for the original remote control provided with the air conditioner 430 is not included in the remote control database, the user may interact with the IoT hub 110 via the app/browser on the user device 135 to teach the IoT hub 110 the various control codes generated by the original remote control (e.g., increase temperature, decrease temperature, etc). Once the remote control codes are learned they may be stored in the control code database 413 on the IoT hub 110 and/or sent back to the IoT service 120 to be included in the central remote control code database 492 (and subsequently used by other users with the same air conditioner unit 430).

In one embodiment, each of the IoT devices 101-103 have an extremely small form factor and may be affixed on or near their respective electronics equipment 430-432 using double-sided tape, a small nail, a magnetic attachment, etc. For control of a piece of equipment such as the air conditioner 430, it would be desirable to place the IoT device 101 sufficiently far away so that the sensor 404 can accurately measure the ambient temperature in the home (e.g., placing the IoT device directly on the air conditioner would result in a temperature measurement which would be too low when the air conditioner was running or too high when the heater was running). In contrast, the IoT device 102 used for controlling lighting may be placed on or near the lighting fixture 431 for the sensor 405 to detect the current lighting level.

In addition to providing general control functions as described, one embodiment of the IoT hub 110 and/or IoT service 120 transmits notifications to the end user related to the current status of each piece of electronics equipment. The notifications, which may be text messages and/or app-specific notifications, may then be displayed on the display of the user's mobile device 135. For example, if the user's air conditioner has been on for an extended period of time but the temperature has not changed, the IoT hub 110 and/or IoT service 120 may send the user a notification that the air conditioner is not functioning properly. If the user is not home (which may be detected via motion sensors or based on the user's current detected location), and the sensors 406 indicate that audiovisual equipment 430 is on or sensors 405 indicate that the lights are on, then a notification may be sent to the user, asking if the user would like to turn off the audiovisual equipment 432 and/or lights 431. The same type of notification may be sent for any equipment type.

Once the user receives a notification, he/she may remotely control the electronics equipment 430-432 via the app or browser on the user device 135. In one embodiment, the user device 135 is a touchscreen device and the app or browser displays an image of a remote control with user-selectable buttons for controlling the equipment 430-432. Upon receiving a notification, the user may open the graphical remote control and turn off or adjust the various different pieces of equipment. If connected via the IoT service 120, the user's selections may be forwarded from the IoT service 120 to the IoT hub 110 which will then control the equipment via the control logic 412. Alternatively, the user input may be sent directly to the IoT hub 110 from the user device 135.

In one embodiment, the user may program the control logic 412 on the IoT hub 110 to perform various automatic control functions with respect to the electronics equipment 430-432. In addition to maintaining a desired temperature, brightness level, and volume level as described above, the control logic 412 may automatically turn off the electronics equipment if certain conditions are detected. For example, if the control logic 412 detects that the user is not home and that the air conditioner is not functioning, it may automatically turn off the air conditioner. Similarly, if the user is not home, and the sensors 406 indicate that audiovisual equipment 430 is on or sensors 405 indicate that the lights are on, then the control logic 412 may automatically transmit commands via the IR/RF blasters 403 and 402, to turn off the audiovisual equipment and lights, respectively.

Figure 5:
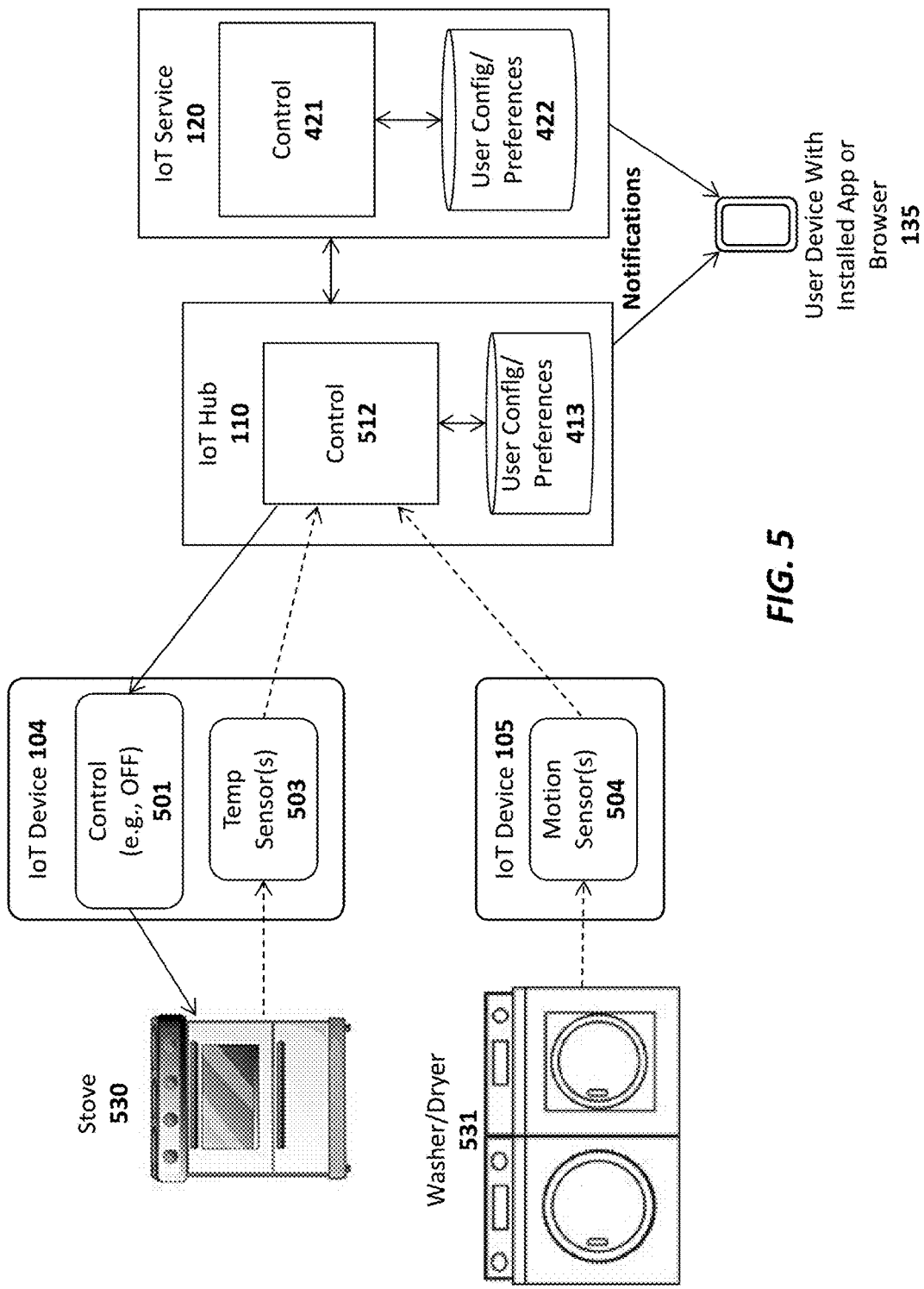
FIG. 5 illustrates embodiments of the invention for collecting data from IoT devices and generating notifications from an IoT hub and/or IoT service.

FIG. 5 illustrates additional embodiments of IoT devices 104-105 equipped with sensors 503-504 for monitoring electronic equipment 530-531. In particular, the IoT device 104 of this embodiment includes a temperature sensor 503 which may be placed on or near a stove 530 to detect when the stove has been left on. In one embodiment, the IoT device 104 transmits the current temperature measured by the temperature sensor 503 to the IoT hub 110 and/or the IoT service 120. If the stove is detected to be on for more than a threshold time period (e.g., based on the measured temperature), then control logic 512 may transmit a notification to the end user's device 135 informing the user that the stove 530 is on. In addition, in one embodiment, the IoT device 104 may include a control module 501 to turn off the stove, either in response to receiving an instruction from the user or automatically (if the control logic 512 is programmed to do so by the user). In one embodiment, the control logic 501 comprises a switch to cut off electricity or gas to the stove

530. However, in other embodiments, the control logic 501 may be integrated within the stove itself.

FIG. 5 also illustrates an IoT device 105 with a motion sensor 504 for detecting the motion of certain types of electronics equipment such as a washer and/or dryer. Another sensor that may be used is an audio sensor (e.g., microphone and logic) for detecting an ambient volume level. As with the other embodiments described above, this embodiment may transmit notifications to the end user if certain specified conditions are met (e.g., if motion is detected for an extended period of time, indicating that the washer/dryer are not turning off). Although not shown in FIG. 5, IoT device 105 may also be equipped with a control module to turn off the washer/dryer 531 (e.g., by switching off electric/gas), automatically, and/or in response to user input.

In one embodiment, a first IoT device with control logic and a switch may be configured to turn off all power in the user's home and a second IoT device with control logic and a switch may be configured to turn off all gas in the user's home. IoT devices with sensors may then be positioned on or near electronic or gas-powered equipment in the user's home. If the user is notified that a particular piece of equipment has been left on (e.g., the stove 530), the user may then send a command to turn off all electricity or gas in the home to prevent damage. Alternatively, the control logic 512 in the IoT hub 110 and/or the IoT service 120 may be configured to automatically turn off electricity or gas in such situations.

In one embodiment, the IoT hub 110 and IoT service 120 communicate at periodic intervals. If the IoT service 120 detects that the connection to the IoT hub 110 has been lost (e.g., by failing to receive a request or response from the IoT hub for a specified duration), it will communicate this information to the end user's device 135 (e.g., by sending a text message or app-specific notification).

Apparatus and Method for Communicating Data Through an Intermediary Device

As mentioned above, because the wireless technologies used to interconnect IoT devices such as Bluetooth LE are generally short range technologies, if the hub for an IoT implementation is outside the range of an IoT device, the IoT device will not be able to transmit data to the IoT hub (and vice versa).

To address this deficiency, one embodiment of the invention provides a mechanism for an IoT device which is outside of the wireless range of the IoT hub to periodically connect with one or more mobile devices when the mobile devices are within range. Once connected, the IoT device can transmit any data which needs to be provided to the IoT hub to the mobile device which then forwards the data to the IoT hub.

Figure 6:
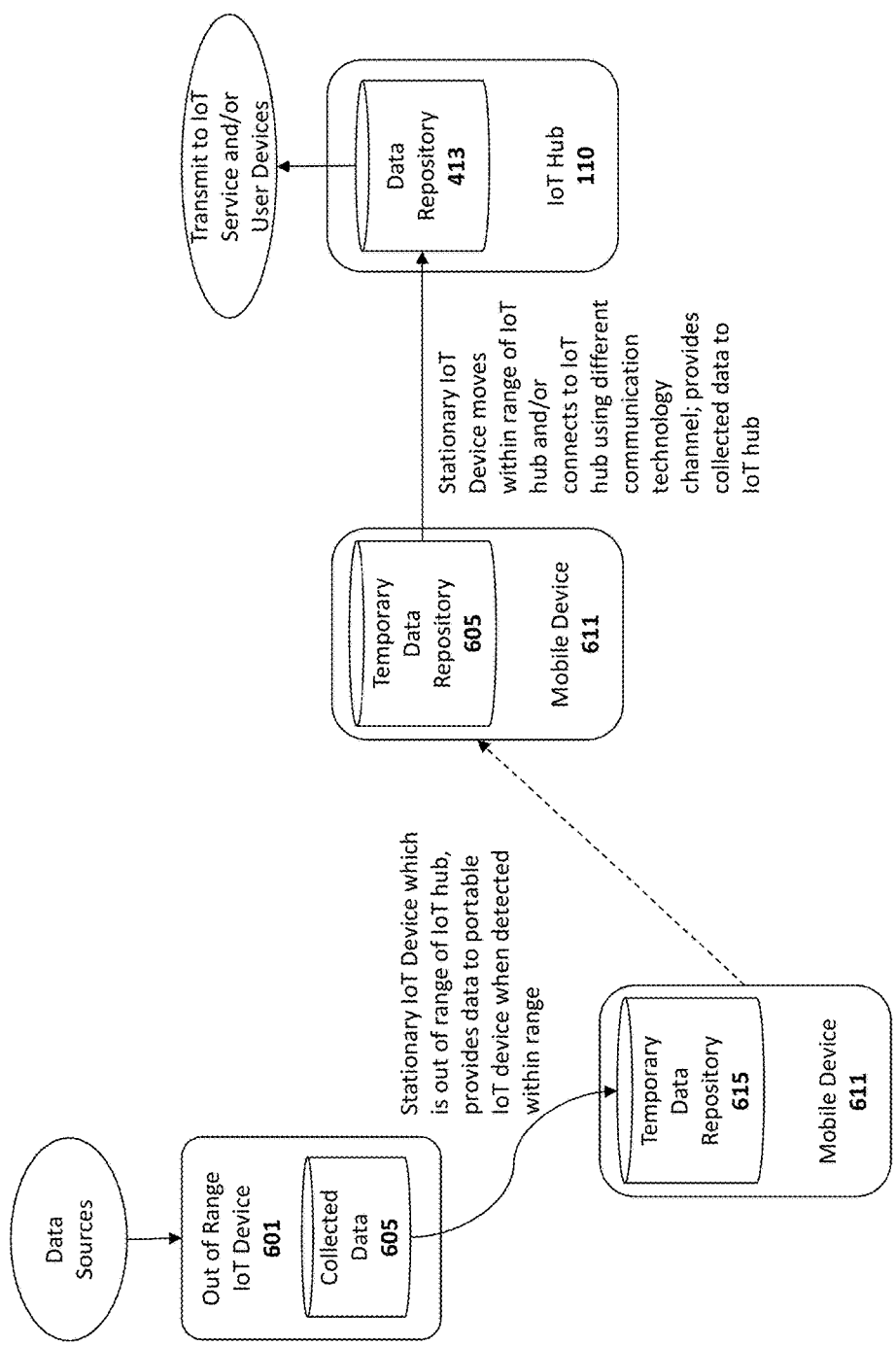
FIG. 6 illustrates one embodiment of a system in which an intermediary mobile device collects data from a stationary IoT device and provides the data to an IoT hub.

As illustrated in FIG. 6 one embodiment includes an IoT hub 110, an IoT device 601 which is out of range of the IoT hub 110 and a mobile device 611. The out of range IoT device 601 may include any form of IoT device capable of collecting and communicating data. For example, the IoT device 601 may comprise a data collection device configured within a refrigerator to monitor the food items available in the refrigerator, the users who consume the food items, and the current temperature. Of course, the underlying principles of the invention are not limited to any particular type of IoT device. The techniques described herein may be implemented using any type of IoT device including those used to collect and transmit data for smart meters, stoves, washers, dryers, lighting systems, HVAC systems, and audiovisual equipment, to name just a few.

Moreover, the mobile device In operation, the IoT device 611 illustrated in FIG. 6 may be any form of mobile device capable of communicating and storing data. For example, in one embodiment, the mobile device 611 is a smartphone with an app installed thereon to facilitate the techniques described herein. In another embodiment, the mobile device 611 comprises a wearable device such as a communication token affixed to a neckless or bracelet, a smartwatch or a fitness device. The wearable token may be particularly useful for elderly users or other users who do not own a smartphone device.

In operation, the out of range IoT device 601 may periodically or continually check for connectivity with a mobile device 611. Upon establishing a connection (e.g., as the result of the user moving within the vicinity of the refrigerator) any collected data 605 on the IoT device 601 is automatically transmitted to a temporary data repository 615 on the mobile device 611. In one embodiment, the IoT device 601 and mobile device 611 establish a local wireless communication channel using a low power wireless standard such as BTLE. In such a case, the mobile device 611 may initially be paired with the IoT device 601 using known pairing techniques.

One the data has been transferred to the temporary data repository, the mobile device 611 will transmit the data once communication is established with the IoT hub 110 (e.g., when the user walks within the range of the IoT hub 110). The IoT hub may then store the data in a central data repository 413 and/or send the data over the Internet to one or more services and/or other user devices. In one embodiment, the mobile device 611 may use a different type of communication channel to provide the data to the IoT hub 110 (potentially a higher power communication channel such as WiFi).

Figure 7:
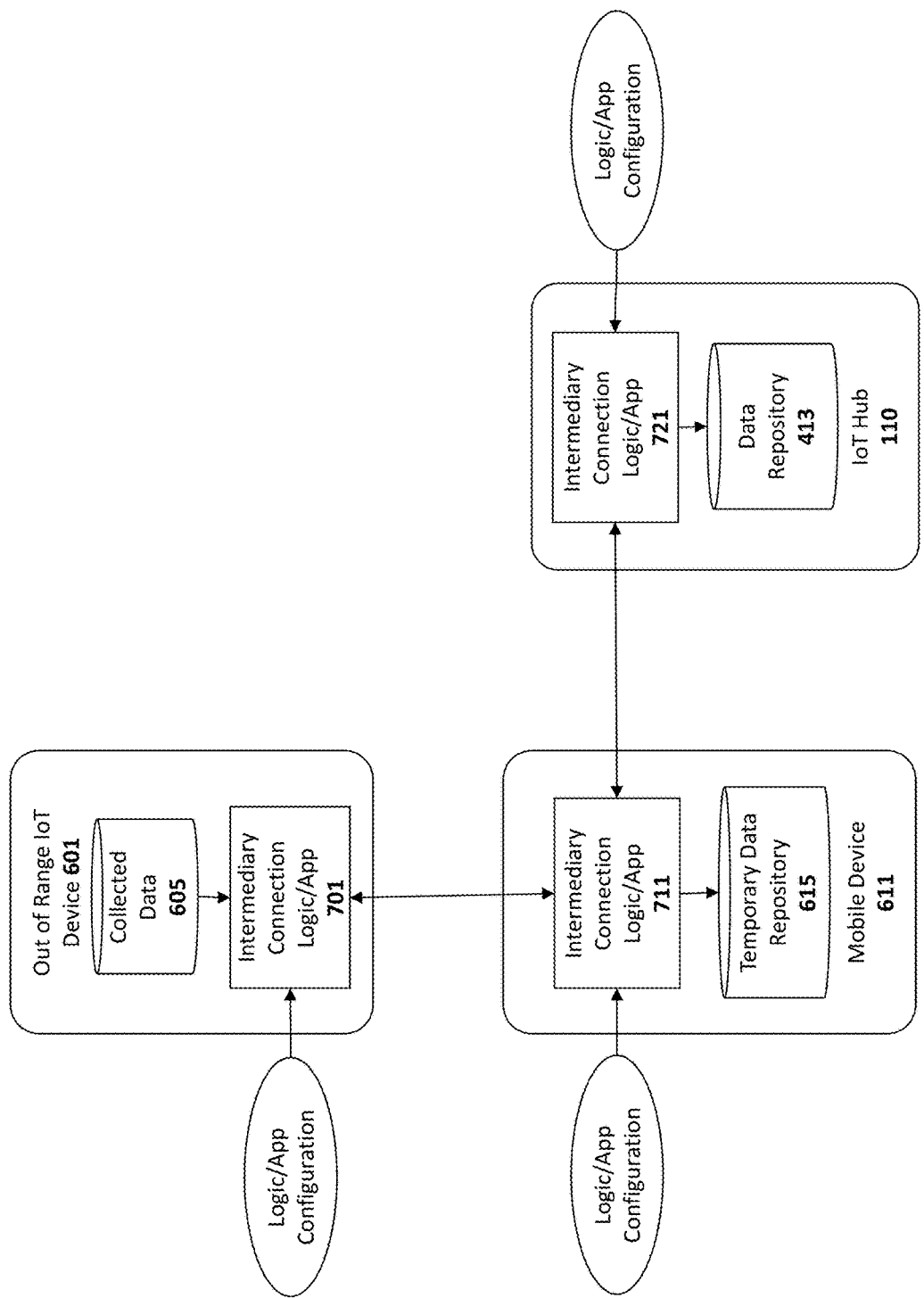
FIG. 7 illustrates intermediary connection logic implemented in one embodiment of the invention.

The out of range IoT device 601, the mobile device 611, and the IoT hub may all be configured with program code and/or logic to implement the techniques described herein. As illustrated in FIG. 7, for example, the IoT device 601 may be configured with intermediary connection logic and/or application, the mobile device 611 may be configured with an intermediary connection logic/application, and the IoT hub 110 may be configured with an intermediary connection logic/application 721 to perform the operations described herein. The intermediary connection logic/application on each device may be implemented in hardware, software, or any combination thereof. In one embodiment, the intermediary connection logic/application 701 of the IoT device 601 searches and establishes a connection with the intermediary connection logic/application 711 on the mobile device (which may be implemented as a device app) to transfer the data to the temporary data repository 615. The intermediary connection logic/application 701 on the mobile device 611 then forwards the data to the intermediary connection logic/application on the IoT hub, which stores the data in the central data repository 413.

As illustrated in FIG. 7, the intermediary connection logic/applications 701, 711, 721, on each device may be configured based on the application at hand. For example, for a refrigerator, the connection logic/application 701 may only need to transmit a few packets on a periodic basis. For other applications (e.g., temperature sensors), the connection logic/application 701 may need to transmit more frequent updates.

Rather than a mobile device 611, in one embodiment, the IoT device 601 may be configured to establish a wireless connection with one or more intermediary IoT devices, which are located within range of the IoT hub 110. In this embodiment, any IoT devices 601 out of range of the IoT hub may be linked to the hub by forming a "chain" using other IoT devices.

In addition, while only a single mobile device 611 is illustrated in FIGS. 6-7 for simplicity, in one embodiment, multiple such mobile devices of different users may be configured to communicate with the IoT device 601. Moreover, the same techniques may be implemented for multiple other IoT devices, thereby forming an intermediary device data collection system across the entire home.

Moreover, in one embodiment, the techniques described herein may be used to collect various different types of pertinent data. For example, in one embodiment, each time the mobile device 611 connects with the IoT device 601, the identity of the user may be included with the collected data 605. In this manner, the IoT system may be used to track the behavior of different users within the home. For example, if used within a refrigerator, the collected data 605 may then include the identity of each user who passes by fridge, each user who opens the fridge, and the specific food items consumed by each user. Different types of data may be collected from other types of IoT devices. Using this data the system is able to determine, for example, which user washes clothes, which user watches TV on a given day, the times at which each user goes to sleep and wakes up, etc. All of this crowd-sourced data may then be compiled within the data repository 413 of the IoT hub and/or forwarded to an external service or user.

Another beneficial application of the techniques described herein is for monitoring elderly users who may need assistance. For this application, the mobile device 611 may be a very small token worn by the elderly user to collect the information in different rooms of the user's home. Each time the user opens the refrigerator, for example, this data will be included with the collected data 605 and transferred to the IoT hub 110 via the token. The IoT hub may then provide the data to one or more external users (e.g., the children or other individuals who care for the elderly user). If data has not been collected for a specified period of time (e.g., 12 hours), then this means that the elderly user has not been moving around the home and/or has not been opening the refrigerator. The IoT hub 110 or an external service connected to the IoT hub may then transmit an alert notification to these other individuals, informing them that they should check on the elderly user. In addition, the collected data 605 may include other pertinent information such as the food being consumed by the user and whether a trip to the grocery store is needed, whether and how frequently the elderly user is watching TV, the frequency with which the elderly user washes clothes, etc.

In another implementation, if there is a problem with an electronic device such as a washer, refrigerator, HVAC system, etc, the collected data may include an indication of a part that needs to be replaced. In such a case, a notification may be sent to a technician with a request to fix the problem. The technician may then arrive at the home with the needed replacement part.

Figure 8:
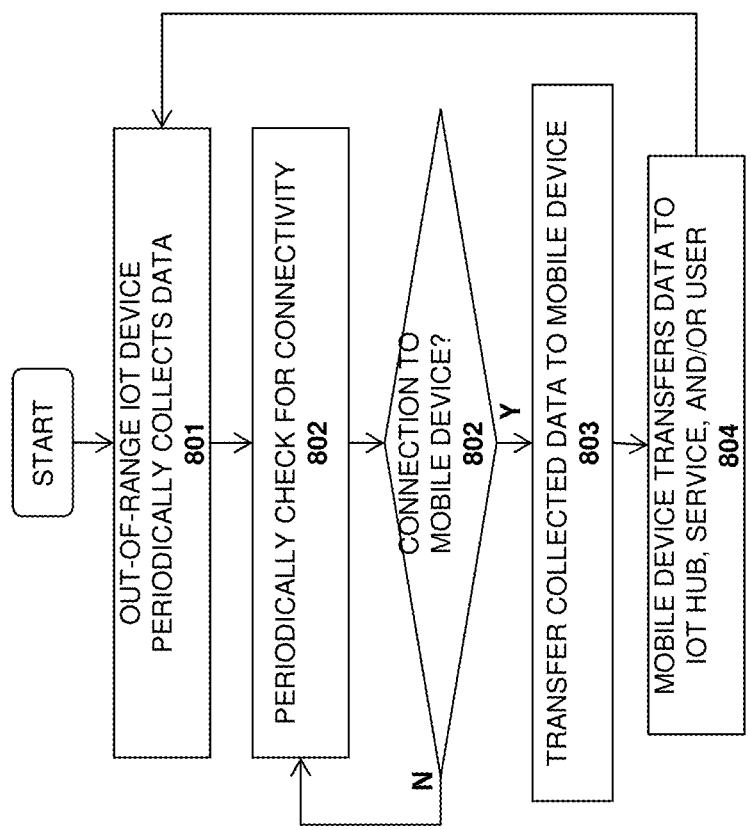
FIG. 8 illustrates a method in accordance with one embodiment of the invention.

A method in accordance with one embodiment of the invention is illustrated in FIG. 8. The method may be implemented within the context of the architectures described above, but is not limited to any particular architecture.

At 801, an IoT device which is out of range of the IoT hub periodically collects data (e.g., opening of the refrigerator door, food items used, etc). At 802 the IoT device periodically or continually checks for connectivity with a mobile device (e.g., using standard local wireless techniques for establishing a connection such as those specified by the BTLE standard). If the connection to the mobile device is established, determined at 802, then at 803, the collected data is transferred to the mobile device at 803. At 804, the mobile device transfers the data to the IoT hub, an external service and/or a user. As mentioned, the mobile device may transmit the data immediately if it is already connected (e.g., via a WiFi link).

Figure 9A:
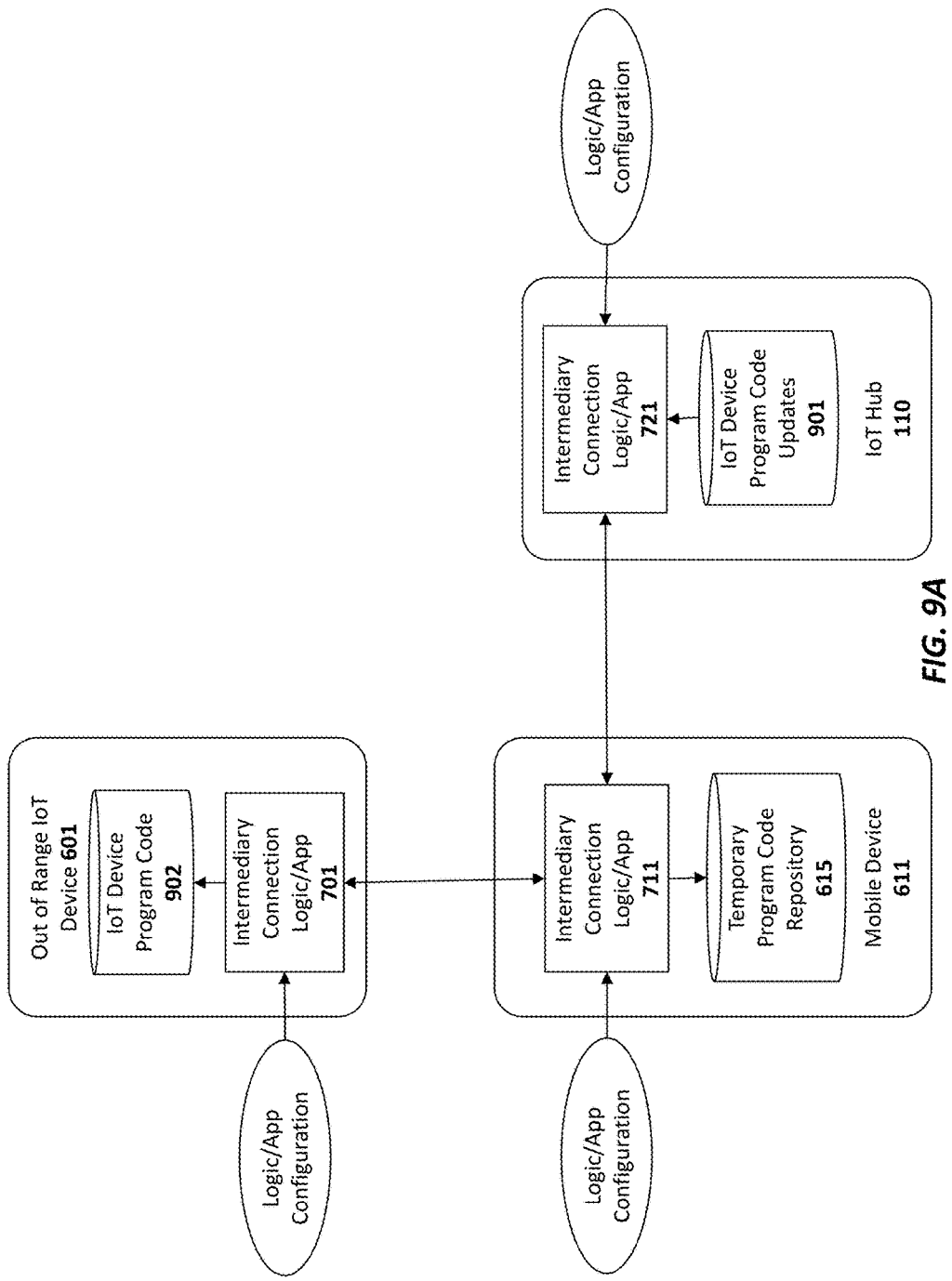
FIG. 9A illustrates an embodiment in which program code and data updates are provided to the IoT device.

In addition to collecting data from IoT devices, in one embodiment, the techniques described herein may be used to update or otherwise provide data to IoT devices. One example is shown in FIG. 9A, which shows an IoT hub 110 with program code updates 901 that need to be installed on an IoT device 601 (or a group of such IoT devices). The program code updates may include system updates, patches, configuration data and any other data needed for the IoT device to operate as desired by the user. In one embodiment, the user may specify configuration options for the IoT device 601 via a mobile device or computer which are then stored on the IoT hub 110 and provided to the IoT device using the techniques described herein. Specifically, in one embodiment, the intermediary connection logic/application 721 on the IoT hub 110 communicates with the intermediary connection logic/application 711 on the mobile device 611 to store the program code updates within a temporary storage 615. When the mobile device 611 enters the range of the IoT device 601, the intermediary connection logic/application 711 on the mobile device 611 connects with the intermediary/connection logic/application 701 on the IoT device 601 to provide the program code updates to the device. In one embodiment, the IoT device 601 may then enter into an automated update process to install the new program code updates and/or data.

Figure 9B:
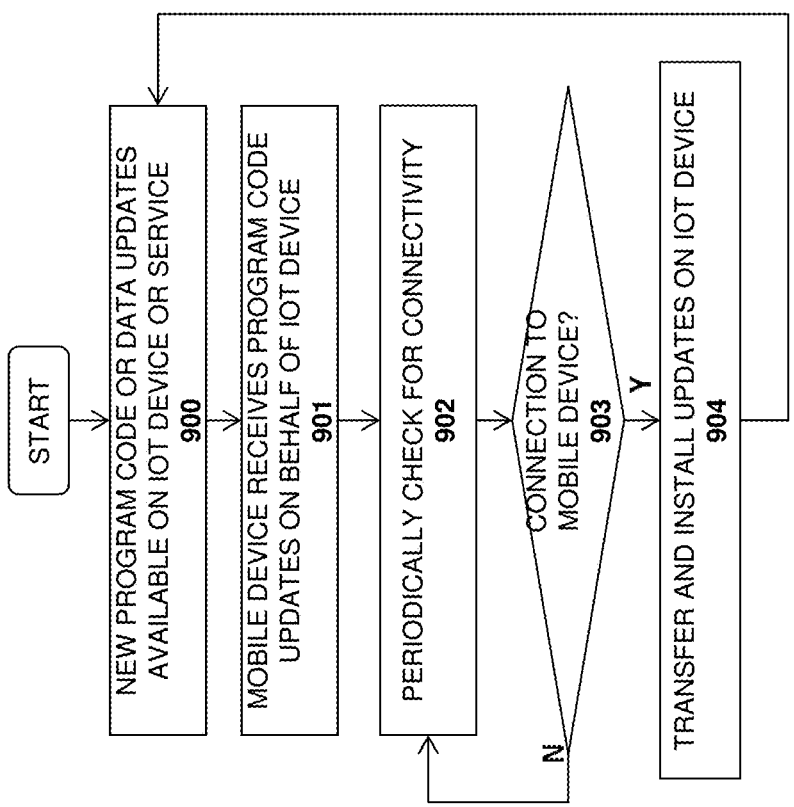
FIG. 9B illustrates an embodiment of a method in which program code and data updates are provided to the IoT device.

A method for updating an IoT device is shown in FIG. 9B. The method may be implemented within the context of the system architectures described above, but is not limited to any particular system architectures.

At 900 new program code or data updates are made available on the IoT hub and/or an external service (e.g., coupled to the mobile device over the Internet). At 901, the mobile device receives and stores the program code or data updates on behalf of the IoT device. The IoT device and/or mobile device periodically check to determine whether a connection has been established at 902. If a connection is established, determined at 903, then at 904 the updates are transferred to the IoT device and installed.

Embodiments for Improved Security

In one embodiment, the low power microcontroller 200 of each IoT device 101 and the low power logic/microcontroller 301 of the IoT hub 110 include a secure key store for storing encryption keys used by the embodiments described below (see, e.g., FIGS. 10-15 and associated text). Alternatively, the keys may be secured in a subscriber identify module (SIM) as discussed below.

Figure 10:
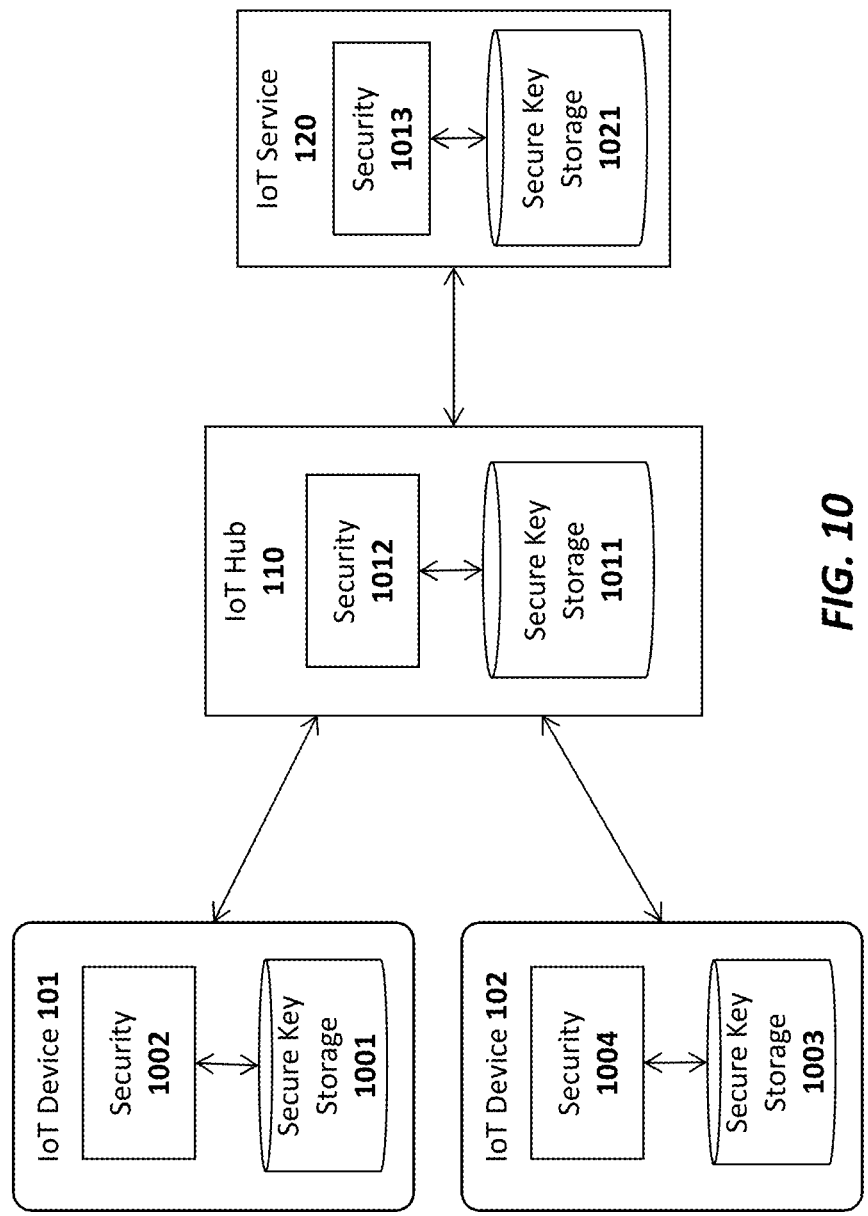
FIG. 10 illustrates a high level view of one embodiment of a security architecture.

FIG. 10 illustrates a high level architecture which uses public key infrastructure (PKI) techniques and/or symmetric key exchange/encryption techniques to encrypt communications between the IoT Service 120, the IoT hub 110 and the IoT devices 101-102.

Embodiments which use public/private key pairs will first be described, followed by embodiments which use symmetric key exchange/encryption techniques. In particular, in an embodiment which uses PKI, a unique public/private key pair is associated with each IoT device 101-102, each IoT hub 110 and the IoT service 120. In one embodiment, when a new IoT hub 110 is set up, its public key is provided to the IoT service 120 and when a new IoT device 101 is set up, it's public key is provided to both the IoT hub 110 and the IoT service 120. Various techniques for securely exchanging the public keys between devices are described below. In one embodiment, all public keys are signed by a master key known to all of the receiving devices (i.e., a form of certificate) so that any receiving device can verify the validity of the public keys by validating the signatures. Thus, these certificates would be exchanged rather than merely exchanging the raw public keys.

As illustrated, in one embodiment, each IoT device 101, 102 includes a secure key storage 1001, 1003, respectively, for security storing each device's private key. Security logic 1002, 1304 then utilizes the securely stored private keys to perform the encryption/decryption operations described herein. Similarly, the IoT hub 110 includes a secure storage 1011 for storing the IoT hub private key and the public keys of the IoT devices 101-102 and the IoT service 120; as well as security logic 1012 for using the keys to perform encryption/decryption operations. Finally, the IoT service 120 may include a secure storage 1021 for security storing its own private key, the public keys of various IoT devices and IoT hubs, and a security logic 1013 for using the keys to encrypt/decrypt communication with IoT hubs and devices. In one embodiment, when the IoT hub 110 receives a public key certificate from an IoT device it can verify it (e.g., by validating the signature using the master key as described above), and then extract the public key from within it and store that public key in it's secure key store 1011.

By way of example, in one embodiment, when the IoT service 120 needs to transmit a command or data to an IoT device 101 (e.g., a command to unlock a door, a request to read a sensor, data to be processed/displayed by the IoT device, etc) the security logic 1013 encrypts the data/command using the public key of the IoT device 101 to generate an encrypted IoT device packet. In one embodiment, it then encrypts the IoT device packet using the public key of the IoT hub 110 to generate an IoT hub packet and transmits the IoT hub packet to the IoT hub 110. In one embodiment, the service 120 signs the encrypted message with it's private key or the master key mentioned above so that the device 101 can verify it is receiving an unaltered message from a trusted source. The device 101 may then validate the signature using the public key corresponding to the private key and/or the master key. As mentioned above, symmetric key exchange/encryption techniques may be used instead of public/private key encryption. In these embodiments, rather than privately storing one key and providing a corresponding public key to other devices, the devices may each be provided with a copy of the same symmetric key to be used for encryption and to validate signatures. One example of a symmetric key algorithm is the Advanced Encryption Standard (AES), although the underlying principles of the invention are not limited to any type of specific symmetric keys.

Using a symmetric key implementation, each device 101 enters into a secure key exchange protocol to exchange a symmetric key with the IoT hub 110. A secure key provisioning protocol such as the Dynamic Symmetric Key Provisioning Protocol (DSKPP) may be used to exchange the keys over a secure communication channel (see, e.g., Request for Comments (RFC) 6063). However, the underlying principles of the invention are not limited to any particular key provisioning protocol.

Once the symmetric keys have been exchanged, they may be used by each device 101 and the IoT hub 110 to encrypt communications. Similarly, the IoT hub 110 and IoT service 120 may perform a secure symmetric key exchange and then use the exchanged symmetric keys to encrypt communications. In one embodiment a new symmetric key is exchanged periodically between the devices 101 and the hub 110 and between the hub 110 and the IoT service 120. In one embodiment, a new symmetric key is exchanged with each new communication session between the devices 101, the hub 110, and the service 120 (e.g., a new key is generated and securely exchanged for each communication session). In one embodiment, if the security module 1012 in the IoT hub is trusted, the service 120 could negotiate a session key with the hub security module 1312 and then the security module 1012 would negotiate a session key with each device 120. Messages from the service 120 would then be decrypted and verified in the hub security module 1012 before being re-encrypted for transmission to the device 101.

In one embodiment, to prevent a compromise on the hub security module 1012 a one-time (permanent) installation key may be negotiated between the device 101 and service 120 at installation time. When sending a message to a device 101 the service 120 could first encrypt/MAC with this device installation key, then encrypt/MAC that with the hub's session key. The hub 110 would then verify and extract the encrypted device blob and send that to the device.

In one embodiment of the invention, a counter mechanism is implemented to prevent replay attacks. For example, each successive communication from the device 101 to the hub 110 (or vice versa) may be assigned a continually increasing counter value. Both the hub 110 and device 101 will track this value and verify that the value is correct in each successive communication between the devices. The same techniques may be implemented between the hub 110 and the service 120. Using a counter in this manner would make it more difficult to spoof the communication between each of the devices (because the counter value would be incorrect). However, even without this a shared installation key between the service and device would prevent network (hub) wide attacks to all devices.

In one embodiment, when using public/private key encryption, the IoT hub 110 uses its private key to decrypt the IoT hub packet and generate the encrypted IoT device packet, which it transmits to the associated IoT device 101. The IoT device 101 then uses its private key to decrypt the IoT device packet to generate the command/data originated from the IoT service 120. It may then process the data and/or execute the command. Using symmetric encryption, each device would encrypt and decrypt with the shared symmetric key. If either case, each transmitting device may also sign the message with it's private key so that the receiving device can verify it's authenticity.

A different set of keys may be used to encrypt communication from the IoT device 101 to the IoT hub 110 and to the IoT service 120. For example, using a public/private key arrangement, in one embodiment, the security logic 1002 on the IoT device 101 uses the public key of the IoT hub 110 to encrypt data packets sent to the IoT hub 110. The security logic 1012 on the IoT hub 110 may then decrypt the data packets using the IoT hub's private key. Similarly, the security logic 1002 on the IoT device 101 and/or the security logic 1012 on the IoT hub 110 may encrypt data packets sent to the IoT service 120 using the public key of the IoT service 120 (which may then be decrypted by the security logic 1013 on the IoT service 120 using the service's private key). Using symmetric keys, the device 101 and hub 110 may share a symmetric key while the hub and service 120 may share a different symmetric key.

While certain specific details are set forth above in the description above, it should be noted that the underlying principles of the invention may be implemented using various different encryption techniques. For example, while some embodiments discussed above use asymmetric public/private key pairs, an alternate embodiment may use symmetric keys securely exchanged between the various IoT devices 101-102, IoT hubs 110, and the IoT service 120. Moreover, in some embodiments, the data/command itself is not encrypted, but a key is used to generate a signature over the data/command (or other data structure). The recipient may then use its key to validate the signature.

Figure 11:
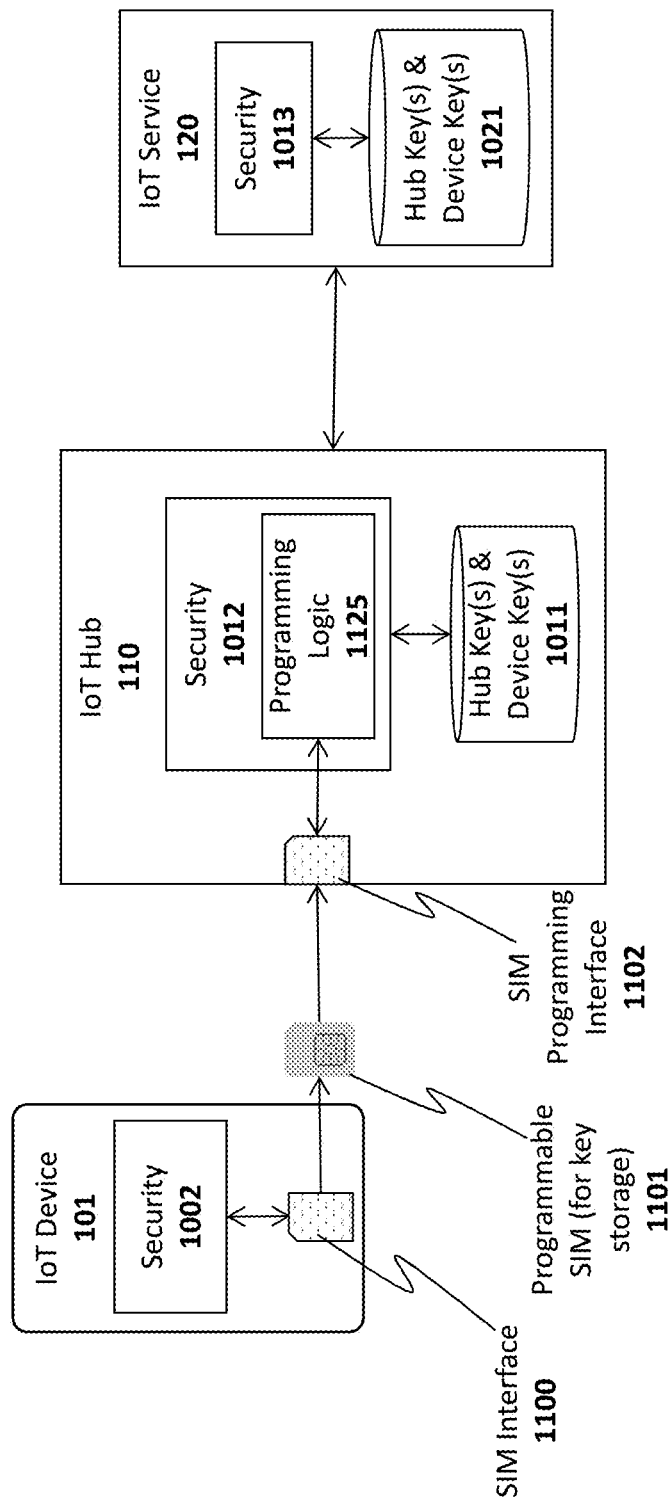
FIG. 11 illustrates one embodiment of an architecture in which a subscriber identity module (SIM) is used to store keys on IoT devices.

As illustrated in FIG. 11, in one embodiment, the secure key storage on each IoT device 101 is implemented using a programmable subscriber identity module (SIM) 1101. In this embodiment, the IoT device 101 may initially be provided to the end user with an un-programmed SIM card 1101 seated within a SIM interface 1100 on the IoT device 101. In order to program the SIM with a set of one or more encryption keys, the user takes the programmable SIM card 1101 out of the SIM interface 500 and inserts it into a SIM programming interface 1102 on the IoT hub 110. Programming logic 1125 on the IoT hub then securely programs the SIM card 1101 to register/pair the IoT device 101 with the IoT hub 110 and IoT service 120. In one embodiment, a public/private key pair may be randomly generated by the programming logic 1125 and the public key of the pair may then be stored in the IoT hub's secure storage device 411 while the private key may be stored within the programmable SIM 1101. In addition, the programming logic 525 may store the public keys of the IoT hub 110, the IoT service 120, and/or any other IoT devices 101 on the SIM card 1401 (to be used by the security logic 1302 on the IoT device 101 to encrypt outgoing data). Once the SIM 1101 is programmed, the new IoT device 101 may be provisioned with the IoT Service 120 using the SIM as a secure identifier (e.g., using existing techniques for registering a device using a SIM). Following provisioning, both the IoT hub 110 and the IoT service 120 will securely store a copy of the IoT device's public key to be used when encrypting communication with the IoT device 101.

The techniques described above with respect to FIG. 11 provide enormous flexibility when providing new IoT devices to end users. Rather than requiring a user to directly register each SIM with a particular service provider upon sale/purchase (as is currently done), the SIM may be programmed directly by the end user via the IoT hub 110 and the results of the programming may be securely communicated to the IoT service 120. Consequently, new IoT devices 101 may be sold to end users from online or local retailers and later securely provisioned with the IoT service 120.

While the registration and encryption techniques are described above within the specific context of a SIM (Subscriber Identity Module), the underlying principles of the invention are not limited to a "SIM" device. Rather, the underlying principles of the invention may be implemented using any type of device having secure storage for storing a set of encryption keys. Moreover, while the embodiments above include a removable SIM device, in one embodiment, the SIM device is not removable but the IoT device itself may be inserted within the programming interface 1102 of the IoT hub 110.

In one embodiment, rather than requiring the user to program the SIM (or other device), the SIM is pre-programmed into the IoT device 101, prior to distribution to the end user. In this embodiment, when the user sets up the IoT device 101, various techniques described herein may be used to securely exchange encryption keys between the IoT hub 110/IoT service 120 and the new IoT device 101.

Figure 12A:
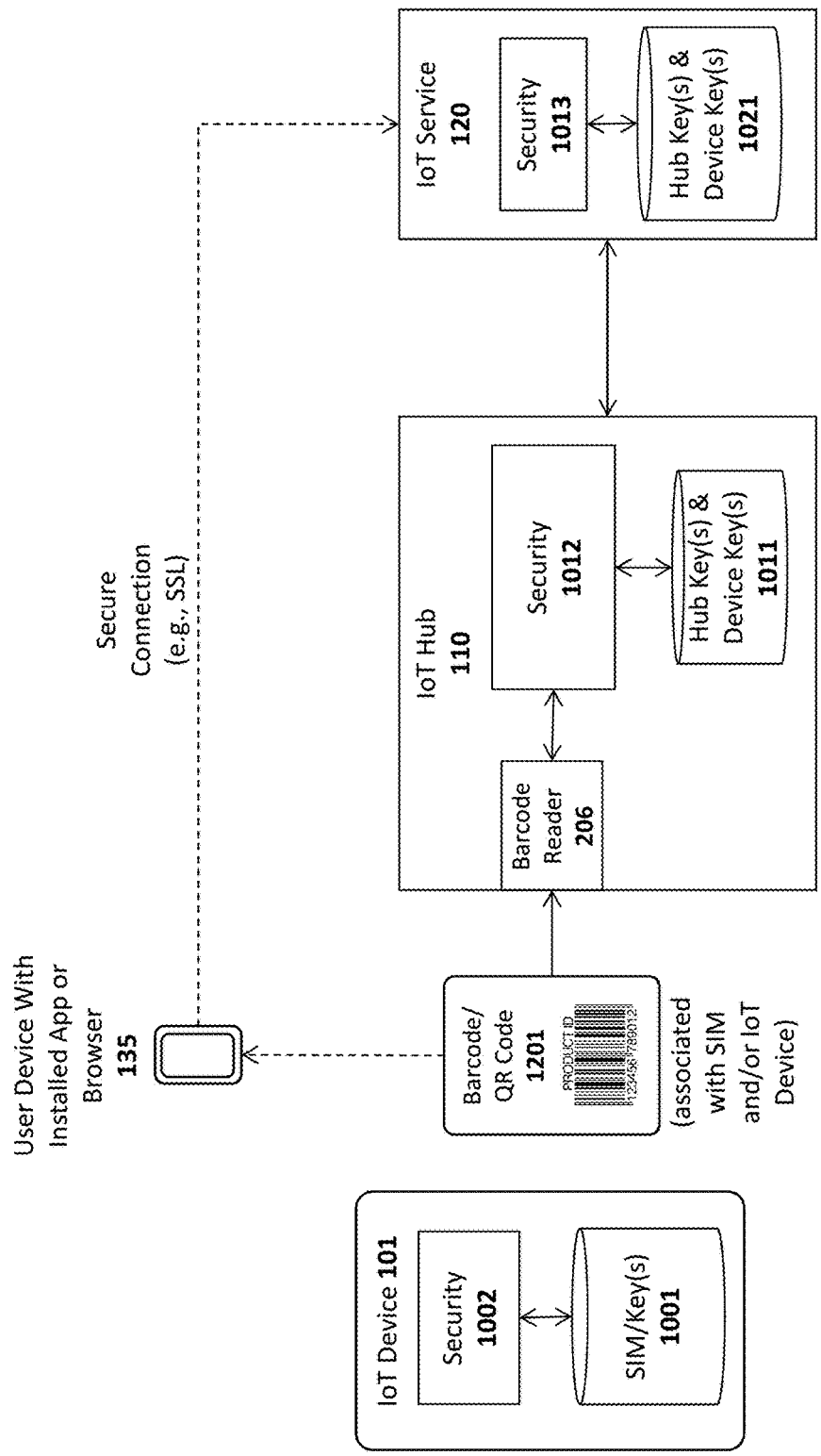
FIG. 12A illustrates one embodiment in which IoT devices are registered using barcodes or QR codes.

For example, as illustrated in FIG. 12A each IoT device 101 or SIM 401 may be packaged with a barcode or QR code 1501 uniquely identifying the IoT device 101 and/or SIM 1001. In one embodiment, the barcode or QR code 1201 comprises an encoded representation of the public key for the IoT device 101 or SIM 1001. Alternatively, the barcode or QR code 1201 may be used by the IoT hub 110 and/or IoT service 120 to identify or generate the public key (e.g., used as a pointer to the public key which is already stored in secure storage). The barcode or QR code 601 may be printed on a separate card (as shown in FIG. 12A) or may be printed directly on the IoT device itself. Regardless of where the barcode is printed, in one embodiment, the IoT hub 110 is equipped with a barcode reader 206 for reading the barcode and providing the resulting data to the security logic 1012 on the IoT hub 110 and/or the security logic 1013 on the IoT service 120. The security logic 1012 on the IoT hub 110 may then store the public key for the IoT device within its secure key storage 1011 and the security logic 1013 on the IoT service 120 may store the public key within its secure storage 1021 (to be used for subsequent encrypted communication).

In one embodiment, the data contained in the barcode or QR code 1201 may also be captured via a user device 135 (e.g., such as an iPhone or Android device) with an installed IoT app or browser-based applet designed by the IoT service provider. Once captured, the barcode data may be securely communicated to the IoT service 120 over a secure connection (e.g., such as a secure sockets layer (SSL) connection). The barcode data may also be provided from the client device 135 to the IoT hub 110 over a secure local connection (e.g., over a local WiFi or Bluetooth LE connection).

The security logic 1002 on the IoT device 101 and the security logic 1012 on the IoT hub 110 may be implemented using hardware, software, firmware or any combination thereof. For example, in one embodiment, the security logic 1002, 1012 is implemented within the chips used for establishing the local communication channel 130 between the IoT device 101 and the IoT hub 110 (e.g., the Bluetooth LE chip if the local channel 130 is Bluetooth LE). Regardless of the specific location of the security logic 1002, 1012, in one embodiment, the security logic 1002, 1012 is designed to establish a secure execution environment for executing certain types of program code. This may be implemented, for example, by using TrustZone technology (available on some ARM processors) and/or Trusted Execution Technology (designed by Intel). Of course, the underlying principles of the invention are not limited to any particular type of secure execution technology.

In one embodiment, the barcode or QR code 1501 may be used to pair each IoT device 101 with the IoT hub 110. For example, rather than using the standard wireless pairing process currently used to pair Bluetooth LE devices, a pairing code embedded within the barcode or QR code 1501 may be provided to the IoT hub 110 to pair the IoT hub with the corresponding IoT device.

Figure 12B:
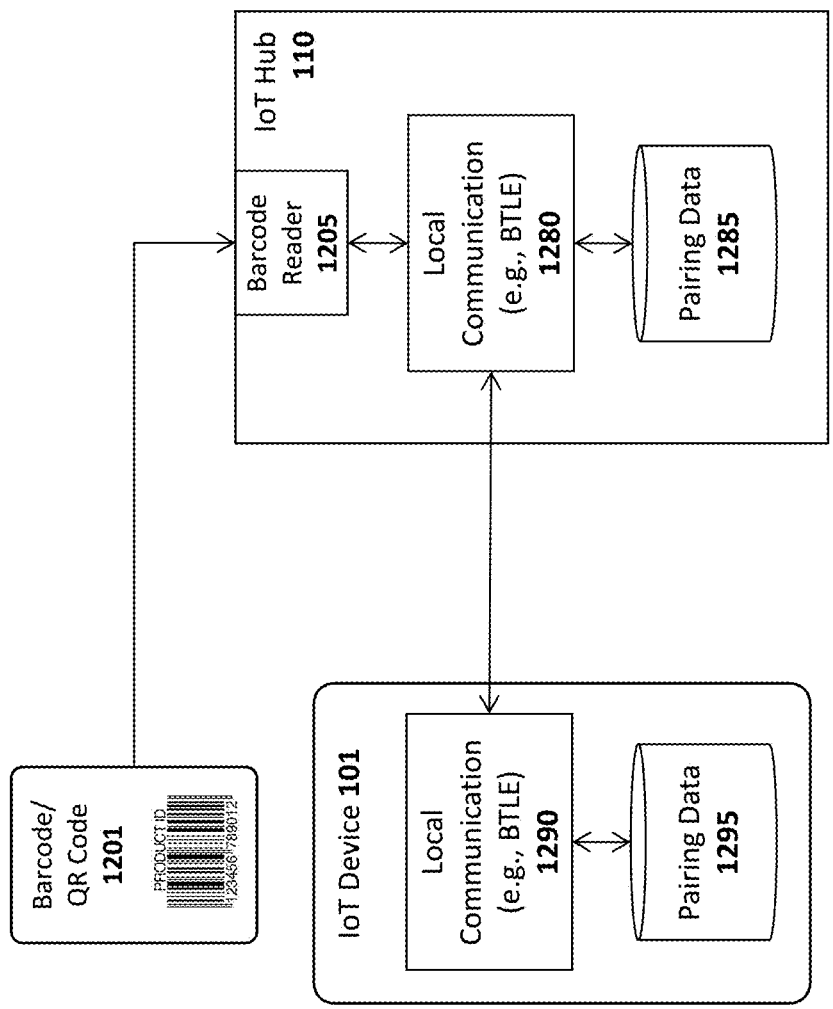
FIG. 12B illustrates one embodiment in which pairing is performed using barcodes or QR codes.

FIG. 12B illustrates one embodiment in which the barcode reader 206 on the IoT hub 110 captures the barcode/QR code 1201 associated with the IoT device 101. As mentioned, the barcode/QR code 1201 may be printed directly on the IoT device 101 or may be printed on a separate card provided with the IoT device 101. In either case, the barcode reader 206 reads the pairing code from the barcode/QR code

1201 and provides the pairing code to the local communication module 1280. In one embodiment, the local communication module 1280 is a Bluetooth LE chip and associated software, although the underlying principles of the invention are not limited to any particular protocol standard. Once the pairing code is received, it is stored in a secure storage containing pairing data 1285 and the IoT device 101 and IoT hub 110 are automatically paired. Each time the IoT hub is paired with a new IoT device in this manner, the pairing data for that pairing is stored within the secure storage 685. In one embodiment, once the local communication module 1280 of the IoT hub 110 receives the pairing code, it may use the code as a key to encrypt communications over the local wireless channel with the IoT device 101.

Similarly, on the IoT device 101 side, the local communication module 1590 stores pairing data within a local secure storage device 1595 indicating the pairing with the IoT hub. The pairing data 1295 may include the pre-programmed pairing code identified in the barcode/QR code 1201. The pairing data 1295 may also include pairing data received from the local communication module 1280 on the IoT hub 110 required for establishing a secure local communication channel (e.g., an additional key to encrypt communication with the IoT hub 110).

Thus, the barcode/QR code 1201 may be used to perform local pairing in a far more secure manner than current wireless pairing protocols because the pairing code is not transmitted over the air. In addition, in one embodiment, the same barcode/QR code 1201 used for pairing may be used to identify encryption keys to build a secure connection from the IoT device 101 to the IoT hub 110 and from the IoT hub 110 to the IoT service 120.

Figure 13:
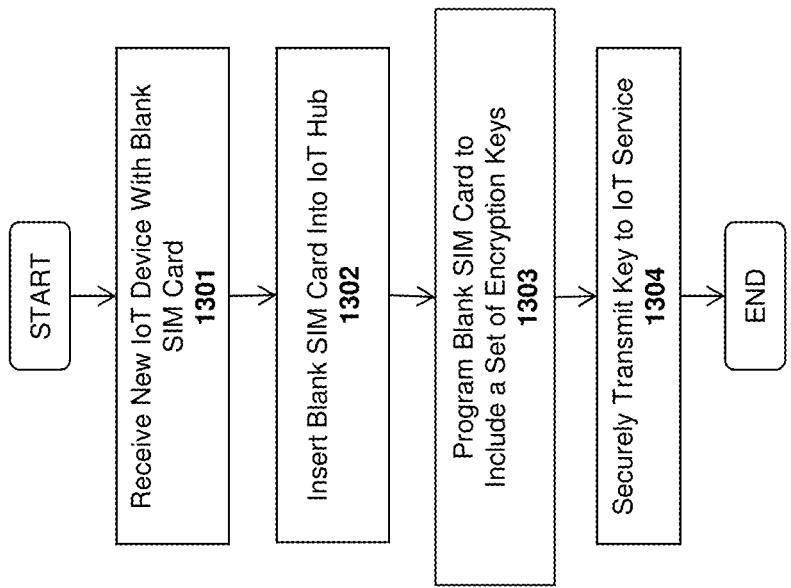
FIG. 13 illustrates one embodiment of a method for programming a SIM using an IoT hub.

A method for programming a SIM card in accordance with one embodiment of the invention is illustrated in FIG. 13. The method may be implemented within the system architecture described above, but is not limited to any particular system architecture.

At 1301, a user receives a new IoT device with a blank SIM card and, at 1602, the user inserts the blank SIM card into an IoT hub. At 1303, the user programs the blank SIM card with a set of one or more encryption keys. For example, as mentioned above, in one embodiment, the IoT hub may randomly generate a public/private key pair and store the private key on the SIM card and the public key in its local secure storage. In addition, at 1304, at least the public key is transmitted to the IoT service so that it may be used to identify the IoT device and establish encrypted communication with the IoT device. As mentioned above, in one embodiment, a programmable device other than a "SIM" card may be used to perform the same functions as the SIM card in the method shown in FIG. 13.

Figure 14:
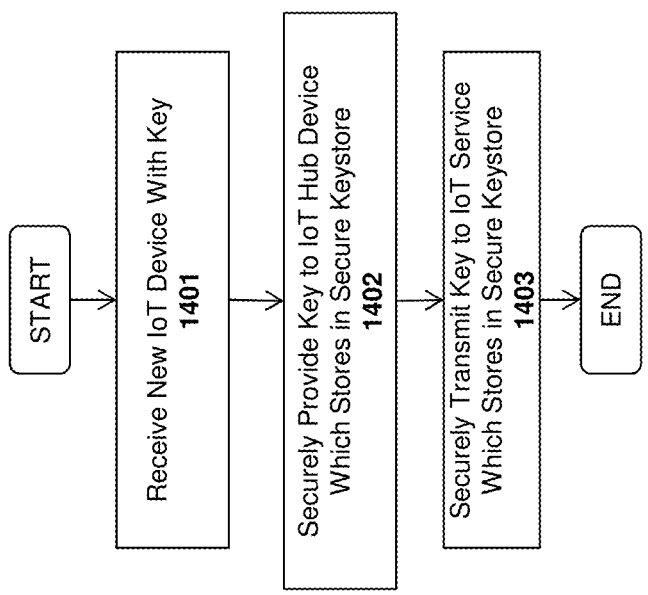
FIG. 14 illustrates one embodiment of a method for registering an IoT device with an IoT hub and IoT service.

A method for integrating a new IoT device into a network is illustrated in FIG. 14. The method may be implemented within the system architecture described above, but is not limited to any particular system architecture.

At 1401, a user receives a new IoT device to which an encryption key has been pre-assigned. At 1402, the key is securely provided to the IoT hub. As mentioned above, in one embodiment, this involves reading a barcode associated with the IoT device to identify the public key of a public/private key pair assigned to the device. The barcode may be read directly by the IoT hub or captured via a mobile device via an app or bowser. In an alternate embodiment, a secure communication channel such as a Bluetooth LE channel, a near field communication (NFC) channel or a secure WiFi channel may be established between the IoT device and the IoT hub to exchange the key. Regardless of how the key is transmitted, once received, it is stored in the secure keystore of the IoT hub device. As mentioned above, various secure execution technologies may be used on the IoT hub to store and protect the key such as Secure Enclaves, Trusted Execution Technology (TXT), and/or Trustzone. In addition, at 803, the key is securely transmitted to the IoT service which stores the key in its own secure keystore. It may then use the key to encrypt communication with the IoT device. One again, the exchange may be implemented using a certificate/signed key. Within the hub 110 it is particularly important to prevent modification/addition/removal of the stored keys.

Figure 15:
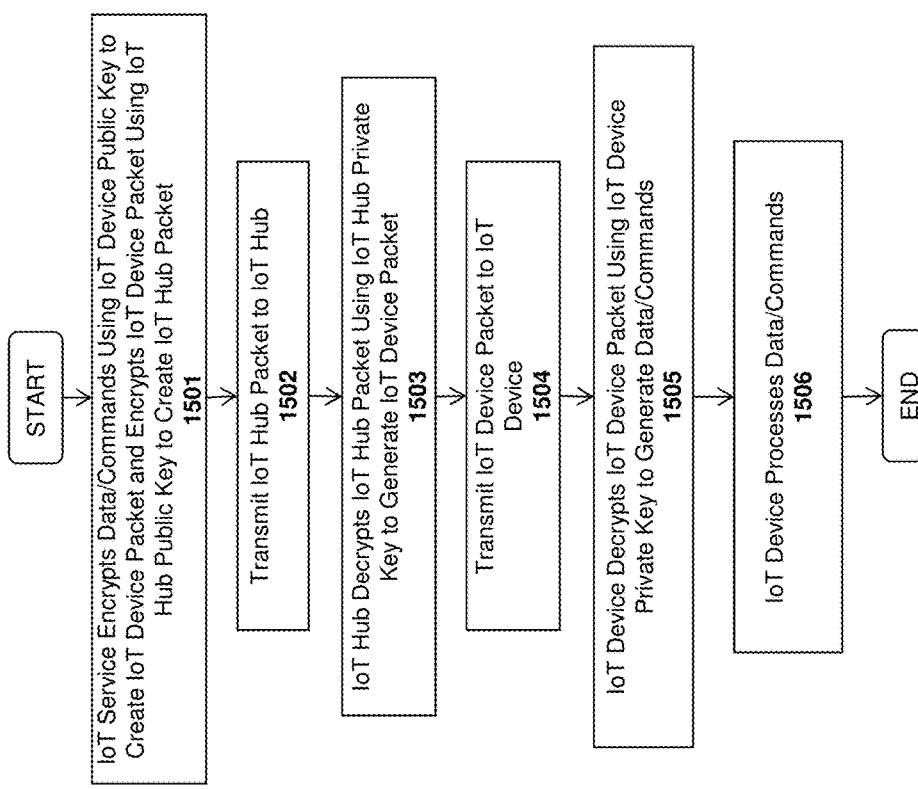
FIG. 15 illustrates one embodiment of a method for encrypting data to be transmitted to an IoT device.

A method for securely communicating commands/data to an IoT device using public/private keys is illustrated in FIG. 15. The method may be implemented within the system architecture described above, but is not limited to any particular system architecture.

At 1501, the IoT service encrypts the data/commands using the IoT device public key to create an IoT device packet. It then encrypts the IoT device packet using IoT hub's public key to create the IoT hub packet (e.g., creating an IoT hub wrapper around the IoT device packet). At 1502, the IoT service transmits the IoT hub packet to the IoT hub. At 1503, the IoT hub decrypts the IoT hub packet using the IoT hub's private key to generate the IoT device packet. At 1504 it then transmits the IoT device packet to the IoT device which, at 1505, decrypts the IoT device packet using the IoT device private key to generate the data/commands. At 1506, the IoT device processes the data/commands.

In an embodiment which uses symmetric keys, a symmetric key exchange may be negotiated between each of the devices (e.g., each device and the hub and between the hub and the service). Once the key exchange is complete, each transmitting device encrypts and/or signs each transmission using the symmetric key before transmitting data to the receiving device.

Apparatus and Method for Establishing Secure
Communication Channels in an Internet of Things
(IoT) System In one embodiment of the invention, encryption and decryption of data is performed between the IoT service 120 and each IoT device 101, regardless of the intermediate devices used to support the communication channel (e.g., such as the user's mobile device 611 and/or the IoT hub 110). One embodiment which communicates via an IoT hub 110 is illustrated in FIG. 16A and another embodiment which does not require an IoT hub is illustrated in FIG. 16B.

Figure 16A:
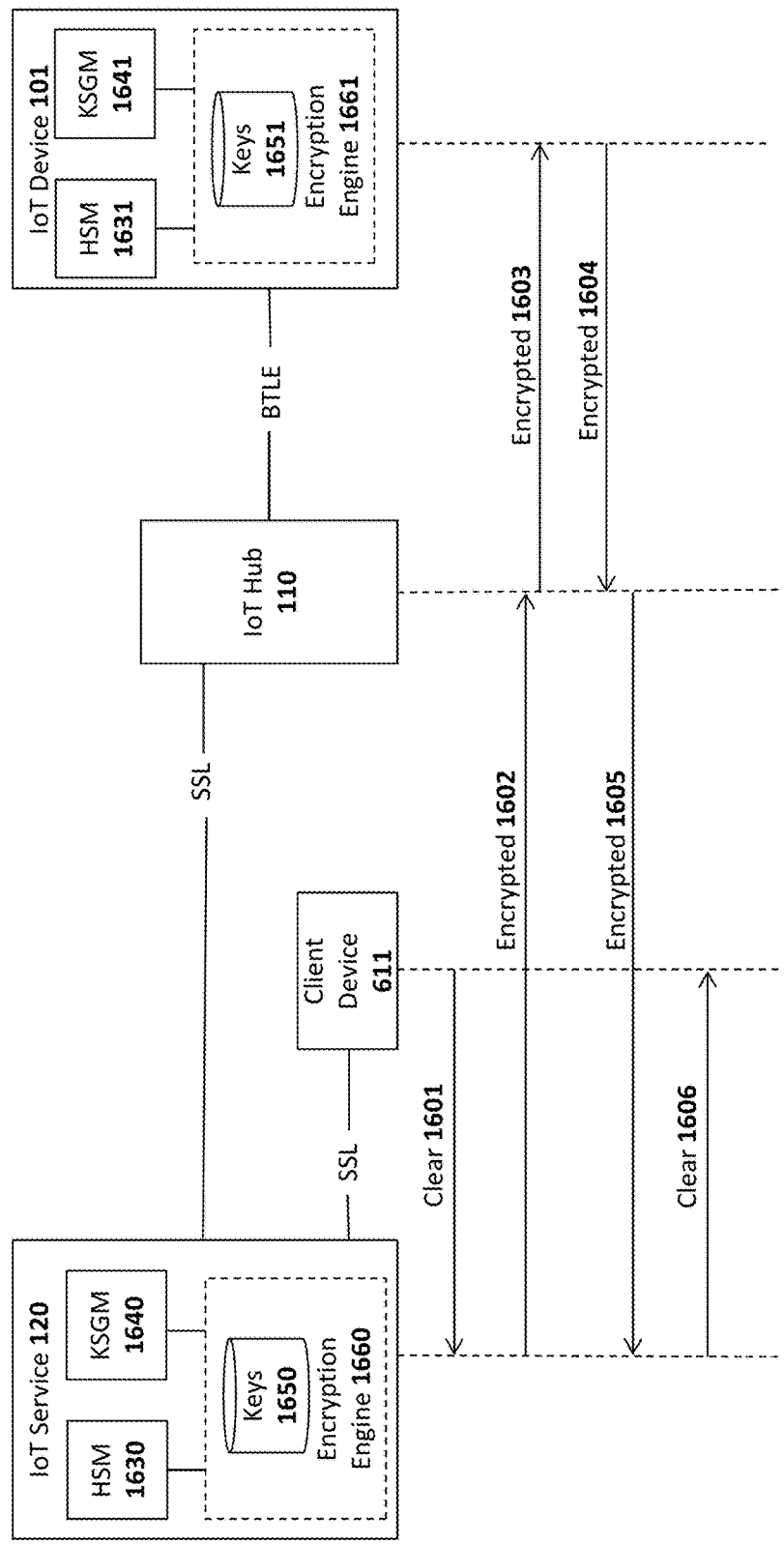
FIGS. 16A-B illustrate different embodiments of the invention for encrypting data between an IoT service and an IoT device.
Figure 16B:
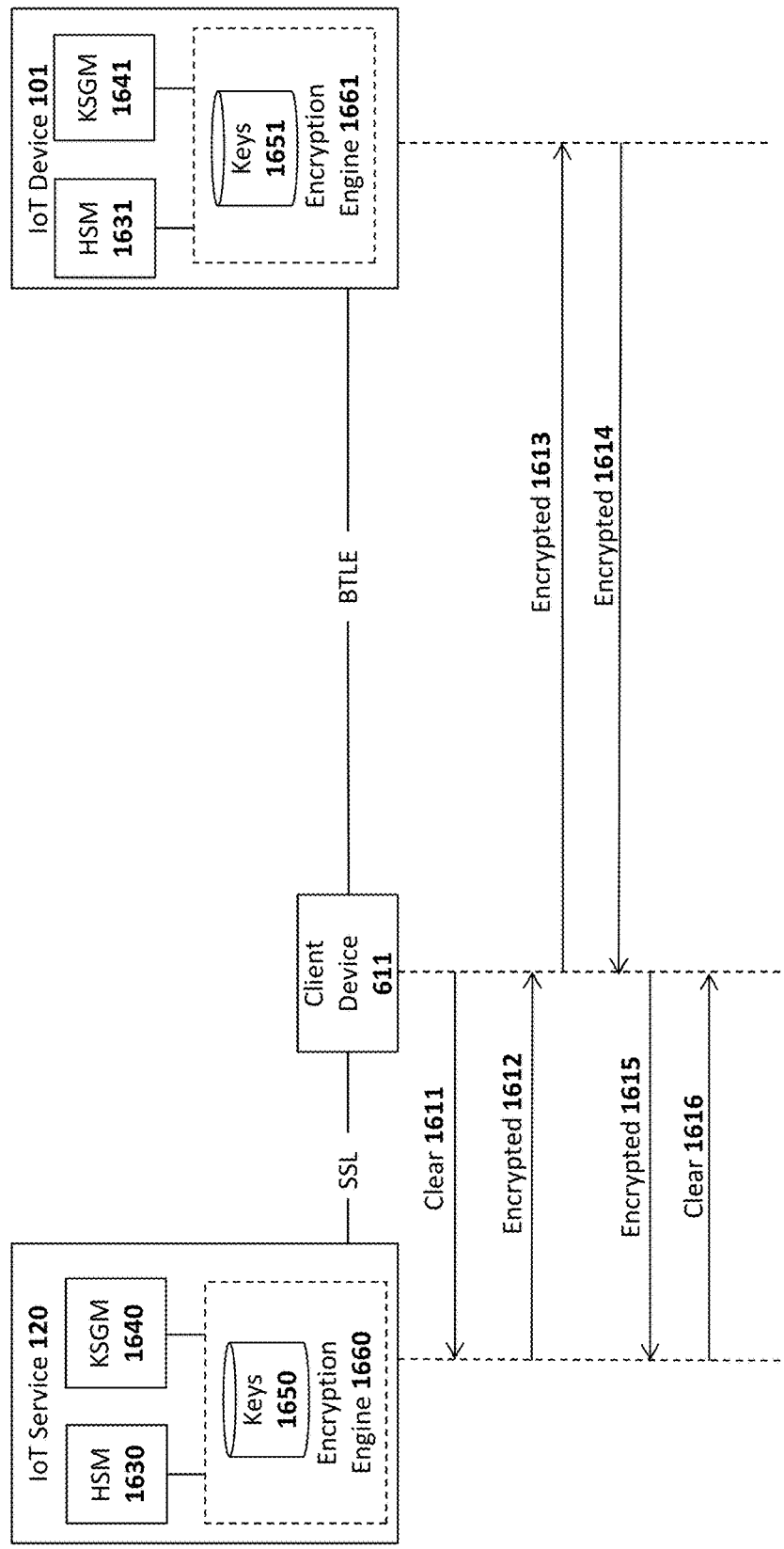

Turning first to FIG. 16A, the IoT service 120 includes an encryption engine 1660 which manages a set of "service session keys" 1650 and each IoT device 101 includes an encryption engine 1661 which manages a set of "device session keys" 1651 for encrypting/decrypting communication between the IoT device 101 and IoT service 120. The encryption engines may rely on different hardware modules when performing the security/encryption techniques described herein including a hardware security module 1630-1631 for (among other things) generating a session public/private key pair and preventing access to the private session key of the pair and a key stream generation module 1640-1641 for generating a key stream using a derived secret. In one embodiment, the service session keys 1650 and the device session keys 1651 comprise related public/private key pairs. For example, in one embodiment, the device session keys 1651 on the IoT device 101 include a public key of the IoT service 120 and a private key of the IoT device 101. As discussed in detail below, in one embodiment, to establish a secure communication session, the public/private session key pairs, 1650 and 1651, are used by each encryption engine, 1660 and 1661, respectively, to generate the same secret which is then used by the SKGMs 1640-1641 to generate a key stream to encrypt and decrypt communication between the IoT service 120 and the IoT device 101. Additional details associated with generation and use of the secret in accordance with one embodiment of the invention are provided below.

In FIG. 16A, once the secret has been generated using the keys 1650-1651, the client will always send messages to the IoT device 101 through the IoT service 120, as indicated by Clear transaction 1611. "Clear" as used herein is meant to indicate that the underlying message is not encrypted using the encryption techniques described herein. However, as illustrated, in one embodiment, a secure sockets layer (SSL) channel or other secure channel (e.g., an Internet Protocol Security (IPSEC) channel) is established between the client device 611 and IoT service 120 to protect the communication. The encryption engine 1660 on the IoT service 120 then encrypts the message using the generated secret and transmits the encrypted message to the IoT hub 110 at 1602. Rather than using the secret to encrypt the message directly, in one embodiment, the secret and a counter value are used to generate a key stream, which is used to encrypt each message packet. Details of this embodiment are described below with respect to FIG. 17.

As illustrated, an SSL connection or other secure channel may be established between the IoT service 120 and the IoT hub 110. The IoT hub 110 (which does not have the ability to decrypt the message in one embodiment) transmits the encrypted message to the IoT device at 1603 (e.g., over a Bluetooth Low Energy (BTLE) communication channel). The encryption engine 1661 on the IoT device 101 may then decrypt the message using the secret and process the message contents. In an embodiment which uses the secret to generate a key stream, the encryption engine 1661 may generate the key stream using the secret and a counter value and then use the key stream for decryption of the message packet.

The message itself may comprise any form of communication between the IoT service 120 and IoT device 101. For example, the message may comprise a command packet instructing the IoT device 101 to perform a particular function such as taking a measurement and reporting the result back to the client device 611 or may include configuration data to configure the operation of the IoT device 101.

If a response is required, the encryption engine 1661 on the IoT device 101 uses the secret or a derived key stream to encrypt the response and transmits the encrypted response to the IoT hub 110 at 1604, which forwards the response to the IoT service 120 at 1605. The encryption engine 1660 on the IoT service 120 then decrypts the response using the secret or a derived key stream and transmits the decrypted response to the client device 611 at 1606 (e.g., over the SSL or other secure communication channel).

FIG. 16B illustrates an embodiment which does not require an IoT hub. Rather, in this embodiment, communication between the IoT device 101 and IoT service 120 occurs through the client device 611 (e.g., as in the embodiments described above with respect to FIGS. 6-9B). In this embodiment, to transmit a message to the IoT device 101 the client device 611 transmits an unencrypted version of the message to the IoT service 120 at 1611. The encryption engine 1660 encrypts the message using the secret or the derived key stream and transmits the encrypted message back to the client device 611 at 1612. The client device 611 then forwards the encrypted message to the IoT device 101 at 1613, and the encryption engine 1661 decrypts the message using the secret or the derived key stream. The IoT device 101 may then process the message as described herein. If a response is required, the encryption engine 1661 encrypts the response using the secret and transmits the encrypted response to the client device 611 at 1614, which forwards the encrypted response to the IoT service 120 at 1615. The encryption engine 1660 then decrypts the response and transmits the decrypted response to the client device 611 at 1616.

Figure 17:
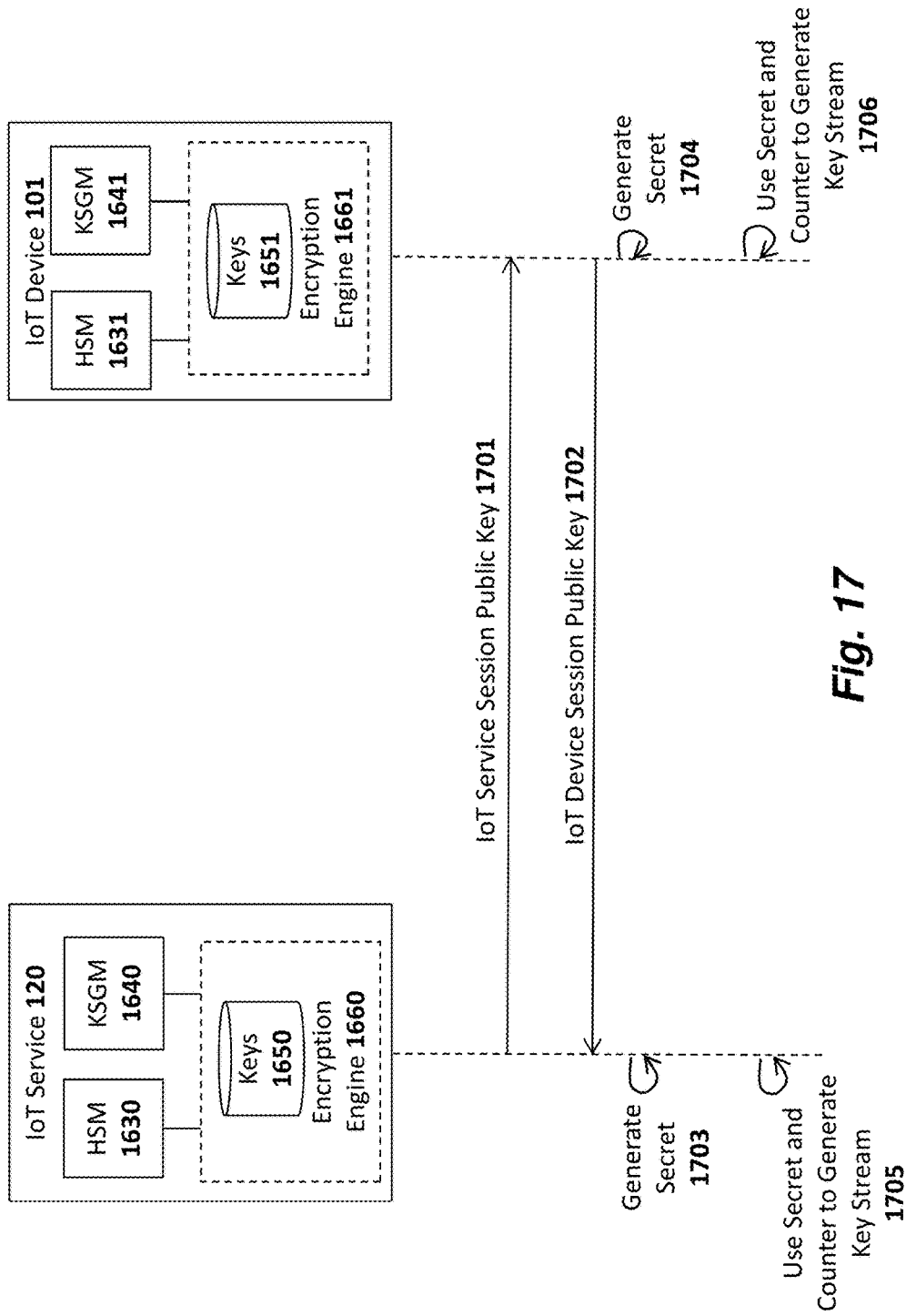
FIG. 17 illustrates embodiments of the invention for performing a secure key exchange, generating a common secret, and using the secret to generate a key stream.

FIG. 17 illustrates a key exchange and key stream generation which may initially be performed between the IoT service 120 and the IoT device 101. In one embodiment, this key exchange may be performed each time the IoT service 120 and IoT device 101 establish a new communication session. Alternatively, the key exchange may be performed and the exchanged session keys may be used for a specified period of time (e.g., a day, a week, etc). While no intermediate devices are shown in FIG. 17 for simplicity, communication may occur through the IoT hub 110 and/or the client device 611.

In one embodiment, the encryption engine 1660 of the IoT service 120 sends a command to the HSM 1630 (e.g., which may be such as a CloudHSM offered by Amazon®) to generate a session public/private key pair. The HSM 1630 may subsequently prevent access to the private session key of the pair. Similarly, the encryption engine on the IoT device 101 may transmit a command to the HSM 1631 (e.g., such as an Atecc508 HSM from Atmel Corporation®) which generates a session public/private key pair and prevents access to the session private key of the pair. Of course, the underlying principles of the invention are not limited to any specific type of encryption engine or manufacturer.

In one embodiment, the IoT service 120 transmits its session public key generated using the HSM 1630 to the IoT device 101 at 1701. The IoT device uses its HSM 1631 to generate its own session public/private key pair and, at 1702, transmits its public key of the pair to the IoT service 120. In one embodiment, the encryption engines 1660-1661 use an Elliptic curve Diffie-Hellman (ECDH) protocol, which is an anonymous key agreement that allows two parties with an elliptic curve public-private key pair, to establish a shared secret. In one embodiment, using these techniques, at 1703, the encryption engine 1660 of the IoT service 120 generates the secret using the IoT device session public key and its own session private key. Similarly, at 1704, the encryption engine 1661 of the IoT device 101 independently generates the same secret using the IoT service 120 session public key and its own session private key. More specifically, in one embodiment, the encryption engine 1660 on the IoT service 120 generates the secret according to the formula secret=IoT device session pub key*IoT service session private key, where '*' means that the IoT device session public key is point-multiplied by the IoT service session private key. The encryption engine 1661 on the IoT device 101 generates the secret according to the formula secret=IoT service session pub key*IoT device session private key, where the IoT service session public key is point multiplied by the IoT device session private key. In the end, the IoT service 120 and IoT device 101 have both generated the same secret to be used to encrypt communication as described below. In one embodiment, the encryption engines 1660-1661 rely on a hardware module such as the KSGMs 1640-1641 respectively to perform the above operations for generating the secret.

Once the secret has been determined, it may be used by the encryption engines 1660 and 1661 to encrypt and decrypt data directly. Alternatively, in one embodiment, the encryption engines 1660-1661 send commands to the KSGMs 1640-1641 to generate a new key stream using the secret to encrypt/decrypt each data packet (i.e., a new key stream data structure is generated for each packet). In particular, one embodiment of the key stream generation module 1640-1641 implements a Galois/Counter Mode (GCM) in which a counter value is incremented for each data packet and is used in combination with the secret to generate the key stream. Thus, to transmit a data packet to the IoT service 120, the encryption engine 1661 of the IoT device 101 uses the secret and the current counter value to cause the KSGMs 1640-1641 to generate a new key stream and increment the counter value for generating the next key stream. The newly-generated key stream is then used to encrypt the data packet prior to transmission to the IoT service 120. In one embodiment, the key stream is XORed with the data to generate the encrypted data packet. In one embodiment, the IoT device 101 transmits the counter value with the encrypted data packet to the IoT service 120. The encryption engine 1660 on the IoT service then communicates with the KSGM 1640 which uses the received counter value and the secret to generate the key stream (which should be the same key stream because the same secret and counter value are used) and uses the generated key stream to decrypt the data packet.

In one embodiment, data packets transmitted from the IoT service 120 to the IoT device 101 are encrypted in the same manner. Specifically, a counter is incremented for each data packet and used along with the secret to generate a new key stream. The key stream is then used to encrypt the data (e.g., performing an XOR of the data and the key stream) and the encrypted data packet is transmitted with the counter value to the IoT device 101. The encryption engine 1661 on the IoT device 101 then communicates with the KSGM 1641 which uses the counter value and the secret to generate the same key stream which is used to decrypt the data packet. Thus, in this embodiment, the encryption engines 1660-1661 use their own counter values to generate a key stream to encrypt data and use the counter values received with the encrypted data packets to generate a key stream to decrypt the data.

In one embodiment, each encryption engine 1660-1661 keeps track of the last counter value it received from the other and includes sequencing logic to detect whether a counter value is received out of sequence or if the same counter value is received more than once. If a counter value is received out of sequence, or if the same counter value is received more than once, this may indicate that a replay attack is being attempted. In response, the encryption engines 1660-1661 may disconnect from the communication channel and/or may generate a security alert.

Figure 18:
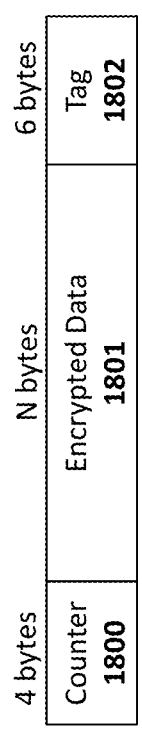
FIG. 18 illustrates a packet structure in accordance with one embodiment of the invention.

FIG. 18 illustrates an exemplary encrypted data packet employed in one embodiment of the invention comprising a 4-byte counter value 1800, a variable-sized encrypted data field 1801, and a 6-byte tag 1802. In one embodiment, the tag 1802 comprises a checksum value to validate the decrypted data (once it has been decrypted).

As mentioned, in one embodiment, the session public/private key pairs 1650-1651 exchanged between the IoT service 120 and IoT device 101 may be generated periodically and/or in response to the initiation of each new communication session.

One embodiment of the invention implements additional techniques for authenticating sessions between the IoT service 120 and IoT device 101. In particular, in one embodiment, hierarchy of public/private key pairs is used including a master key pair, a set of factory key pairs, and a set of IoT service key pairs, and a set of IoT device key pairs. In one embodiment, the master key pair comprises a root of trust for all of the other key pairs and is maintained in a single, highly secure location (e.g., under the control of the organization implementing the IoT systems described herein). The master private key may be used to generate signatures over (and thereby authenticate) various other key pairs such as the factory key pairs. The signatures may then be verified using the master public key. In one embodiment, each factory which manufactures IoT devices is assigned its own factory key pair which may then be used to authenticate IoT service keys and IoT device keys. For example, in one embodiment, a factory private key is used to generate a signature over IoT service public keys and IoT device public keys. These signature may then be verified using the corresponding factory public key. Note that these IoT service/device public keys are not the same as the "session" public/private keys described above with respect to FIGS. 16A-B. The session public/private keys described above are temporary (i.e., generated for a service/device session) while the IoT service/device key pairs are permanent (i.e., generated at the factory).

With the foregoing relationships between master keys, factory keys, service/device keys in mind, one embodiment of the invention performs the following operations to provide additional layers of authentication and security between the IoT service 120 and IoT device 101:

A. In one embodiment, the IoT service 120 initially generates a message containing the following:
  1. The IoT service's unique ID:
    The IoT service's serial number;
    a Timestamp;
    The ID of the factory key used to sign this unique ID;
    a Class of the unique ID (i.e., a service);
    IoT service's public key
    The signature over the unique ID.
  2. The Factory Certificate including:
    A timestamp
    The ID of the master key used to sign the certificate
    The factory public key
    The signature of the Factory Certificate
  3. IoT service session public key (as described above with respect to FIGS. 16A-B)
  4. IoT service session public key signature (e.g., signed with the IoT service's private key)

B. In one embodiment, the message is sent to the IoT device on the negotiation channel (described below). The IoT device parses the message and:
  1. Verifies the signature of the factory certificate (only if present in the message payload)
  2. Verifies the signature of the unique ID using the key identified by the unique ID
  3. Verifies the IoT service session public key signature using the IoT service's public key from the unique ID
  4. Saves the IoT service's public key as well as the IoT service's session public key
  5. Generates the IoT device session key pair C. The IoT device then generates a message containing the following:
  1. IoT device's unique ID
    IoT device serial number
    Timestamp
    ID of factory key used to sign this unique ID
    Class of unique ID (i.e., IoT device)

IoT device's public key

Signature of unique ID

2. IoT device's session public key
3. Signature of (IoT device session public key+IoT service session public key) signed with IoT device's key D. This message is sent back to the IoT service. The IoT service parses the message and:
 1. Verifies the signature of the unique ID using the factory public key
 2. Verifies the signature of the session public keys using the IoT device's public key
 3. Saves the IoT device's session public key E. The IoT service then generates a message containing a signature of (IoT device session public key+IoT service session public key) signed with the IoT service's key.

F. The IoT device parses the message and:
 1. Verifies the signature of the session public keys using the IoT service's public key
 2. Generates the key stream from the IoT device session private key and the IoT service's session public key
 3. The IoT device then sends a "messaging available" message.

G. The IoT service then does the following:
 1. Generates the key stream from the IoT service session private key and the IoT device's session public key
 2. Creates a new message on the messaging channel which contains the following:
 Generates and stores a random 2 byte value
 Set attribute message with the boomerang attribute Id (discussed below) and the random value H. The IoT device receives the message and:
 1. Attempts to decrypt the message
 2. Emits an Update with the same value on the indicated attribute Id I. The IoT service recognizes the message payload contains a boomerang attribute update and:
 1. Sets its paired state to true
 2. Sends a pairing complete message on the negotiator channel J. IoT device receives the message and sets his paired state to true While the above techniques are described with respect to an "IoT service" and an "IoT device," the underlying principles of the invention may be implemented to establish a secure communication channel between any two devices including user client devices, servers, and Internet services.

The above techniques are highly secure because the private keys are never shared over the air (in contrast to current Bluetooth pairing techniques in which a secret is transmitted from one party to the other). An attacker listening to the entire conversation will only have the public keys, which are insufficient to generate the shared secret. These techniques also prevent a man-in-the-middle attack by exchanging signed public keys. In addition, because GCM and separate counters are used on each device, any kind of "replay attack" (where a man in the middle captures the data and sends it again) is prevented. Some embodiments also prevent replay attacks by using asymmetrical counters.

Techniques for Exchanging Data and Commands without Formally Pairing Devices

GATT is an acronym for the Generic Attribute Profile, and it defines the way that two Bluetooth Low Energy (BTLE) devices transfer data back and forth. It makes use of a generic data protocol called the Attribute Protocol (ATT), which is used to store Services, Characteristics and related data in a simple lookup table using 16-bit Characteristic IDs for each entry in the table. Note that while the "characteristics" are sometimes referred to as "attributes."

On Bluetooth devices, the most commonly used characteristic is the devices "name" (having characteristic ID 10752 (0x2A00)). For example, a Bluetooth device may identify other Bluetooth devices within its vicinity by reading the "Name" characteristic published by those other Bluetooth devices using GATT. Thus, Bluetooth device have the inherent ability to exchange data without formally pairing/bonding the devices (note that "paring" and "bonding" are sometimes used interchangeably; the remainder of this discussion will use the term "pairing").

One embodiment of the invention takes advantage of this capability to communicate with BTLE-enabled IoT devices without formally pairing with these devices. Pairing with each individual IoT device would extremely inefficient because of the amount of time required to pair with each device and because only one paired connection may be established at a time.

Figure 19:
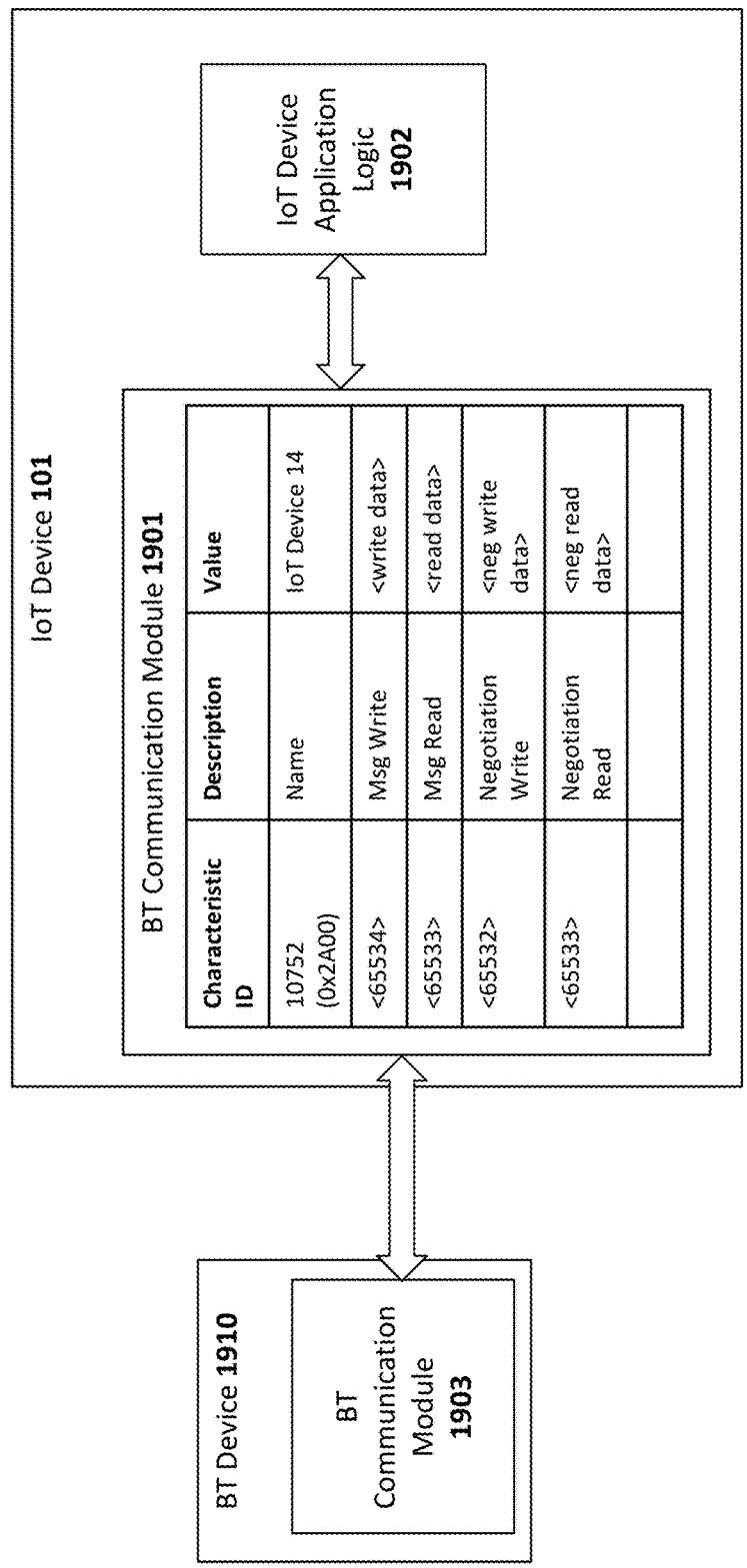
FIG. 19 illustrates techniques employed in one embodiment for writing and reading data to/from an IoT device without formally pairing with the IoT device.

FIG. 19 illustrates one particular embodiment in which a Bluetooth (BT) device 1910 establishes a network socket abstraction with a BT communication module 1901 of an IoT device 101 without formally establishing a paired BT connection. The BT device 1910 may be included in an IoT hub 110 and/or a client device 611 such as shown in FIG. 16A. As illustrated, the BT communication module 1901 maintains a data structure containing a list of characteristic IDs, names associated with those characteristic IDs and values for those characteristic IDs. The value for each characteristic may be stored within a 20-byte buffer identified by the characteristic ID in accordance with the current BT standard. However, the underlying principles of the invention are not limited to any particular buffer size.

In the example in FIG. 19, the "Name" characteristic is a BT-defined characteristic which is assigned a specific value of "IoT Device 14." One embodiment of the invention specifies a first set of additional characteristics to be used for negotiating a secure communication channel with the BT device 1910 and a second set of additional characteristics to be used for encrypted communication with the BT device 1910. In particular, a "negotiation write" characteristic, identified by characteristic ID <65532> in the illustrated example, may be used to transmit outgoing negotiation messages and the "negotiation read" characteristic, identified by characteristic ID <65533> may be used to receive incoming negotiation messages. The "negotiation messages" may include messages used by the BT device 1910 and the BT communication module 1901 to establish a secure communication channel as described herein. By way of example, in FIG. 17, the IoT device 101 may receive the IoT service session public key 1701 via the "negotiation read" characteristic <65533>. The key 1701 may be transmitted from the IoT service 120 to a BTLE-enabled IoT hub 110 or client device 611 which may then use GATT to write the key 1701 to the negotiation read value buffer identified by characteristic ID <65533>. IoT device application logic 1902 may then read the key 1701 from the value buffer identified by characteristic ID <65533> and process it as described above (e.g., using it to generate a secret and using the secret to generate a key stream, etc).

If the key 1701 is greater than 20 bytes (the maximum buffer size in some current implementations), then it may be written in 20-byte portions. For example, the first 20 bytes may be written by the BT communication module 1903 to characteristic ID <65533> and read by the IoT device application logic 1902, which may then write an acknowledgement message to the negotiation write value buffer identified by characteristic ID <65532>. Using GATT, the BT communication module 1903 may read this acknowledgement from characteristic ID <65532> and responsively write the next 20 bytes of the key 1701 to the negotiation read value buffer identified by characteristic ID <65533>. In this manner, a network socket abstraction defined by characteristic IDs <65532> and <65533> is established for exchanging negotiation messages used to establish a secure communication channel.

In one embodiment, once the secure communication channel is established, a second network socket abstraction is established using characteristic ID <65534> (for transmitting encrypted data packets from IoT device 101) and characteristic ID <65533> (for receiving encrypted data packets by IoT device). That is, when BT communication module 1903 has an encrypted data packet to transmit (e.g., such as encrypted message 1603 in FIG. 16A), it starts writing the encrypted data packet, 20 bytes at a time, using the message read value buffer identified by characteristic ID <65533>. The IoT device application logic 1902 will then read the encrypted data packet, 20 bytes at a time, from the read value buffer, sending acknowledgement messages to the BT communication module 1903 as needed via the write value buffer identified by characteristic ID <65532>.

In one embodiment, the commands of GET, SET, and UPDATE described below are used to exchange data and commands between the two BT communication modules 1901 and 1903. For example, the BT communication module 1903 may send a packet identifying characteristic ID <65533> and containing the SET command to write into the value field/buffer identified by characteristic ID <65533> which may then be read by the IoT device application logic 1902. To retrieve data from the IoT device 101, the BT communication module 1903 may transmit a GET command directed to the value field/buffer identified by characteristic ID <65534>. In response to the GET command, the BT communication module 1901 may transmit an UPDATE packet to the BT communication module 1903 containing the data from the value field/buffer identified by characteristic ID <65534>. In addition, UPDATE packets may be transmitted automatically, in response to changes in a particular attribute on the IoT device 101. For example, if the IoT device is associated with a lighting system and the user turns on the lights, then an UPDATE packet may be sent to reflect the change to the on/off attribute associated with the lighting application.

Figure 20:
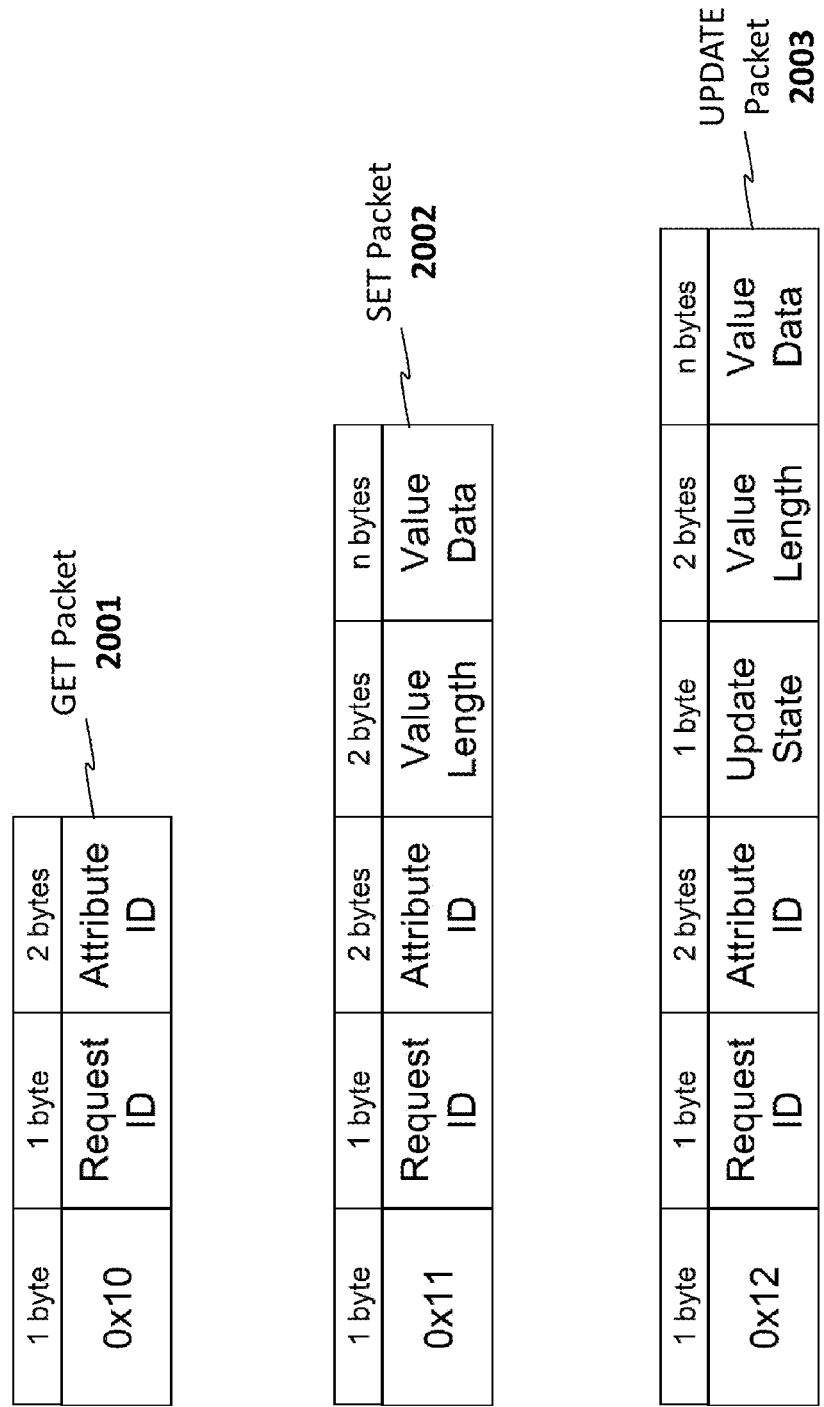
FIG. 20 illustrates an exemplary set of command packets employed in one embodiment of the invention.

FIG. 20 illustrates exemplary packet formats used for GET, SET, and UPDATE in accordance with one embodiment of the invention. In one embodiment, these packets are transmitted over the message write <65534> and message read <65533> channels following negotiation. In the GET packet 2001, a first 1-byte field includes a value (0X10) which identifies the packet as a GET packet. A second 1-byte field includes a request ID, which uniquely identifies the current GET command (i.e., identifies the current transaction with which the GET command is associated). For example, each instance of a GET command transmitted from a service or device may be assigned a different request ID. This may be done, for example, by incrementing a counter and using the counter value as the request ID. However, the underlying principles of the invention are not limited to any particular manner for setting the request ID.

A 2-byte attribute ID identifies the application-specific attribute to which the packet is directed. For example, if the GET command is being sent to IoT device 101 illustrated in FIG. 19, the attribute ID may be used to identify the particular application-specific value being requested. Returning to the above example, the GET command may be directed to an application-specific attribute ID such as power status of a lighting system, which comprises a value identifying whether the lights are powered on or off (e.g., 1=on, 0=off). If the IoT device 101 is a security apparatus associated with a door, then the value field may identify the current status of the door (e.g., 1=opened, 0=closed). In response to the GET command, a response may be transmitting containing the current value identified by the attribute ID.

The SET packet 2002 and UPDATE packet 2003 illustrated in FIG. 20 also include a first 1-byte field identifying the type of packet (i.e., SET and UPDATE), a second 1-byte field containing a request ID, and a 2-byte attribute ID field identifying an application-defined attribute. In addition, the SET packet includes a 2-byte length value identifying the length of data contained in an n-byte value data field. The value data field may include a command to be executed on the IoT device and/or configuration data to configure the operation of the IoT device in some manner (e.g., to set a desired parameter, to power down the IoT device, etc). For example, if the IoT device 101 controls the speed of a fan, the value field may reflect the current fan speed.

The UPDATE packet 2003 may be transmitted to provide an update of the results of the SET command. The UPDATE packet 2003 includes a 2-byte length value field to identify the length of the n-byte value data field which may include data related to the results of the SET command. In addition, a 1-byte update state field may identify the current state of the variable being updated. For example, if the SET command attempted to turn off a light controlled by the IoT device, the update state field may indicate whether the light was successfully turned off.

Figure 21:
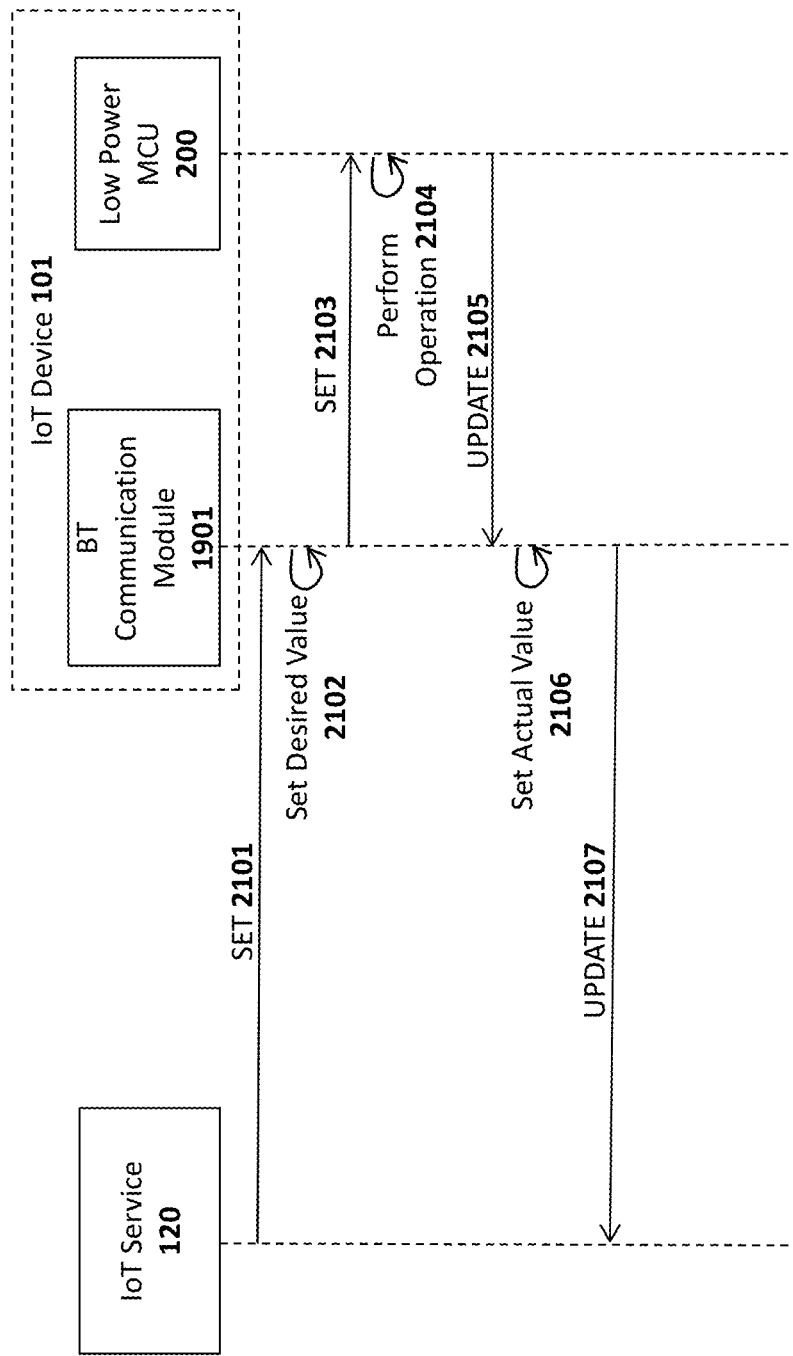
FIG. 21 illustrates an exemplary sequence of transactions using command packets.

FIG. 21 illustrates an exemplary sequence of transactions between the IoT service 120 and an IoT device 101 involving the SET and UPDATE commands. Intermediary devices such as the IoT hub and the user's mobile device are not shown to avoid obscuring the underlying principles of the invention. At 2101, the SET command 2101 is transmitted form the IoT service to the IoT device 101 and received by the BT communication module 1901 which responsively updates the GATT value buffer identified by the characteristic ID at 2102. The SET command is read from the value buffer by the low power microcontroller (MCU) 200 at 2103 (or by program code being executed on the low power MCU such as IoT device application logic 1902 shown in FIG. 19). At 2104, the MCU 200 or program code performs an operation in response to the SET command. For example, the SET command may include an attribute ID specifying a new configuration parameter such as a new temperature or may include a state value such as on/off (to cause the IoT device to enter into an "on" or a low power state). Thus, at 2104, the new value is set in the IoT device and an UPDATE command is returned at 2105 and the actual value is updated in a GATT value field at 2106. In some cases, the actual value will be equal to the desired value. In other cases, the updated value may be different (i.e., because it may take time for the IoT device 101 to update certain types of values). Finally, at 2107, the UPDATE command is transmitted back to the IoT service 120 containing the actual value from the GATT value field.

Figure 22:
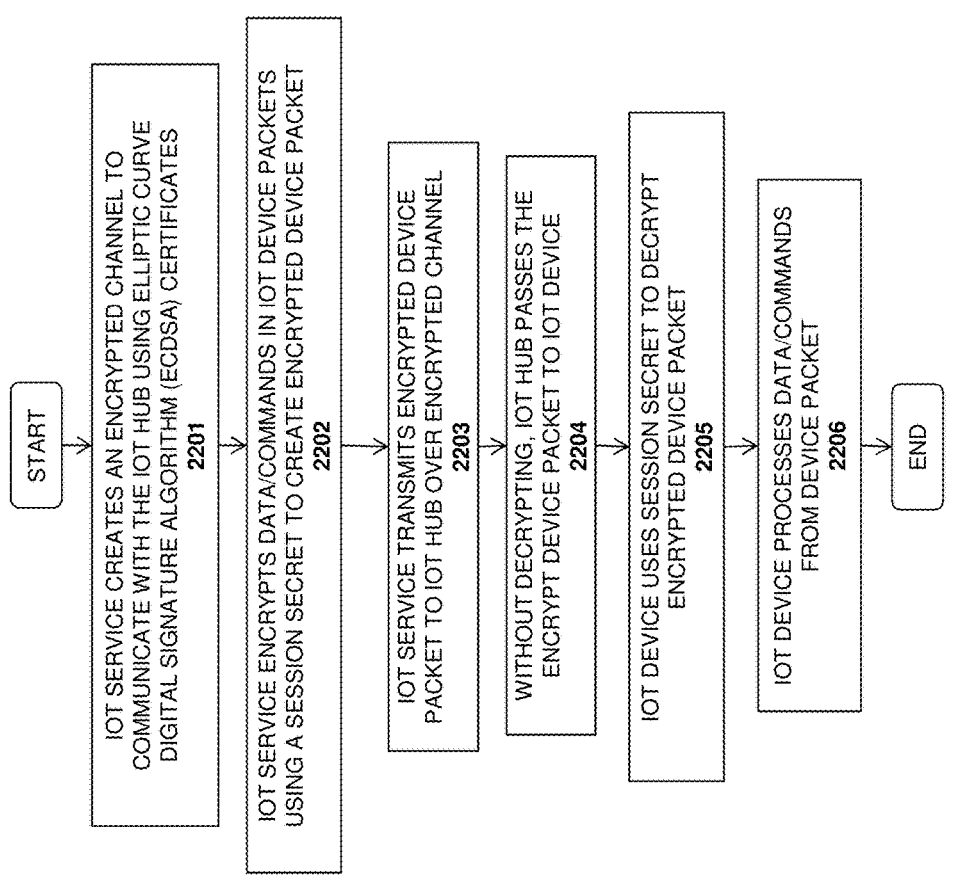
FIG. 22 illustrates a method in accordance with one embodiment of the invention.

FIG. 22 illustrates a method for implementing a secure communication channel between an IoT service and an IoT device in accordance with one embodiment of the invention.

The method may be implemented within the context of the network architectures described above but is not limited to any specific architecture.

At 2201, the IoT service creates an encrypted channel to communicate with the IoT hub using elliptic curve digital signature algorithm (ECDSA) certificates. At 2202, the IoT service encrypts data/commands in IoT device packets using the a session secret to create an encrypted device packet. As mentioned above, the session secret may be independently generated by the IoT device and the IoT service. At 2203, the IoT service transmits the encrypted device packet to the IoT hub over the encrypted channel. At 2204, without decrypting, the IoT hub passes the encrypted device packet to the IoT device. At 22-5, the IoT device uses the session secret to decrypt the encrypted device packet. As mentioned, in one embodiment this may be accomplished by using the secret and a counter value (provided with the encrypted device packet) to generate a key stream and then using the key stream to decrypt the packet. At 2206, the IoT device then extracts and processes the data and/or commands contained within the device packet.

Thus, using the above techniques, bi-directional, secure network socket abstractions may be established between two BT-enabled devices without formally pairing the BT devices using standard pairing techniques. While these techniques are described above with respect to an IoT device 101 communicating with an IoT service 120, the underlying principles of the invention may be implemented to negotiate and establish a secure communication channel between any two BT-enabled devices.

Figure 23B:
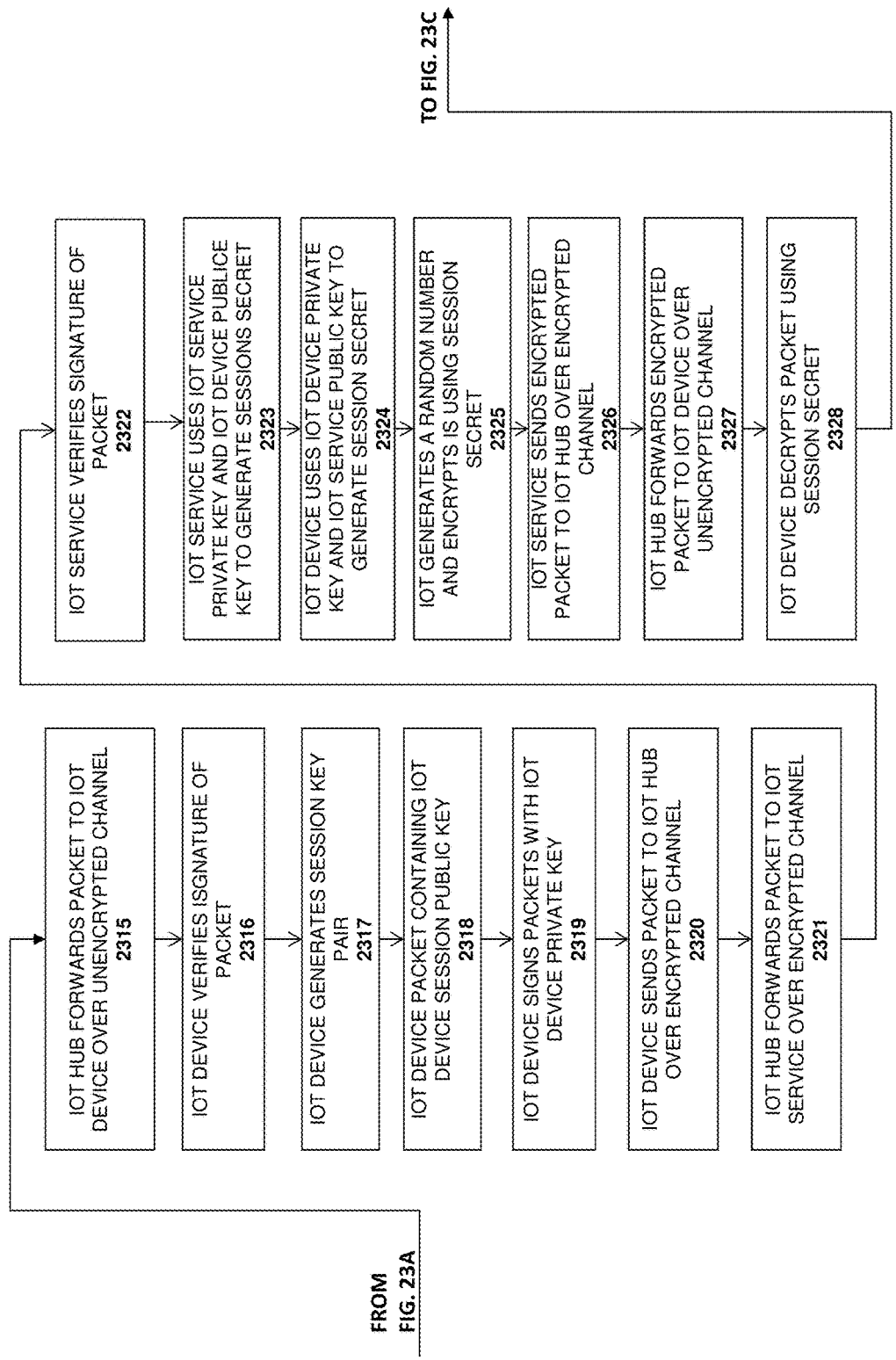
Figure 23C:
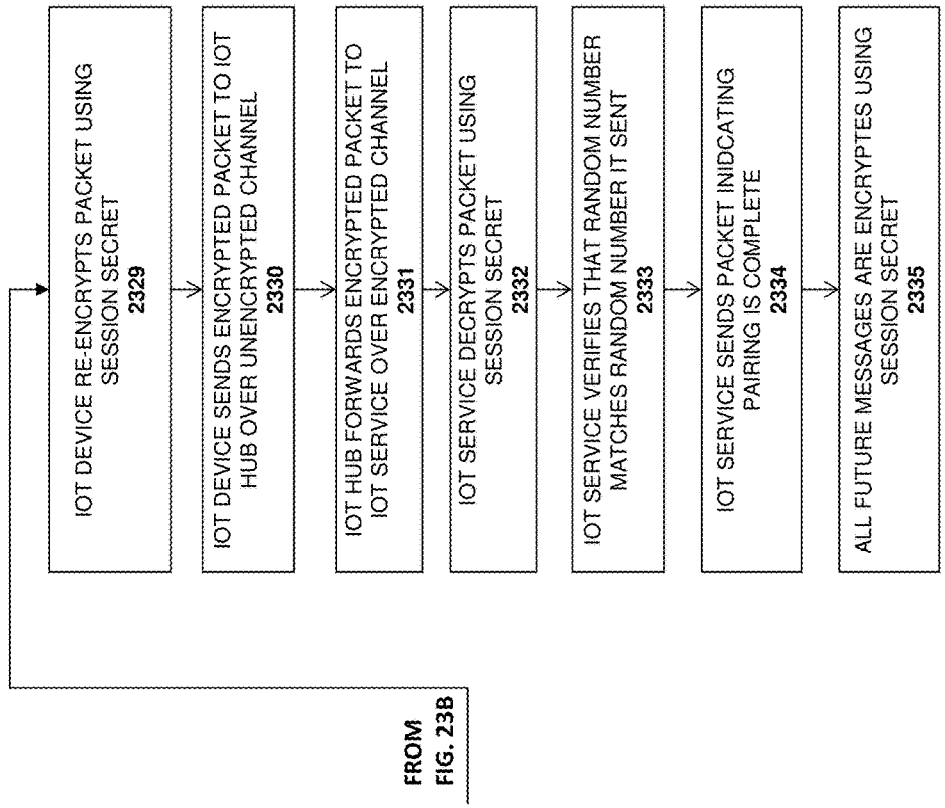

FIGS. 23A-C illustrate a detailed method for pairing devices in accordance with one embodiment of the invention. The method may be implemented within the context of the system architectures described above, but is not limited to any specific system architectures.

At 2301, the IoT Service creates a packet containing serial number and public key of the IoT Service. At 2302, the IoT Service signs the packet using the factory private key. At 2303, the IoT Service sends the packet over an encrypted channel to the IoT hub and at 2304 the IoT hub forwards the packet to IoT device over an unencrypted channel. At 2305, the IoT device verifies the signature of packet and, at 2306, the IoT device generates a packet containing the serial number and public key of the IoT Device. At 2307, the IoT device signs the packet using the factory private key and at 2308, the IoT device sends the packet over the unencrypted channel to the IoT hub.

At 2309, the IoT hub forwards the packet to the IoT service over an encrypted channel and at 2310, the IoT Service verifies the signature of the packet. At 2311, the IoT Service generates a session key pair, and at 2312 the IoT Service generates a packet containing the session public key. The IoT Service then signs the packet with IoT Service private key at 2313 and, at 2314, the IoT Service sends the packet to the IoT hub over the encrypted channel.

Turning to FIG. 23B, the IoT hub forwards the packet to the IoT device over the unencrypted channel at 2315 and, at 2316, the IoT device verifies the signature of packet. At 2317 the IoT device generates session key pair (e.g., using the techniques described above), and, at 2318, an IoT device packet is generated containing the IoT device session public key. At 2319, the IoT device signs the IoT device packet with IoT device private key. At 2320, the IoT device sends the packet to the IoT hub over the unencrypted channel and, at 2321, the IoT hub forwards the packet to the IoT service over an encrypted channel.

At 2322, the IoT service verifies the signature of the packet (e.g., using the IoT device public key) and, at 2323, the IoT service uses the IoT service private key and the IoT device public key to generate the session secret (as described in detail above). At 2324, the IoT device uses the IoT device private key and IoT service public key to generate the session secret (again, as described above) and, at 2325, the IoT device generates a random number and encrypts it using the session secret. At 2326, the IoT service sends the encrypted packet to IoT hub over the encrypted channel. At 2327, the IoT hub forwards the encrypted packet to the IoT device over the unencrypted channel. At 2328, the IoT device decrypts the packet using the session secret.

Turning to FIG. 23C, the IoT device re-encrypts the packet using the session secret at 2329 and, at 2330, the IoT device sends the encrypted packet to the IoT hub over the unencrypted channel. At 2331, the IoT hub forwards the encrypted packet to the IoT service over the encrypted channel. The IoT service decrypts the packet using the session secret at 2332. At 2333 the IoT service verifies that the random number matches the random number it sent. The IoT service then sends a packet indicating that pairing is complete at 2334 and all subsequent messages are encrypted using the session secret at 2335.

While a dedicated IoT hub 110 is illustrated in many embodiments above, a dedicated IoT hub hardware platform is not required for complying with the underlying principles of the invention. For example, the various IoT hubs described above may be implemented as software executed within various other networking devices such as iPhones® and Android® devices (e.g., an IoT device App). In fact, the IoT hubs described herein may be implemented on any device capable of communicating with IoT devices (e.g., using BTLE or other local wireless protocol) and establishing a connection over the Internet (e.g., to an IoT service using a WiFi or cellular data connection).

Interface and Method for Efficient Communication Between a Microcontroller and a Communication Module As mentioned, in one embodiment, each IoT device includes a secure communication module for establishing a secure communication channel with an IoT service and a microcontroller unit (MCU) which executes program code to perform application-specific functions (e.g., in accordance with the specific functions to be performed by the IoT device). In one embodiment, a serial communication interface is communicatively coupled between the MCU and the secure communication module.

Figure 24:
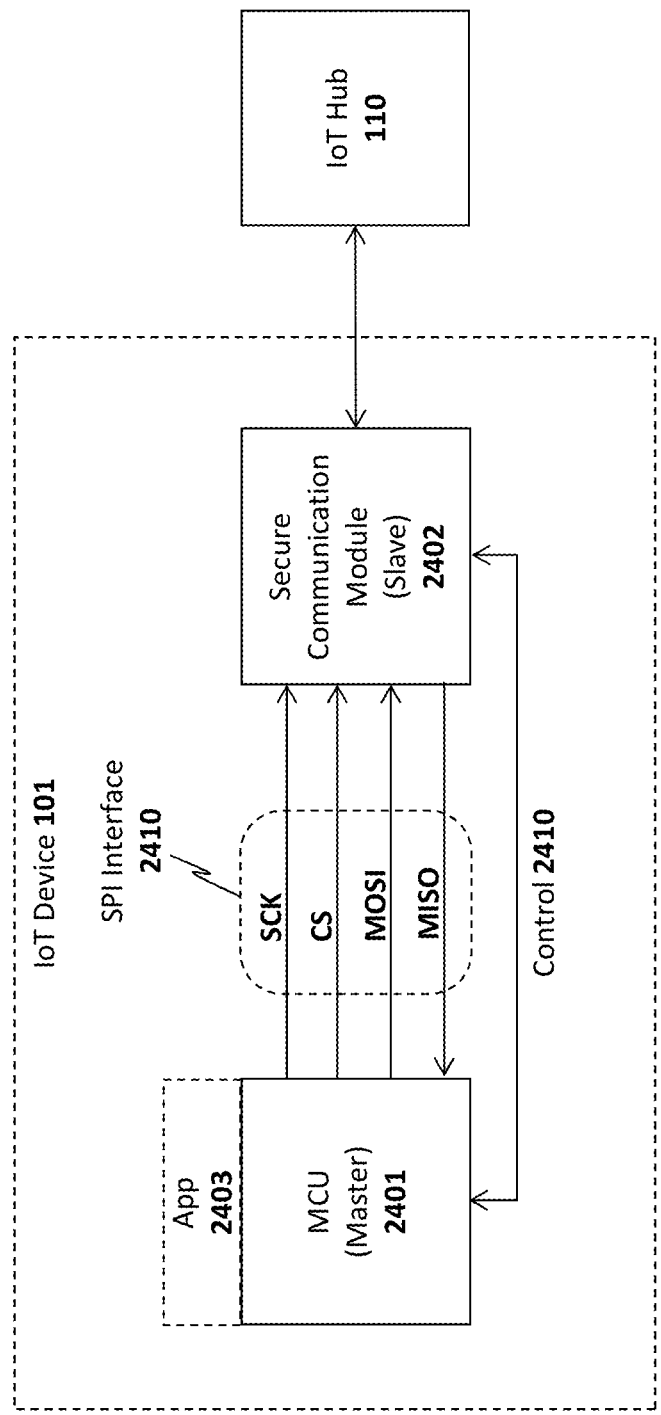
FIG. 24 illustrates one embodiment of an interface between a microcontroller unit and a secure communication module.

FIG. 24 illustrates one particular embodiment in which a serial peripheral interface (SPI) 2410 is used to provide bi-directional communication between the MCU 2401 and secure communication module 2402. An SPI interface 2410 is a synchronous serial communication interface specification used for short distance communication, primarily in embedded systems. In one embodiment, the MCU 2401 operates as the Master and the secure communication module 2402 operates as a Slave in accordance with the SPI communication protocol. Accordingly, in some embodiments described below, the MCU will simply be referred to as the "Master" and the secure communication module will be referred to as the "Slave."

As used herein the SPI interface 2410 refers to both the SPI bus lines connecting the Master 2401 with the Slave 2402 and the SPI interface circuitry on the Master and Slave (described in greater detail below). The communication bus lines of the SPI interface 2410 include a system clock (SCK) generated by the Master 2401, a chip select (CS) controlled by the Master 2401, a Master-out-Slave-In (MOSI) communication line for transmitting data from the Master 2401 to the Slave 2402 and a Master-in-Slave-out (MISO) communication line for transmitting data from the Slave 2402 to the Master 2041.

The standard SPI protocol requires the Master to initiate all communication with the Slave. Thus, to receive data from the Slave, the Master must control the chip select (CS) line and indicate to the slave that it needs data or needs to transmit data. After a period of time (which may be as much as 2 ms), when the Slave is ready to respond, it will send the data. Because of the amount of handshaking and waiting time in order to coordinate the communication between the Master and Slave, the current SPI protocol is inefficient, particularly when large amounts of data need to be streamed between the Master and the Slave.

As such, in one embodiment, a control line 2410 is added to improve the speed at which the SPI interface can be run between the Master 2401 and the Slave 2402. In particular, when either the Master 2401 or the Slave 2402 has data that needs to be transmitted to the other, it pulls the control line 2410 low, informing the other that it is ready to send data. This coordinates all of the transactions on the SPI interface 2410 in a more efficient manner because if the Slave 2402 wants to send data, it pulls the control line 2401 low and, upon seeing that the line is low, the Master 2401 initiates the transaction using the SPI interface 2410. The Slave 2402 then transmits the data. In one embodiment, the transaction is bi-directional so data can be streamed concurrently in both directions. When the transaction is complete, bother the Master 2401 and the Slave 2402 release the control line 2410, which goes high again, indicating to both the Master and Slave that either party may initiate a new transaction.

Figure 25:
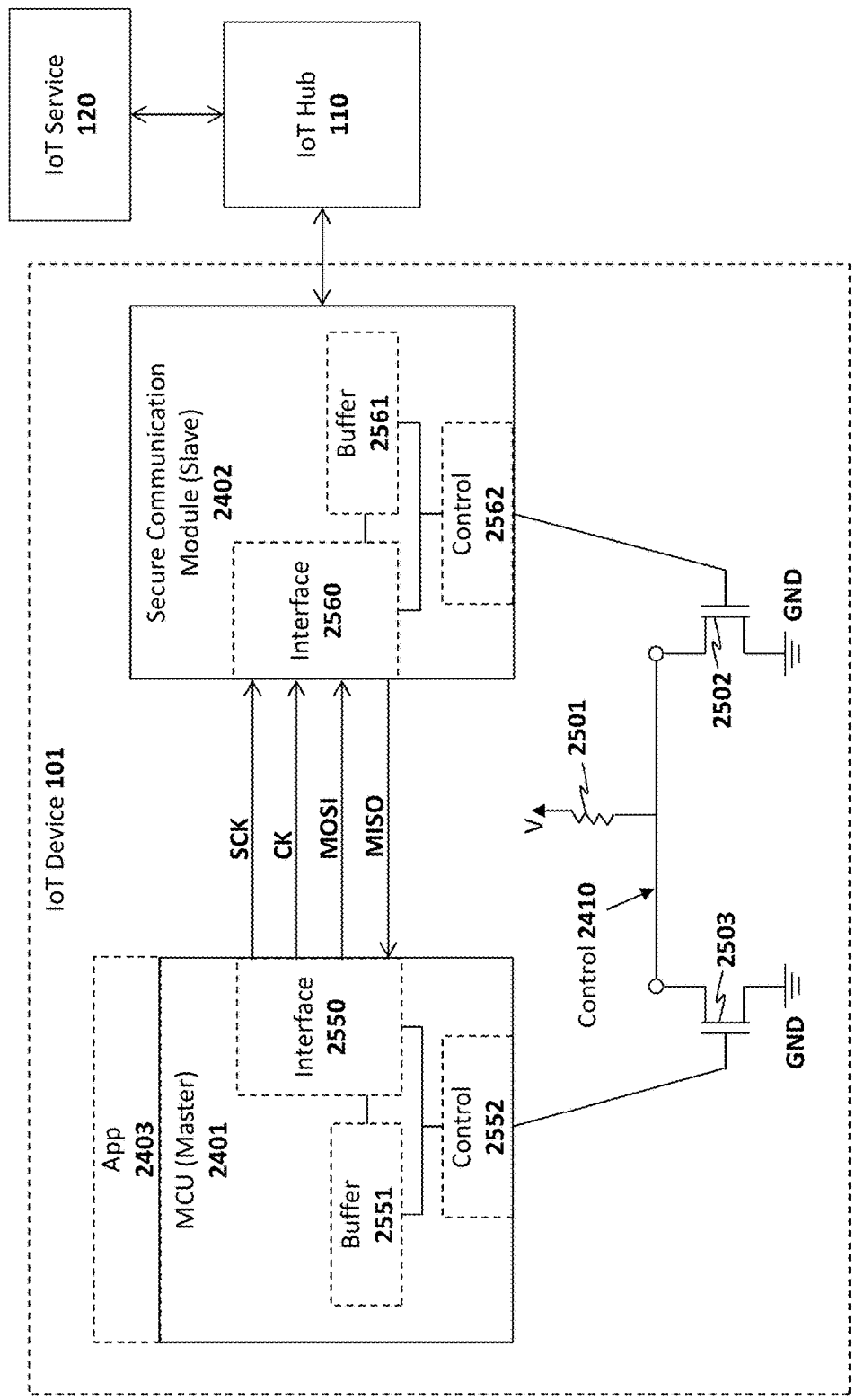
FIG. 25 illustrates additional details for an embodiment of an interface between a microcontroller unit and a secure communication module.

FIG. 25 illustrates additional details of one embodiment of the invention including interface circuitry 2550 on the Master 2401 and interface circuitry 2560 on the Slave 2402 which include components such as bus drivers to transmit and receive digital data over the MOSI and MISO bus lines. Control logic 2552, 2562 controls the communication as described above by pulling the control line 2410 low when either the Master 2401 or the Slave 2402 needs to initiate a new transaction. In the illustrated embodiment, the control logic 2562 of the Slave is electrically coupled to the base of a first transistor 2402 and the control logic 2552 of the Master 2401 is electrically coupled to the base of a second transistor 2503. The drain of each transistor is connected to ground (GND) and the source of each transistor is coupled to a pull up resistor 2501 on a line to which a voltage is supplied (V). The transistors 2502-2503 may be any type of transistors including bipolar junction transistors (BJTs) or field-effect transistors (FETs).

In operation, when neither the Master nor the Slave need to initiate a transaction, the control logic 2552 and 2562 keeps the transistors 2503 and 2502, respectively, in an off state, thereby pulling the control line 2410 high (i.e., pulled up to a voltage V). When either the Master or the Slave need to initiate a transaction, the control logic 2552, 2562 applies a voltage to the base of a respective transistor 2503, 2502, which allows current to flow through the transistor, thereby pulling the control line 2410 to ground.

Thus, either the Master 2401 or the Slave 2402 may pull the control line low, indicating that a transaction is in progress. In addition, in one embodiment, neither the Master nor the slave will attempt to initiate a transaction when the control line is pulled low, thereby ensuring coordination between the Master 2401 and Slave 2402.

In one embodiment, this coordination is used to establish a bi-directional streaming interface between the Master 2401 and the Slave 2402 operating at a significantly greater speed than current SPI interfaces. In one embodiment, the Master 2401 and Slave 2402 include small (e.g., 10 Byte) data buffers, 2551 and 2561, respectively, to buffer data streamed between the Master 2401 and the Slave 2402. Consequently, when an amount of data greater than the size of the data buffers 2551, 2561 needs to be transmitted between the Master and the Slave, the control line 2410 may be pulled and maintained low by the party initiating the transaction to ensure that the other party does not attempt to take control of the interface before the transaction is complete. For example, if the Slave 2402 has 100 Bytes to transmit to the Master 2401, it may take control by pulling the control line 2410 low, transmit the first 10 Bytes, and keep the control line low 2410 while the Master receives the first 10 Bytes. When the Master indicates that it can accept more data, the Slave 2402 transmits the next 10 Bytes. After the entire 100 Bytes of data has been provided to the Master 2401 in 10 Byte increments, the Slave 2402 releases the control line 2410 (allowing it to be pulled high) to indicate that the Master may take control. The Master may also keep the control line 2410 low while it is receiving and processing each 10 Byte buffer of data. Once it has completed receiving and processing the data, it will release the control line 2410.

In one embodiment, a general purpose input/output (GPIO) line may be shared between the Master 2401 and Slave 2402 to enable this communication. The GPIO line may operate in substantially the same manner as described above—i.e., when one party wants to enter into a transaction, it pulls the GPIO line low informing the other party that a transaction is in process.

Figure 26:
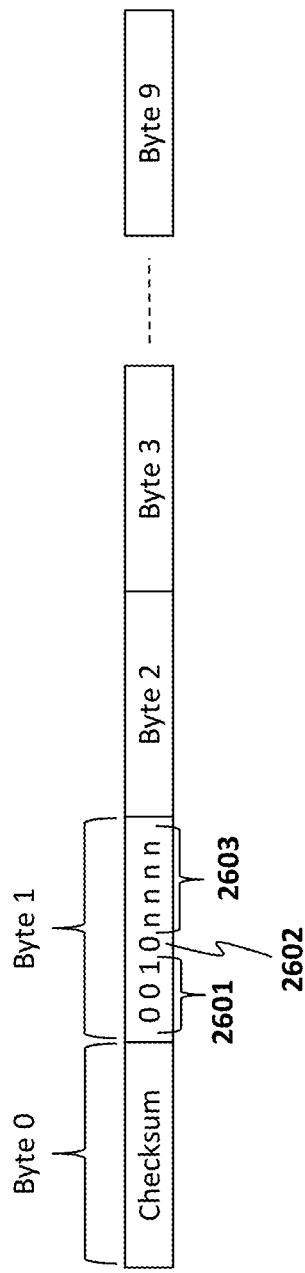
FIG. 26 illustrates a communication format employed in one embodiment of the invention.

One embodiment of the invention utilizes a special arrangement of bytes to enable bi-direction communication and signaling between the Master 2401 and the Slave 2402. FIG. 26 illustrates an exemplary 10 Byte segment, identified as Bytes 0-9, in which Bytes 0 and 1 are used for error correction and control and Bytes 2-9 are used for data. In particular, Byte 0 comprises a checksum over the Bytes 1-9, which may be used by the receiving party to detect transmission errors. For example, the receiving party may calculate its own checksum over Bytes 1-9 and compare the result with the checksum in Byte 0. If the result is the same, then it may be assumed that no errors were introduced. If the checksum is not the same, then the receiving party may request retransmission of the 10 Byte segment.

In one embodiment, Byte 1 is arranged into a predetermined sequence of bits 2601 (e.g., 001 in the example) used by the receiving party to identify the beginning of the data sequence. In one embodiment, the fourth bit 2602 is used to indicate whether the transmission is the end of a data packet. For example, in as discussed above for a data packet of 100 Bytes, the value 2602 may be set to 1 when the last 10 Bytes is transmitted. The receiving party will then know when the packet transmission is complete. In one embodiment, the next four bytes 2603 (identified as nnnn) are set to indicate the number of Bytes of valid data stored in Bytes 2-9. For example, if only Byte 2 includes valid data, then the value of 2603 may be 0001; if both Bytes 2 and 3 include valid data, then the value of 2603 may be 0010, and so on. The receiving side will then process only the valid data and ignore the rest. In one embodiment, whenever a transaction occurs between the Master and the Slave, the 10 Byte segment is transmitted in both directions (i.e., one from the Master to the Slave and one from the Slave to the Master). However, if a party has no data to send, it will simply set the nnnn value 2603 equal to 0000. If both parties have data to send then they will each send the data concurrently, and indicate the number of valid Bytes by adjusting the nnnn value 2603.

The above techniques significantly increase the speed at which current SPI interfaces are capable of running, establishing a bi-directional streaming protocol over standard SPI bus lines. Using these techniques, an application 2503 running on the MCU 2401 can efficiently stream data to the IoT service 120 and, at the same time, the IoT service can efficiently stream data to the application 2403. In addition, in one embodiment, the secure communication module 2402 establishes a secure communication channel with the IoT service 120 using the various techniques described above with respect to FIGS. 16A-23C.

Integrated Development Tool for an Internet of Things (IoT) System

One embodiment of the invention includes an integrated development tool to allow IoT developers to readily design new IoT devices, services, and client apps for end users. In particular, in one embodiment, the integrated development tool allows the developer to indicate the input/output functions to be performed by each IoT device, the GUI features to be available to end users, and the back-end functions to be performed by the IoT service. In response, the integrated development tool generates a first profile for the IoT device, a second profile for a client device app, and a third profile for the IoT service to realize an end-to-end, fully-functional IoT implementation with limited effort.

Figure 27:
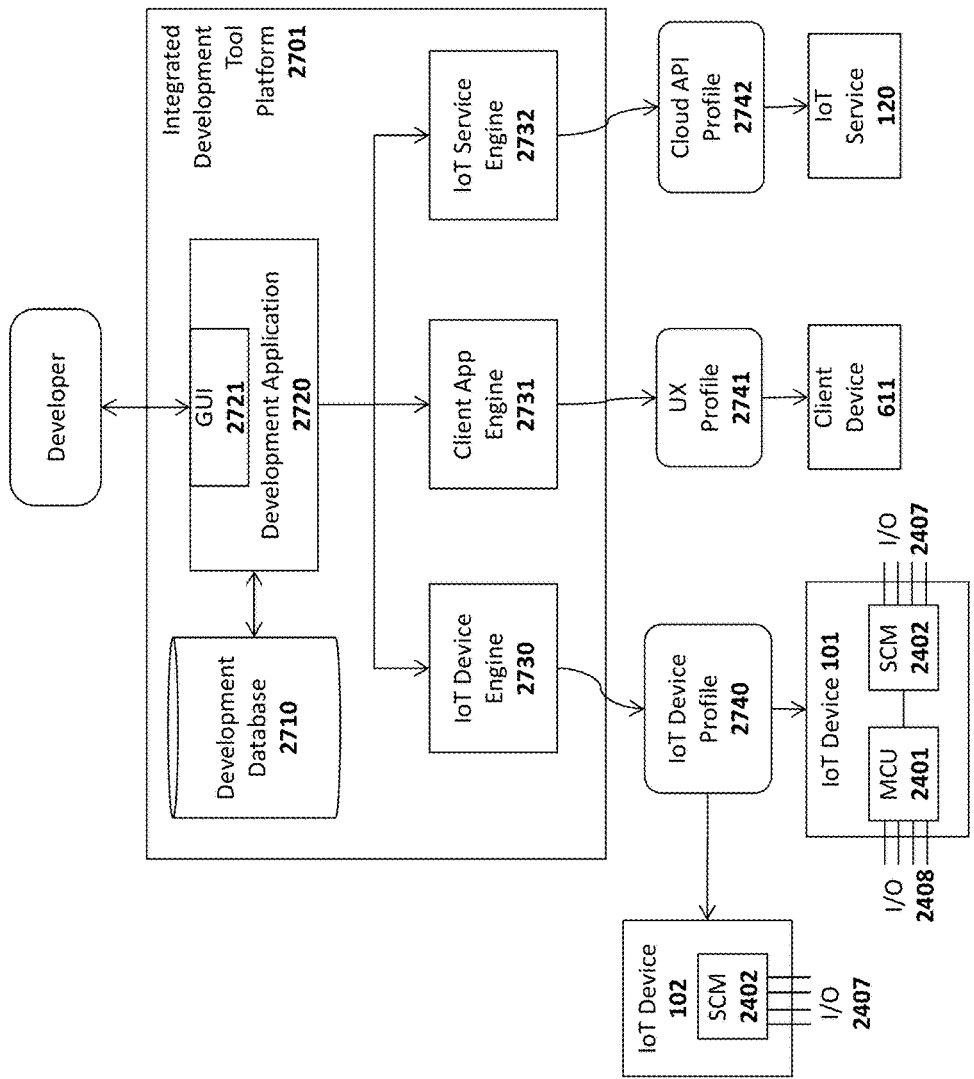
FIG. 27 illustrates an integrated development tool in accordance with one embodiment of the invention.

FIG. 27 illustrates one embodiment of an integrated development tool platform 2701 which includes a development application 2720 with a graphical user interface 2721 usable by a developer to design new IoT implementations. In one embodiment, the integrated development tool (IDT) platform 2701 comprises a computer system with a storage device and memory for storing program code of the development application 2720 and a processor for processing the program code during runtime. In addition, the various other modules illustrated in FIG. 27 (e.g., 2730-2732) may be implemented as program code executed by the processor.

A development database 2710 is loaded and continually updated with data related to different IoT device configurations, user interface features for client-side apps, and IoT service configurations. For example, the development database 2710 may include data related to different types of input/output (I/O) functions to be performed by each of the IoT devices 101-102 including, but not limited to analog-to-digital (A/D) functions (e.g., capturing an analog voltage level), digital-to-analog (D/A) functions (e.g., providing an analog voltage output), binary on/off functions (e.g., unlocking a door, triggering an alarm, turning on a light, etc), and various General Purpose I/O (GPIO) functions.

In addition, as discussed below, the developer may specify whether the IoT device 102 is to be designed with a stand-alone secure communication module 2402 or whether the IoT device 101 is to be designed with both a secure communication nodule 2402 and MCU 2401 (e.g., interconnected via an SPI interface as discussed above). A stand-alone implementation may be used for relatively simpler IoT implementations such as those which perform simple on/off functions (e.g., a switch integrated on a lightbulb) whereas the MCU implementation may be used for more complex data collection and monitoring (e.g., a remotely-controllable video camera triggered by a motion sensor).

In one embodiment, once the developer has specified the particular I/O functions to be performed by an IoT device via the development application 2720, an IoT device engine 2730 uses the configuration data provided from the development application to generate an IoT device profile 2740, specifying the configuration parameters for the secure communication module 2402. This may include, for example, the mode that the secure communication module is in, including whether the secure communication module 2402 is in a stand-alone mode or coupled to an MCU 2401. If in stand-alone mode, the IoT device profile 2740 configures the various I/O lines 2407 of the secure communication module 2402 to perform the functions required by the IoT device 102. If used with an MCU 2401, the IoT device profile 2740 may configure the I/O lines 2407 of the secure communication module 2402 and the I/O lines 2408 of the MCU and may also specify how the secure communication module 2402 is to interact with the MCU 2401 (e.g., communicating over an SPI bus to exchange data and commands with the application executed on the MCU as described above).

In one embodiment, the IoT device profile 2740 may be loaded into a non-volatile memory on the secure communication module 2402 (e.g., Flash memory) to implement the IoT functions (see, e.g., FIG. 2 showing app code 203, library code 202, and communication stack code 201 executed by the low power uC 200). In alternate embodiments, the IoT device profile 2740 may be used to configure an application-specific integrated circuit or field-programmable gate array (FPGA). The underlying principles of the invention are not limited to any particular configuration for secure communication module 2402.

In addition to configuring the IoT device, in one embodiment, once the developer has specified the particular I/O functions to be performed by an IoT device via the development application 2720, an IoT device engine 2730 uses the configuration data from the development application to generate a user experience (UX) profile 2741 to be used to implement the IoT app or application on the client device 611. The UX profile, for example, may specify various graphical I/O elements to be displayed within the GUI of the IoT app or application and the configurations to be used for those graphical I/O elements. For example, if the IoT device 102 is a light switch (or other simple on/off device such as a door lock), then the UX profile may include a simple on/off switch to control the IoT device 102. If the IoT device 101 is a video capture device then the UX profile may specify a graphical element to cause video to be displayed on the client 611 and the specific parameters for displaying the video (e.g., scaling to be used, location on the client display, etc). A virtually unlimited number of different user interface features may be specified by the UX profile while still complying with the underlying principles of the invention.

In addition, in one embodiment, an IoT service engine 2732 generates a cloud API profile 2742 to accommodate the service-side requirements of the new IoT devices 101-102. This may include, for example, the manner in which the IoT service 120 is to exchange commands and data with the new IoT devices and/or notifications to be sent to the user's client device 611 in response to data received from the IoT devices. For example, if the IoT device is a door lock, then the cloud API profile may specify that a notification is to be sent to the client device 611 whenever the door is opened and the user is not home. In addition, the cloud API profile 2742 may specify the commands to be used to control the new IoT devices. In one embodiment, the cloud API profile 2742 specifies the manner in which the IoT service 120 is to communicate with external IoT services such as the IoT services run by the designer of the new IoT devices 101-102 (e.g., exposing an API to the external IoT services).

Figure 28:
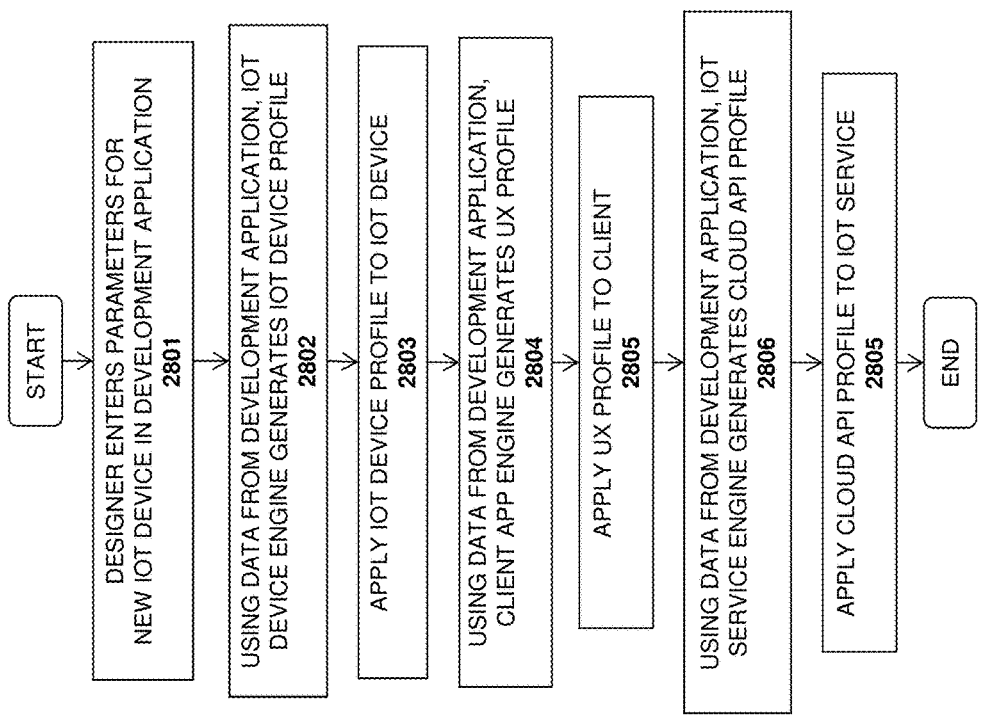
FIG. 28 illustrates a method in accordance with one embodiment of the invention.

A method implemented by an integrated development tool for an IoT system is illustrated in FIG. 28. The method may be implemented within the context of the system architectures described above, but is not limited to any particular system architecture.

At 2801, the designer enters parameters for the new IoT device via the GUI of the development application. This may include, for example, the I/O functions to be performed by the IoT device and the manner in which the IoT device is to interact with the IoT service. At 2802, using data from the development application, the IoT device engine generates an IoT device profile. In addition to the I/O function specification, this may include an indication as to whether the secure communication module is in stand-alone mode or used with an MCU. At 2803, the IoT device profile is applied to the IoT device. In one embodiment, this involves copying the program code to a non-volatile storage on the IoT device.

At 2804, using data from the development application, the client app engine generates a UX profile specifying (among other things) the user interface to be displayed on the client when interacting with the new IoT devices. At 2805, the UX profile is applied to the client.

At 2806, using data from the development application, the IoT service engine generates a cloud API profile specifying the manner in which the IoT service is to interoperate with the new IoT devices, the client device and/or any external IoT services. For example, as described above, the IoT service may expose an API to enable communication with one or more external IoT services. At 2805, the cloud API profile is applied to the IoT cloud service.

Thus, using the integrated development techniques described herein, a developer can concurrently program a new IoT device, an IoT service, and a user app, thereby saving a significant amount of time and effort compared with current implementations in which each component must be independently programmed and configured.

ce and/or installing a software update on the IoT device.

System and Method for Managing Internet of Things (IoT) Devices and Traffic Using Attribute Classes Different IoT devices may be used to perform different functions in a given location. For example, certain IoT devices may be used to collect data such as temperature and status (e.g., on/off status) and report this data back to the IoT service, where it may be accessed by an end user and/or used to generate various types of alert conditions. To enable this implementation, one embodiment of the invention manages collected data, system data, and other forms of data using different types of attribute classes.

Figure 29:
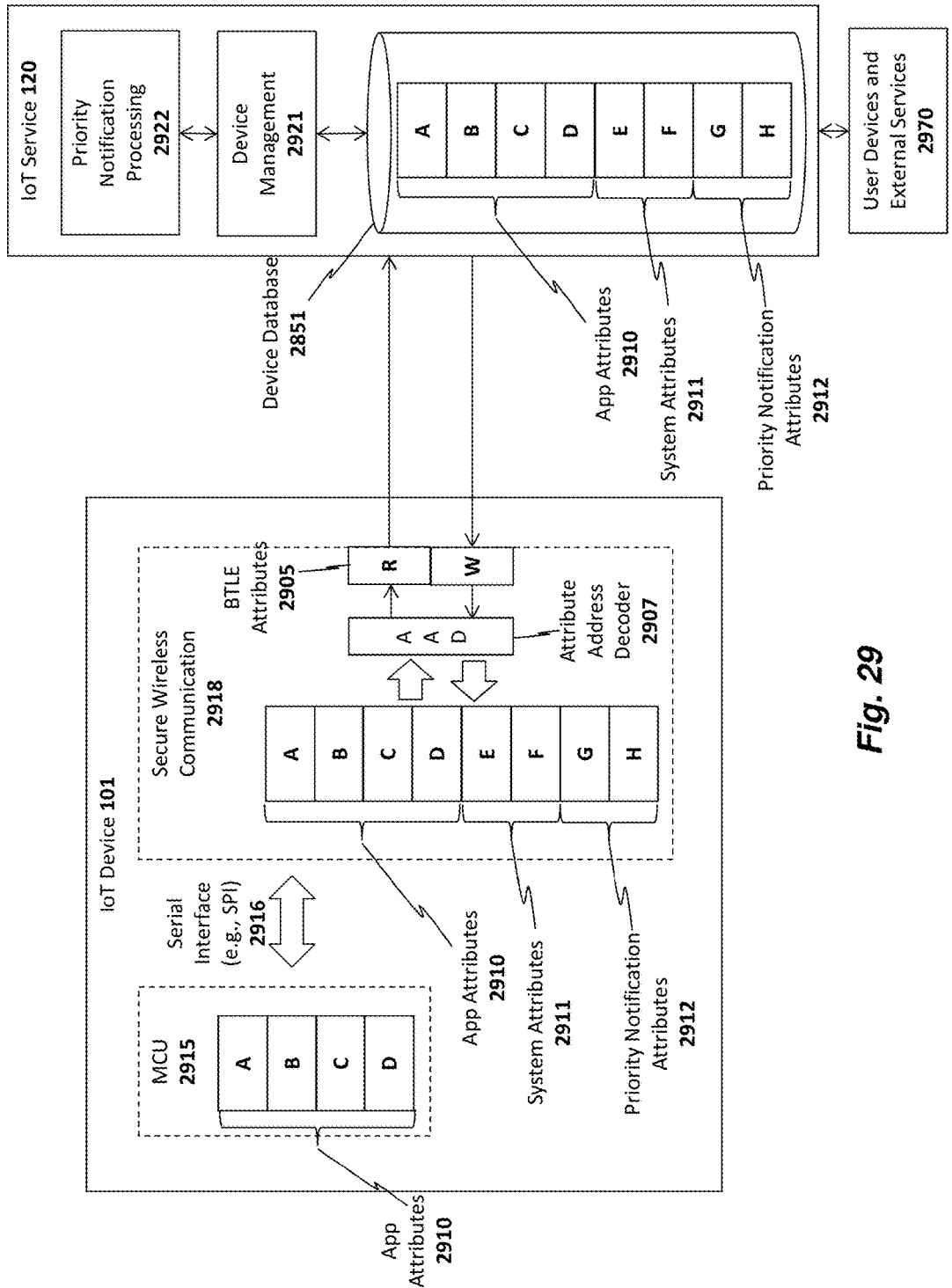
FIG. 29 illustrates one embodiment in which different types of attributes are utilized and synchronized between an IoT device and IoT service.

FIG. 29 illustrates one embodiment of an IoT device which includes a secure wireless communication module 2918 which communicates with a microcontroller unit (MCU) 2915 over a serial interface 2916 such as an Serial Peripheral Interface (SPI) bus. The secure wireless communication module 2918 manages the secure communication with the IoT service 120 using the techniques described above and the MCU 2915 executes program code to perform an application-specific function of the IoT device 101.

In one embodiment, various different classes of attributes are used to manage the data collected by the IoT device and the system configuration related to the IoT device. In particular, in the example shown in FIG. 29, the attributes include application attributes 2910, system attributes 2911, and priority notification attributes 2912. In one embodiment, the application attributes 2910 comprise attributes related to the application-specific function performed by the IoT device 101. For example, if the IoT device comprises a security sensor, then the application attributes 2910 may include a binary value indicating whether a door or window has been opened. If the IoT device comprises a temperature sensor, then the application attributes 2910 may include a value indicating a current temperature. A virtually unlimited number of other application-specific attributes may be defined. In one embodiment, the MCU 2915 executes application-specific program code and is only provided with access to the application-specific attributes 2910. For example, an application developer may purchase the IoT device 101 with the secure wireless communication module 2918 and design application program code to be executed by the MCU 2915. Consequently, the application developer will need to have access to application attributes but will not need to have access to the other types of attributes described below.

In one embodiment, the system attributes 2911 are used for defining operational and configuration attributes for the IoT device 101 and the IoT system. For example, the system attributes may include network configuration settings (e.g., such as the flow control parameters discussed above), the device ID, software versions, advertising interval selection, security implementation features (as described above) and various other low level variables required to allow the IoT device 101 to securely communicate with the IoT service.

In one embodiment, a set of priority notification attributes 2912 are defined based on a level of importance or severity associated with those attributes. For example, if a particular attribute is associated with a hazardous condition such as a temperature value reaching a threshold (e.g., when the user accidentally leaves the stove on or when a heat sensor in the user's home triggers) then this attribute may be assigned to a priority notification attribute class. As mentioned above, priority notification attributes may be treated differently than other attributes. For example, when a particular priority notification attribute reaches a threshold, the IoT hub may pass the value of the attribute to the IoT service, regardless of the current flow control mechanisms being implemented by the IoT hub. In one embodiment, the priority notification attributes may also trigger the IoT service to generate notifications to the user and/or alarm conditions within the user's home or business (e.g., to alert the user of a potentially hazardous condition).

As illustrated in FIG. 29, in one embodiment, the current state of the application attributes 2910, system attributes 2911 and priority notification attributes 2912 are duplicated/mirrored within the device database 2851 on the IoT service 120. For example, when a change in one of the attributes is updated on the IoT device 101, the secure wireless communication module 2918 communicates the change to the device management logic 2921 on the IoT service 120, which responsively updates the value of the attribute within the device database 2851. In addition, when a user updates one of the attributes on the IoT service (e.g., adjusting a current state or condition such as a desired temperature), the attribute change will be transmitted from the device management logic 2921 to the secure wireless communication module 2918 which will then update its local copy of the attribute. In this way, the attributes are maintained in a consistent manner between the IoT device 101 and the IoT service 120. The attributes may also be accessed from the IoT service 120 via a user device with an IoT app or application installed and/or by one or more external services 2970. As mentioned, the IoT service 120 may expose an application programming interface (API) to provide access to the various different classes of attributes.

In addition, in one embodiment, priority notification processing logic 2922 may perform rule-based operations in response to receipt of a notification related to a priority notification attribute 2912. For example, if a priority notification attribute indicates a hazardous condition (e.g., such as an iron or stove being left on by the user), then the priority notification processing logic 2922 may implement a set of rules to attempt to turn off the hazardous device (e.g., sending an "off" command to the device if possible). In one embodiment, the priority notification processing logic 2922 may utilize other related data such as the current location of the user to determine whether to turn off the hazardous device (e.g., if the user is detected leaving the home when the hazardous device in an "on" state). In addition, the priority notification processing logic 2922 may transmit an alert condition to the user's client device to notify the user of the condition. Various other types of rule sets may be implemented by the priority notification processing logic 2922 to attempt to address a potentially hazardous or otherwise undesirable condition.

Also shown in FIG. 29 is a set of BTLE attributes 2905 and an attribute address decoder 2907. In one embodiment, the BTLE attributes 2905 may be used to establish the read and write ports as described above with respect to FIGS. 19-20. The attribute address decoder 2907 reads a unique ID code associated with each attribute to determine which attribute is being received/transmitted and process the attribute accordingly (e.g., identify where the attribute is stored within the secure wireless communication module 2918).

Integrated Development Platform with Advanced Preview Functionality

One embodiment of the invention generates a preview of client device and IoT device functionality from within the integrated development application. In particular, one embodiment allows developers to preview a user interface defined within the development application (e.g., the UX profile 2741 discussed above) including different attribute definitions on all mobile apps where they are logged in with the same user account.

Figure 30:
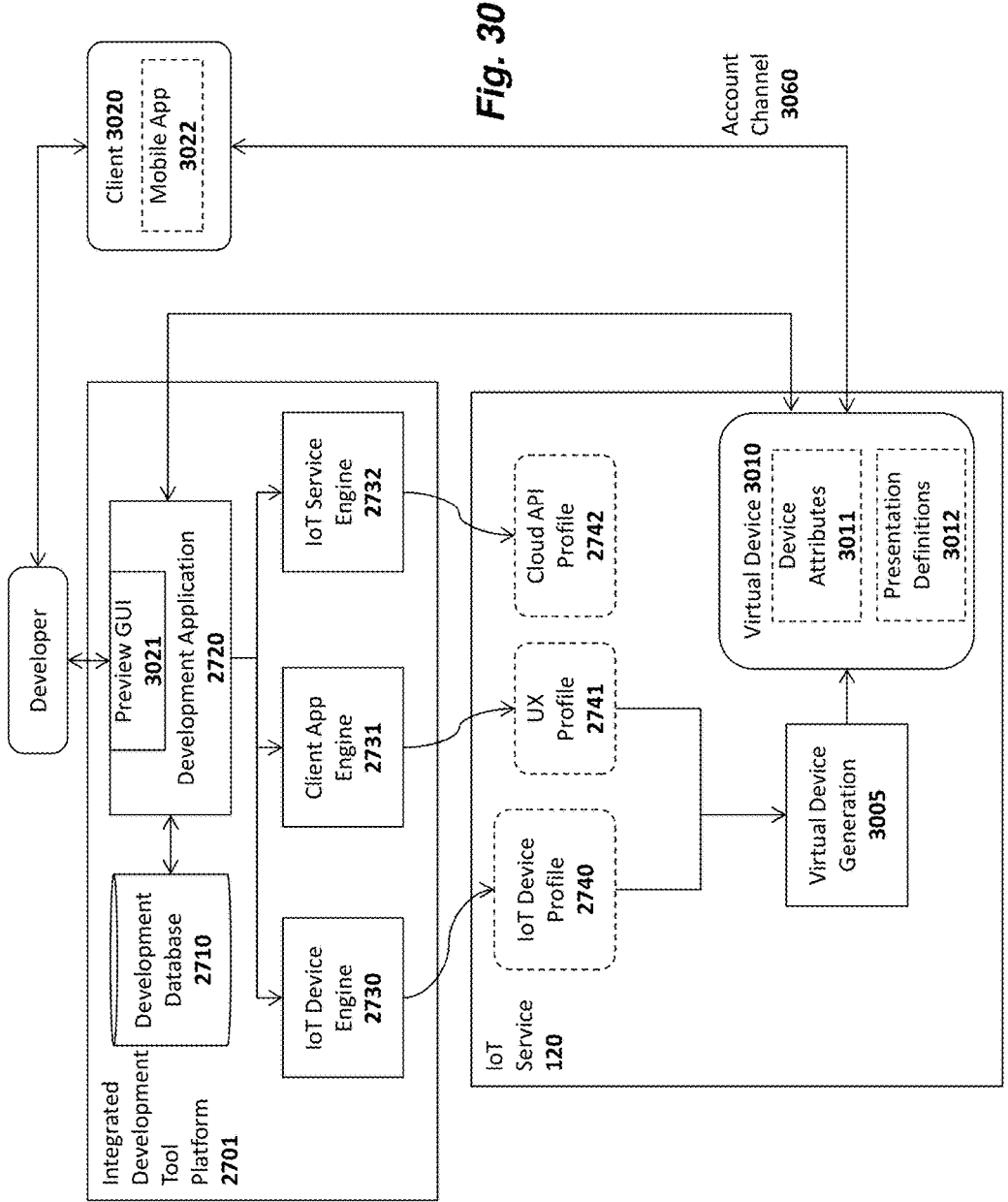
FIG. 30 illustrates an one embodiment of the invention for generating a preview on a mobile app.

FIG. 30 illustrates one embodiment in which virtual device generation logic 3005 on the IoT service 120 generates a virtual device 3010 using the IoT device profile 2740 and the user experience profile 2741 specified by the user within the development application 2720. The user may then interact with and test the virtual device 3010 via the development application 2720 and/or a mobile app 3022 executed on a mobile client device 3020. In one embodiment, the virtual device 3010 includes virtualization program code which interprets the device attributes 3011 of the IoT device profile 2740 and the presentation definitions 3012 from the UX profile 2741 to render a virtual representation of the IoT device 3010. The resulting virtual representation may then be rendered within the client mobile app 3022.

In one embodiment, the user may modify the device attributes 3011 and/or presentation definitions 3012 via a preview graphical user interface (GUI) 3021 of the development application 2720 (some examples of which are provided below). As described in detail below, in one embodiment, after making modifications to the device attributes 3011 and/or presentation definitions 3012, the user manually transfers those changes to the service 120, either by initiating a preview via a preview button 3150 or by publishing them via a publish option 3151 (shown, for example, in FIG. 31G). In another embodiment, any changes made by the user may be automatically transferred to the service in real time or periodically.

Once the client 3020 has been logged in to the IoT service 120 via an account channel 3060 (i.e., a channel established between the client 3020 and IoT service 120 and associated with the user's account), the virtual device 3010 will apply the changes made by the user via the preview GUI 3021 and the attributes and presentation features will be updated within the mobile app 3022.

While some embodiments of the invention are described in the context of a virtual device 3010, the same principles may be implemented within the context of a real IoT device. For example, in one embodiment, the preview UI button 3150 may be used to update attributes on an IoT device which will then be dynamically reflected in the mobile app 3022. Similarly, as discussed below, the user may modify attributes from the mobile app 3022 (e.g., by selecting graphical elements) and view the modifications within the preview GUI 3021.

Figure 31A:
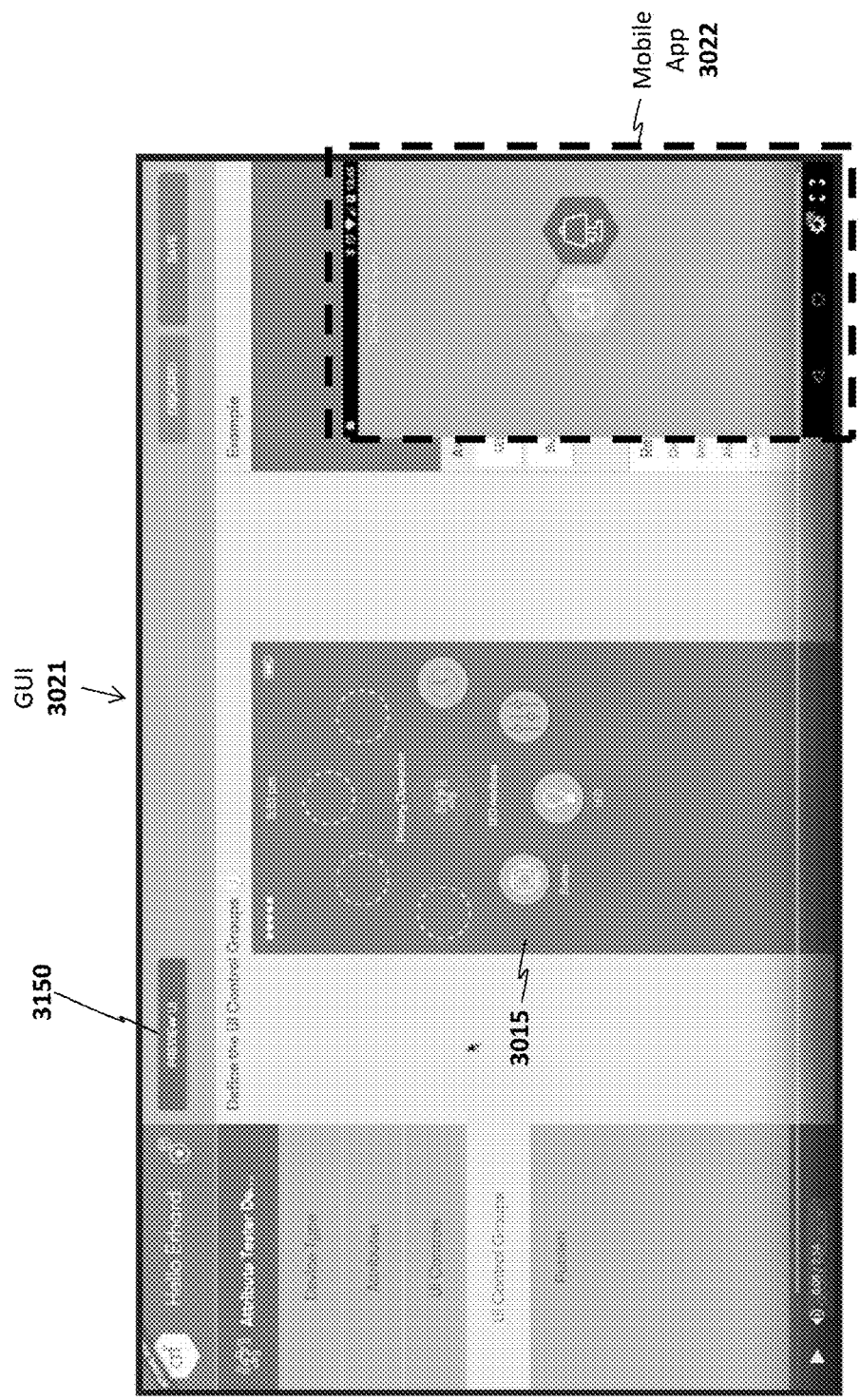
FIGS. 31A-H illustrates exemplary interactions between a preview user interface of an integrated development application and a mobile app.

FIG. 31A illustrates one embodiment of the preview GUI 3021 of the development application 2720 comprising a plurality of graphical elements 3015 which may be selected and updated by the user, and a preview UI button 3150 for generating a preview of the updates on the mobile client 3020. The graphical elements 3015 comprise a group of controls or widgets representing one or more attributes to be managed by the IoT device and synchronized with the IoT service as described above. In one embodiment, when a user makes changes to the attributes and/or graphical features associated with the graphical elements 3015, and then selects the preview UI button 3150, those changes are updated within the virtual device 3010 on the IoT service and transmitted to the mobile client 3020 over the account channel (where they are reflected in the UI of the mobile app 3022).

Figure 31B:
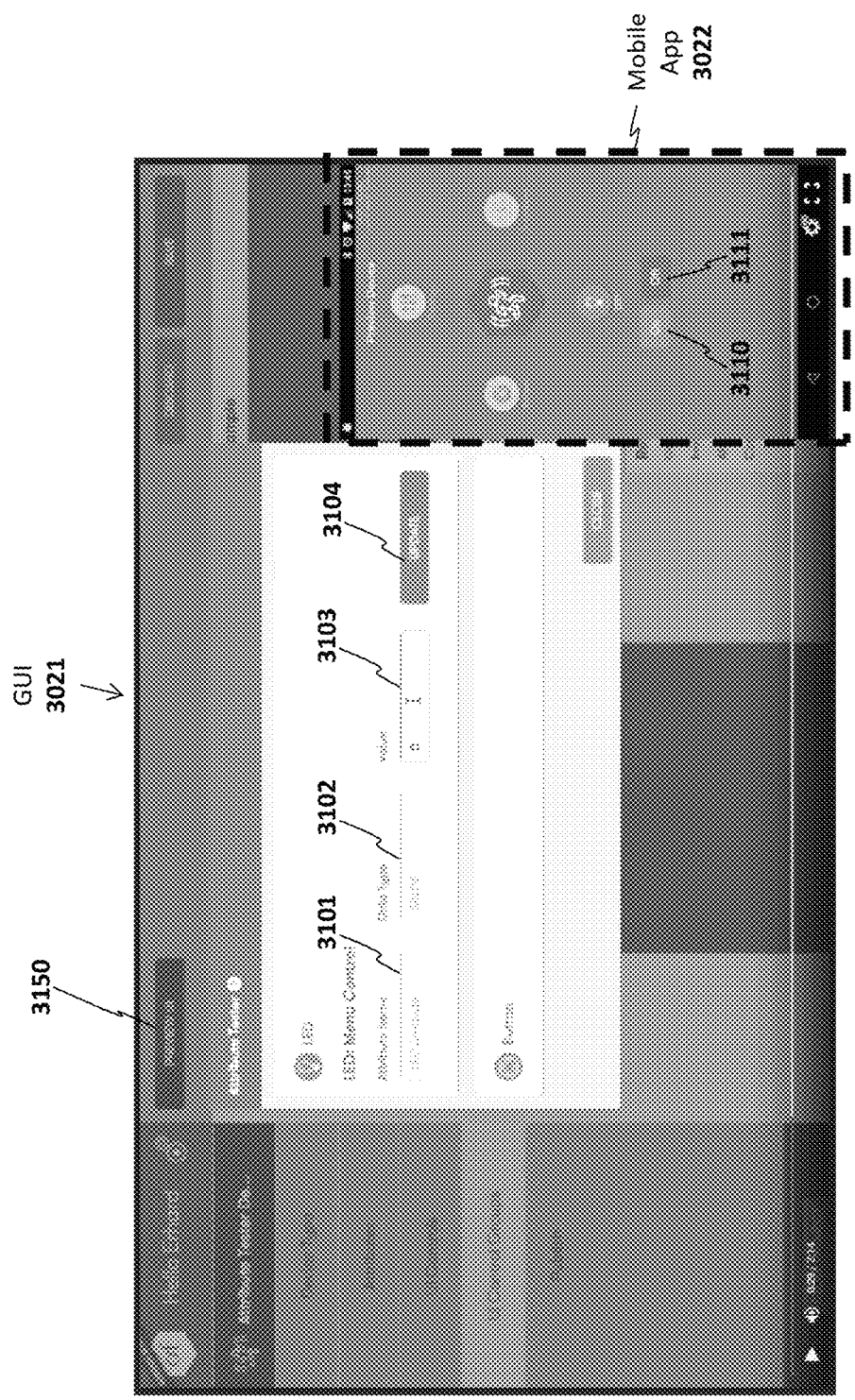
Figure 31C:
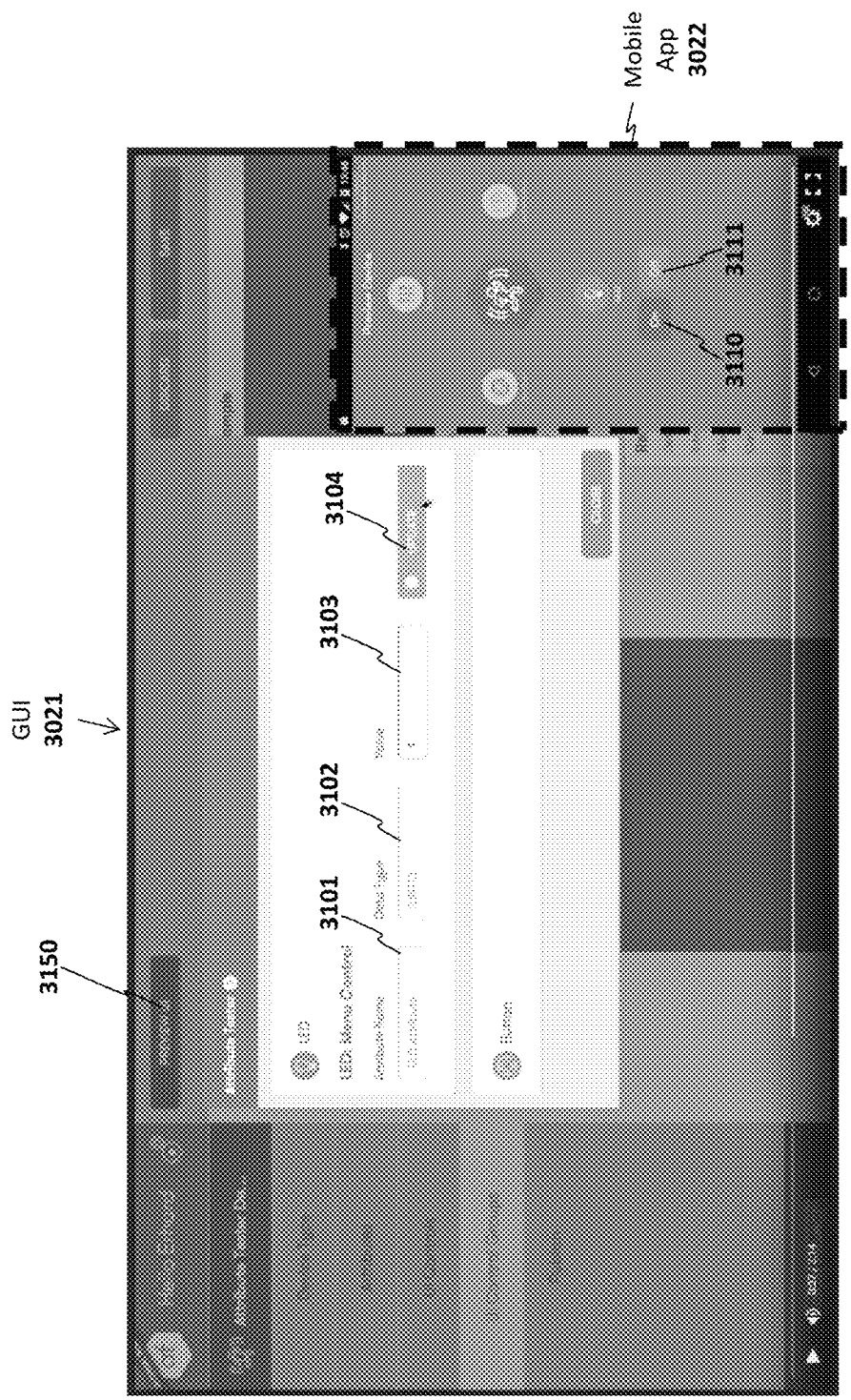

In FIG. 31B, the user has selected a particular graphical element (an "LED" element to turn an LED ON/OFF) revealing an "attribute tester" window which includes a plurality of fields 3101-3104 through which the user can make changes to the attribute. In this particular example, the user may change the attribute name 3101, the data type 3102 used to store data associated with the attribute, and the current attribute value 3103. In one embodiment, the user can only change the value of writable attributes on this screen. Read-only attributes are displayed only to show the user value changes on the device side. Read-only attributes and fields may be grayed out. An update button 3104 is provided to implement the changes. In FIG. 31B, the preview user interface generated on the client 3020 shows graphical elements 3110-3111 associated with this particular attribute—i.e., an ON element 3110 to indicate when the LED is on and an OFF element 3111 to indicate when the LED is off. In FIG. 31B, the attribute value is initially set to 0, resulting in an ON state displayed within the preview GUI (i.e., element 3110 is highlighted). In FIG. 31C, the user has modified the attribute value to a 1 and, after selecting the update button 3104, the OFF graphical element 3111 becomes highlighted within the preview GUI on the client 3020 (and the highlight is removed from the ON graphical element 3110), thereby dynamically reflecting the changes entered by the user. In operation, the attribute value change is first reflected within the device attributes 3011 of the virtual device 3010 and is then propagated out to the client 3020 via the account channel.

Figure 31D:
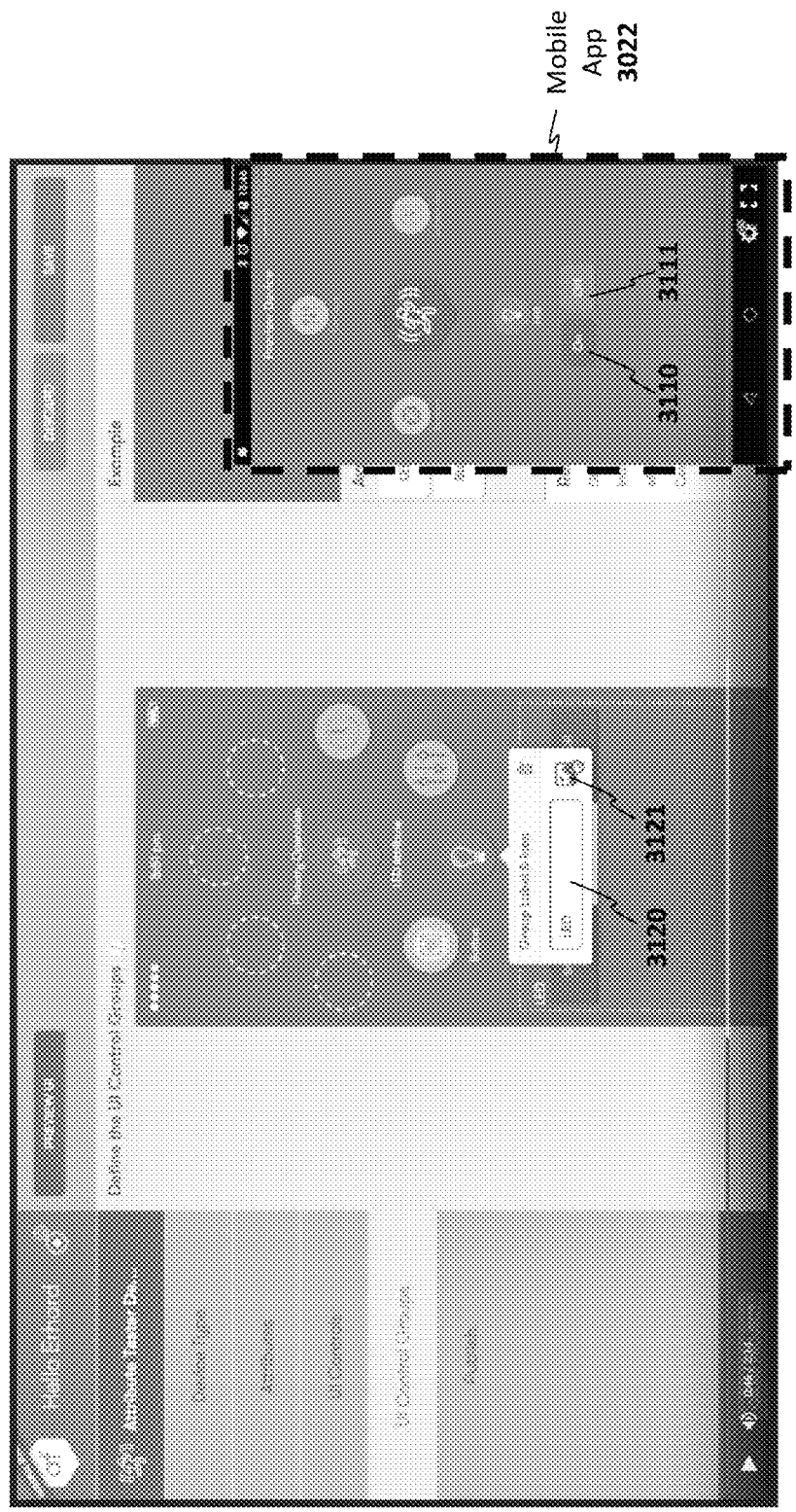
Figure 31E:
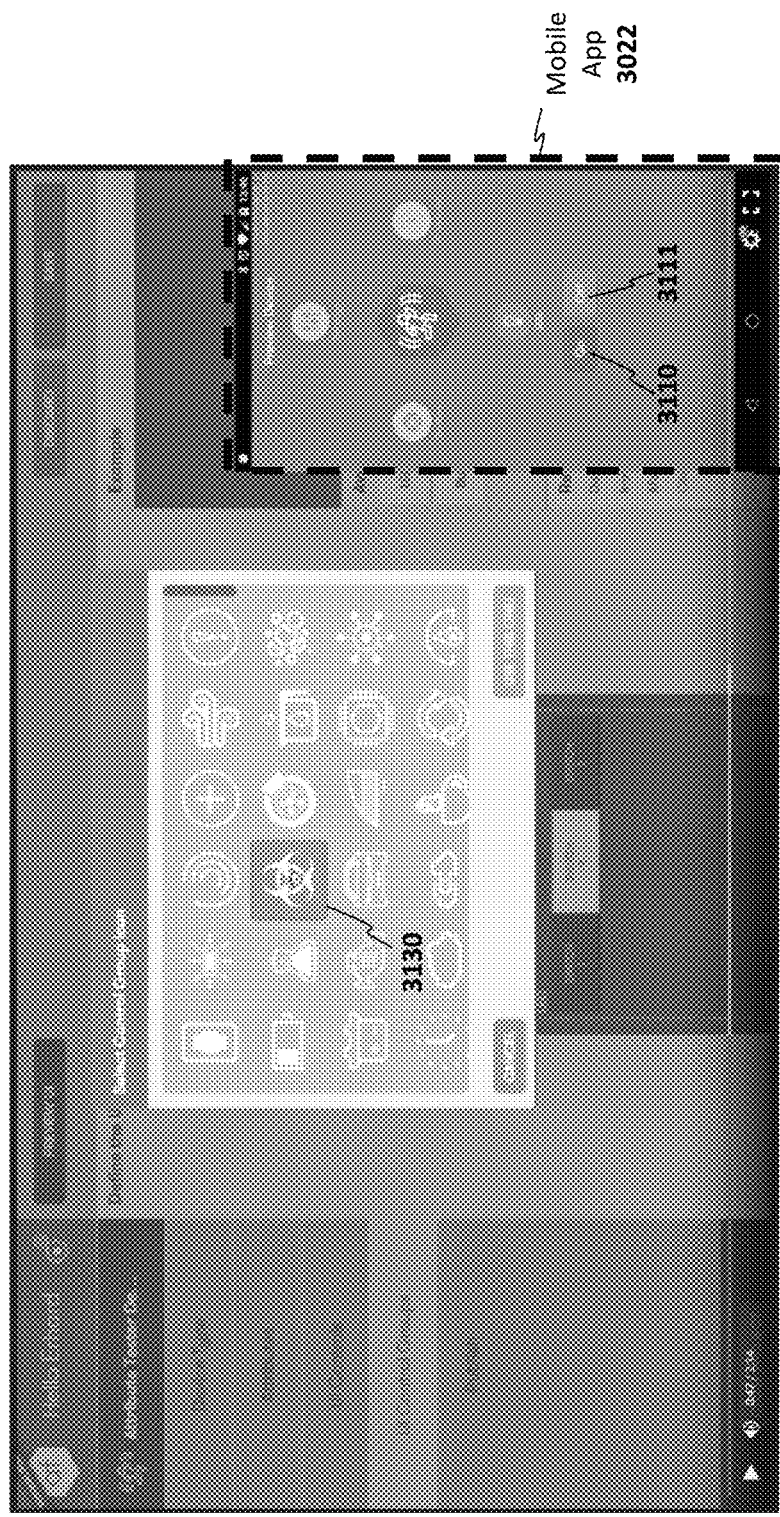
Figure 31F:
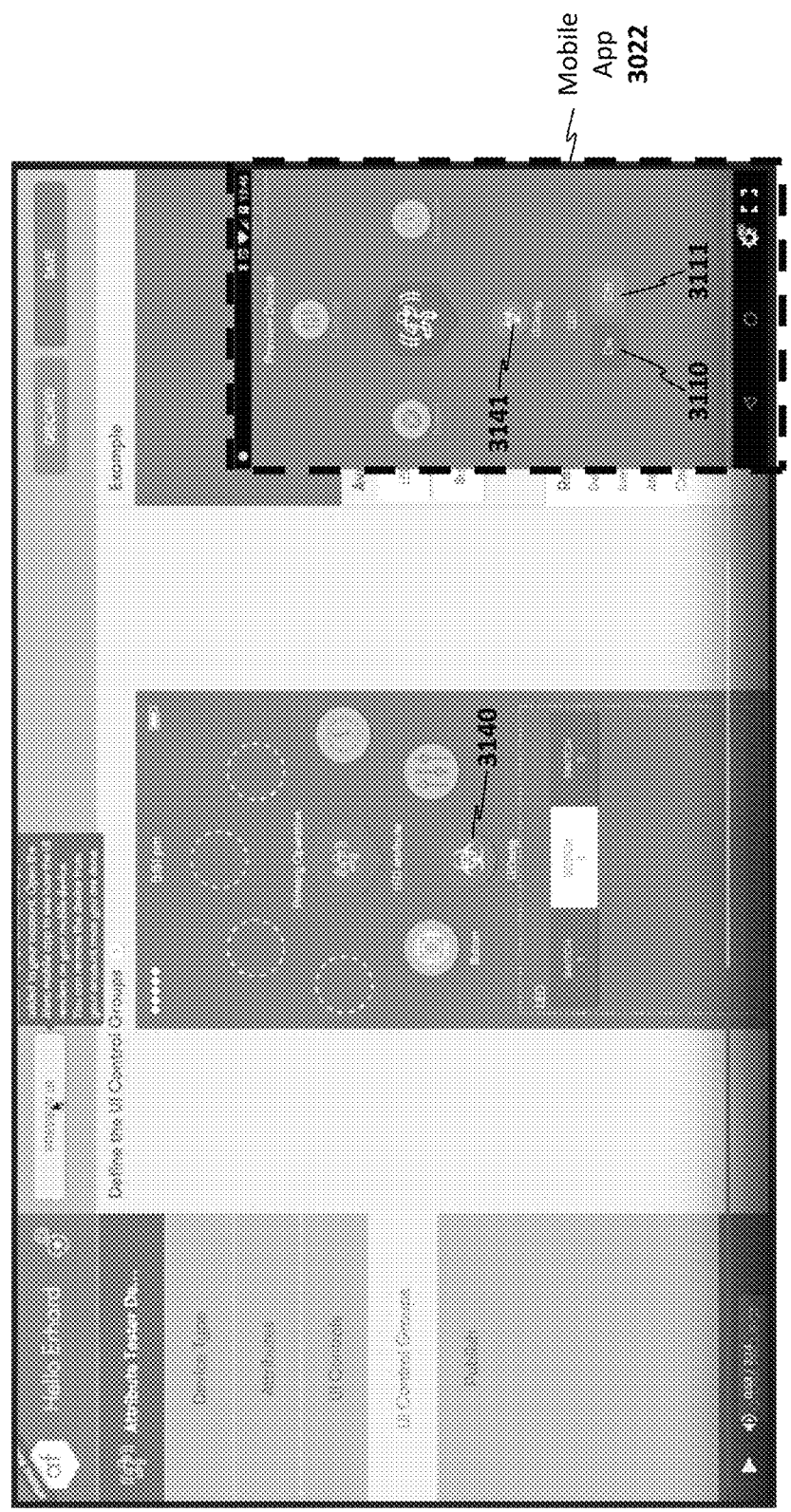

As shown in FIG. 31D the user may select a particular graphic, causing the preview GUI 3021 to open a field 3120 for modifying the name of the graphical element (in this case the LED element). In addition, an icon button 3121 is provided which generates a window containing a plurality of selectable icons 3130 as shown in FIG. 31E. Selecting a particular icon 3130 causes the icon to be displayed within the graphical element, as shown at 3140 of FIG. 31F. In one embodiment, the new icon is updated within the presentation definitions 3012 of the virtual device 3010. Depending on the embodiment, this change may or may not be dynamically propagated over the account channel to the client 3020, resulting in the new icon 3141 being rendered in FIG. 31F.

In one embodiment, the updates transmitted over the account channel connecting the client 3020 to the IoT service 120 are bi-directional. As such, user input provided by the user via the mobile app 3022 may be updated within the virtual device 3010 or real IoT device and reflected within the Attribute Tester dialog shown in FIGS. 31B-C. For example, if the user changes an attribute from within the mobile app 3022, the attribute change will be updated within the device attributes 3011 of the virtual device 3010 or real IoT device and displayed within the Attribute Tester dialog. In this manner, the user can test the operation of the mobile app 3022 and review the results within the Attribute Tester dialog.

Figure 31G:
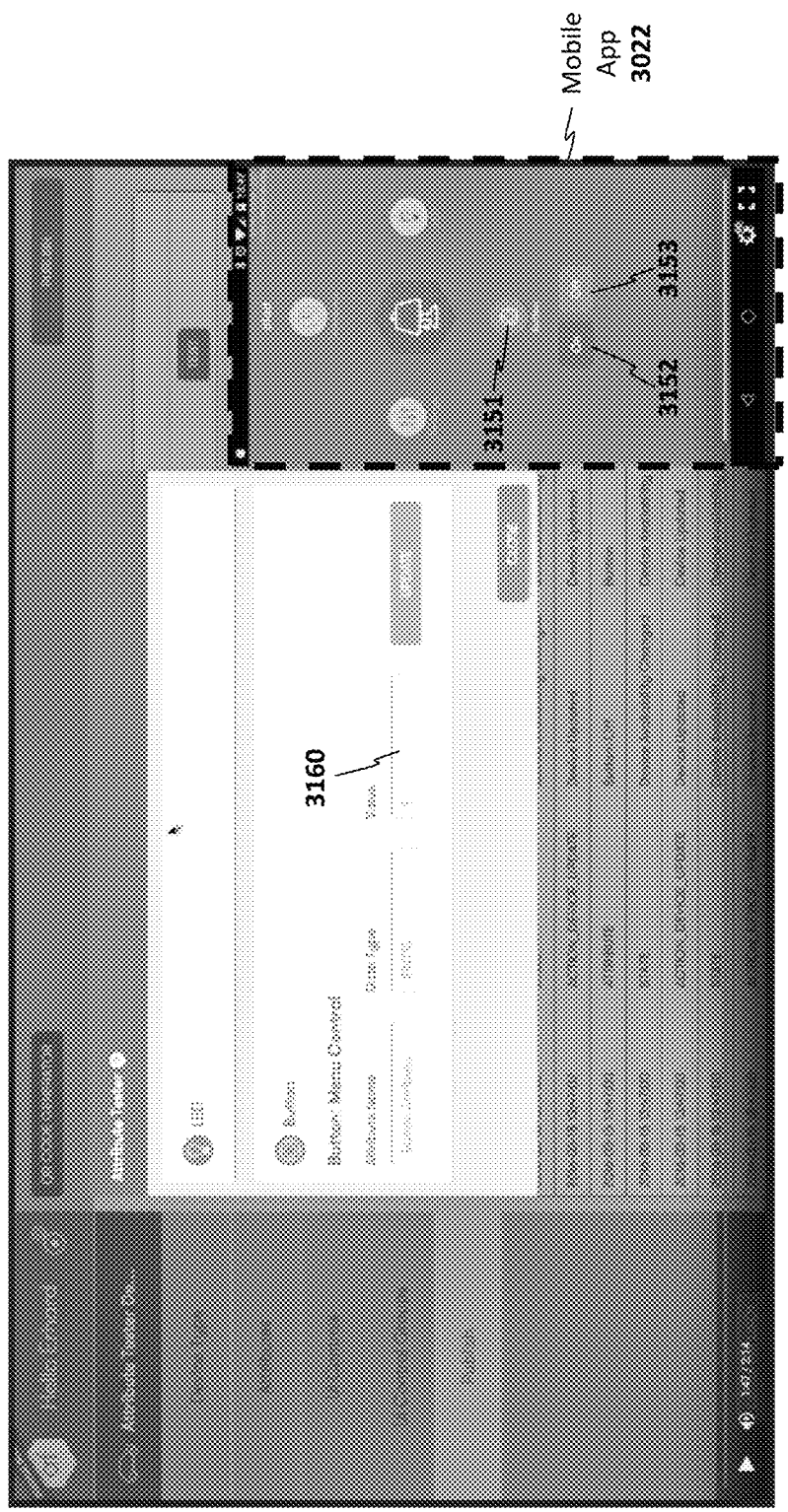
Figure 31H:
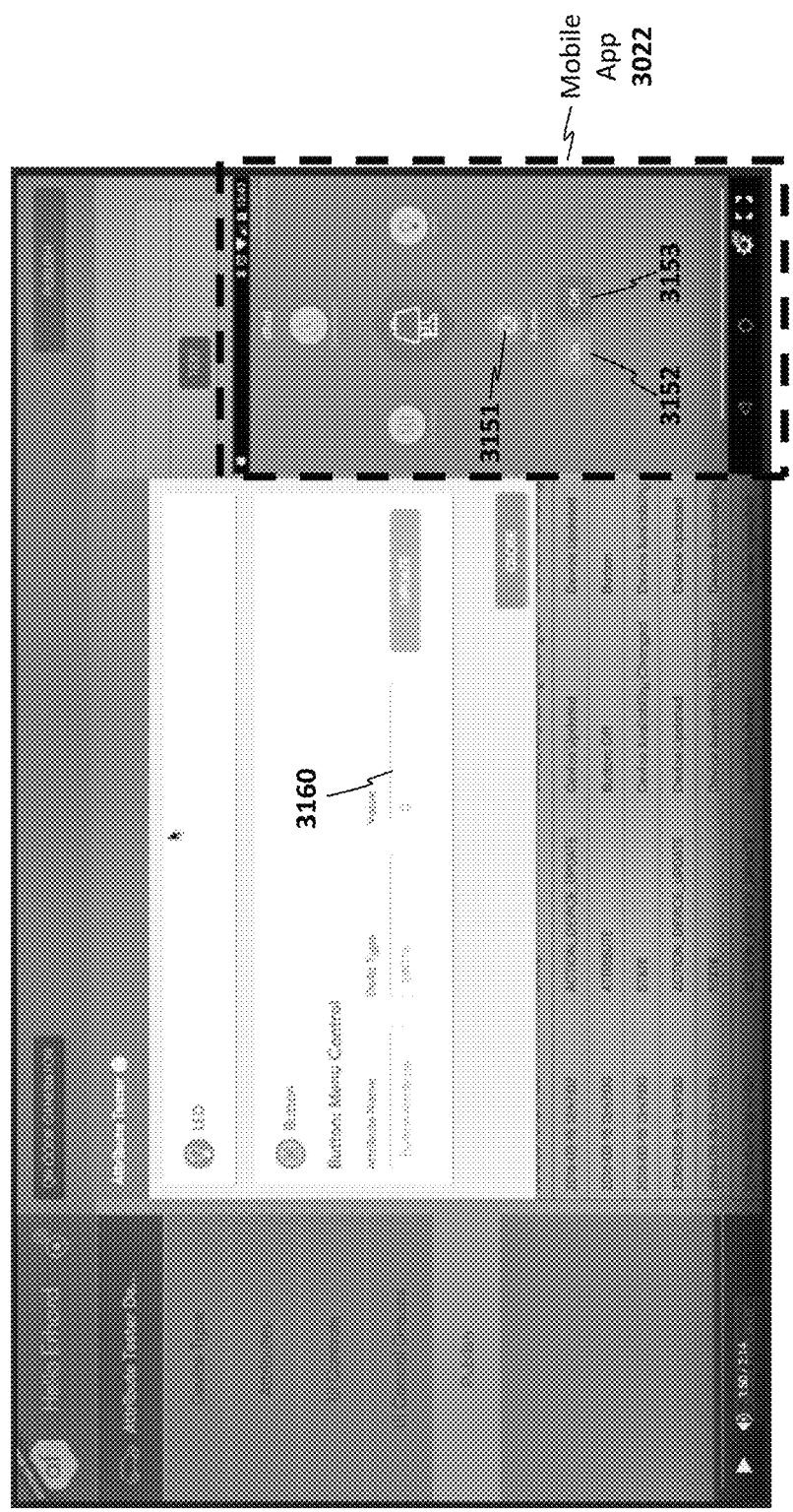

This mode of operation is illustrated in FIGS. 31G-H. In particular, in FIG. 31G, when the user initially selects button 3051, the corresponding OFF button 3153 is highlighted and the corresponding attribute value 3160 is displayed within the preview GUI (a value of 1 in the example). In FIG. 31H, the user has selected an ON button 3152 from within the mobile app 3022, thereby changing the attribute value. The change is propagated through the device attributes 3011 of the virtual device 3010 and displayed within the attribute value field 3160 of the preview GUI 3021 (a value of 0 in the example).

Thus, in response to the user choosing to preview a GUI and associated attributes, the IoT service searches for a corresponding virtual IoT device and, if none is found, configures a virtual IoT device with the given device attributes and presentation and associates it to the user's account. The IoT service then sends a notification on the account channel about this new device. Any listener on the account channel may act on this message, including the mobile app 3022 which will refresh its UI and display a new device on the user's account with the new UI. The user can interact with the preview device, but no real action will be taken. In one embodiment, if the user closes the mobile app and opens it again, the preview device will be reset to its default state. The user can then remove this preview device from their account as they would for any other device.

Figure 32A:
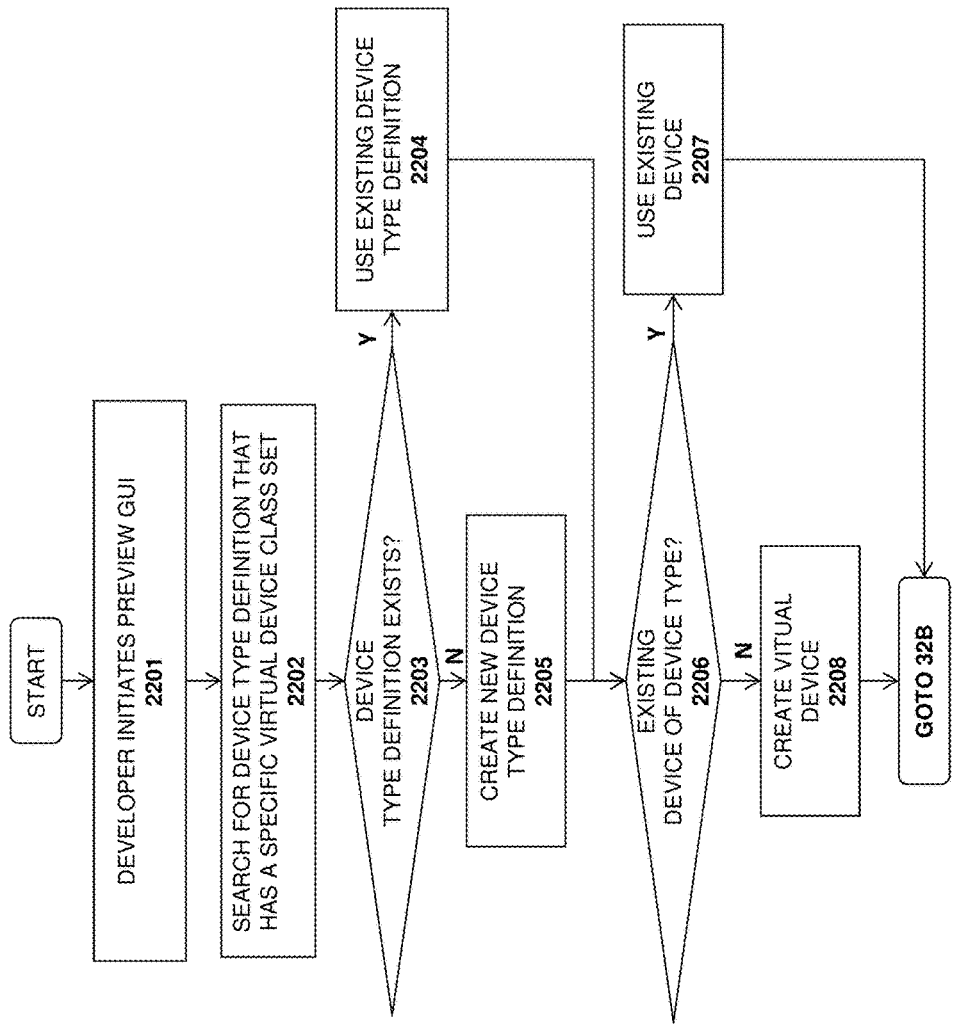
FIGS. 32A-B illustrate a method in accordance with one embodiment of the invention.
Figure 32B:
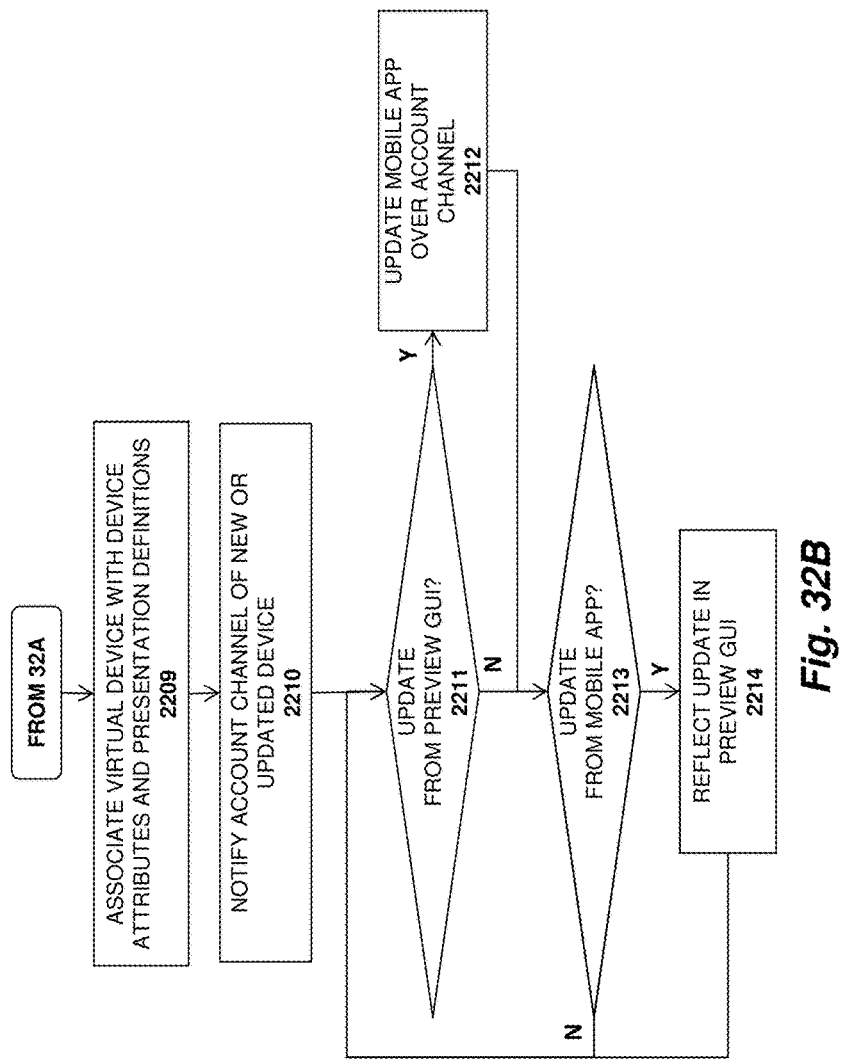

A method in accordance with one embodiment of the invention is illustrated in FIG. 32A. The method may be implemented within the context of the architectures described above but is not limited to any particular architecture.

At 2201, the user chooses to view a preview GUI from within the development application. At 2202, a search is performed for a device type definition that has a specific virtual device class set (i.e., "PreviewVirtualClass"). For example, an internet-accessible database of IoT devices may be provided by the user's partner (i.e., the business entity or individual who designed, manufactured or sold the IoT device). Of course, the underlying principles of the invention are not limited to any particular business arrangement between a user and a partner (and, in fact, the user and partner may be the same entity or individual).

At 2203, if the device type definition does not exist, then a new one is created at 2205. If one does exist, then at 2204, the existing device type definition is used.

At 2206, the user's account is then searched first for an existing device of the aforementioned type. The preview device type of the user's partner may also be searched for a device that is not associated with an account. If found, then at 2207, the existing device is used. If not, then at 2208, a virtual device of the preview device type is created and associated with the user's account.

At 2209, the uploaded device description (e.g., device attributes) and presentation are then associated with the preview device. The account channel is then notified of the new or updated device at 2210. Any listener on the account channel such as the mobile app 3022 will receive and process the notification.

Once the connection has been made, bi-directional interaction between the preview GUI 3021 and the mobile app 3022 may be performed using raw attribute values as discussed above. For example, if an update to an attribute is provided from the preview GUI at 2211, then the mobile app is updated over the account channel at 2212. For example, if the user modifies the device attribute, the effect of that modification will be presented to the user within the mobile app (e.g., highlighting a different button within the GUI).

At 2213 a determination is made as to whether an update has been made on the mobile app. For example, the user may navigate and generate updates through the user interface of the mobile app (see, e.g., FIG. 31G-H and associated text). If so, then at 2214 the update is reflected in the preview GUI.

The embodiments of the invention described herein allow users such as developers to interact with any device on their account using the development application 2720. In one embodiment, the development application 2720 does not communicate through the account channel as other apps do. As discussed above, the development application 2720 may render a hierarchical UI of all control groups, their controls and the attributes which allows users to then enter the raw attribute value for a particular attribute and send it to the device. As this value is propagating through the platform all mobile apps will display the changes and the device will act on the value sent. In one embodiment, the development application 2720 monitors the attribute history and updates the attribute values on the preview GUI 3021 to changes initiated, for example, by a mobile app or on the device itself.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hard-wired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. A system comprising:
   one or more processors;
   a non-transitory storage stored instructions operated by the one or more processors;
   an Internet of Things (IoT) development application comprising a graphical user interface (GUI) through a user to specify a configuration for a new IoT device, the IoT development application includes a preview GUI to display attributes of the new IoT device, wherein the preview GUI comprises one or more graphical elements including a plurality of user-modifiable fields associated with the attributes of the new IoT device to allow the user to modify the attributes of the new IoT device;
   an IoT service determines whether a virtual IoT device exists which corresponding to the specified configuration, and generates the virtual IoT device corresponding to the specified configuration responsive to determine that the virtual IoT device does not exist, wherein the IoT virtual device comprising a virtualized representation of the new IoT device; and
   the IoT virtual device establishes a communication channel with a mobile app executed on a client device, the IoT virtual device dynamically transmits updates to the mobile app upon detecting updates to the attributes and/or presentation definitions of the new IoT device as the user modify the attributes of the new IoT device from the preview GUI.

2. The system as in claim 1 wherein the mobile app is to open a first communication channel with the IoT service, the IoT service to associate the first communication channel with a user's account.

3. The system as in claim 2 wherein the development application is to open a second communication channel with the IoT service, the second communication channel independent of the first communication channel.

4. The system as in claim 2 wherein the preview GUI comprises one or more fields displaying current attribute values and allowing the user to modify the current attribute values, wherein upon detecting a modification to an attribute to a new attribute value, the new attribute value is to be updated within the IoT virtual device, and propagated out to the mobile app over the first communication channel.

5. The system as in claim 4 wherein the first communication channel is to provide updates bi-directionally, wherein in addition to providing updates from the IoT virtual device to the mobile app, updates are provided from the mobile app to the IoT virtual device responsive to user interactions with the mobile app.

6. The system as in claim 5 wherein at least one interaction comprises the user modifying an attribute value.

7. The system as in claim 1 wherein the preview GUI includes one or more graphical elements associated with one or more IoT device attributes, wherein selecting a graphical element generates a window to test the IoT device attributes, the window including a plurality of user-modifiable fields associated with the attributes.

8. The system as in claim 7 wherein the fields include an attribute name field to specify an attribute name, a data type field to specify a data type for the attribute, and a value field to specify a current attribute value.

9. The system as in claim 7 wherein the preview GUI further comprises one or more menus or windows to provide a set of selectable icons to be used to represent the attribute.

10. The system as in claim 1 further comprising:
    a development database comprising configuration data related to different IoT device configurations, the IoT development application to utilize the data in the development database based on the configuration specified by the developer for the new IoT device;
    an IoT device engine to generate an IoT device profile responsive to the development application specifying input/output functions to be performed by the new IoT device, the IoT device profile including the IoT device attributes;
    a client app engine to generate a user experience (UX) profile responsive to the development application specifying features of a client app or application related to operation of the new IoT device, the UX profile including the presentation definitions; and
    an IoT service engine to generate a cloud application programming interface (API) profile responsive to the development application specifying features of an IoT service related to operation of the new IoT device.

11. The apparatus as in claim 10 wherein the IoT device profile is stored in a non-volatile storage memory of the new IoT device, the IoT device comprising a controller for executing program code to implement the IoT device profile.

12. The apparatus as in claim 10 wherein the input/output functions comprise at least one analog-to-digital function and/or digital-to-analog function.

13. The apparatus as in claim 10 wherein the input/output functions comprise at least one on/off input or output function.

14. The apparatus as in claim 10 wherein the IoT device profile specifies whether the IoT device is to operate in a stand-alone mode in which the input/output functions are performed by a secure communication module or in a microcontroller unit (MCU) mode in which at least some input/output functions are performed by software executed on the MCU.

15. A method comprising:
  displaying a new Internet of Things (IoT) device in a preview graphical user interface (GUI) within an IoT development application, wherein the preview GUI comprises one or more graphical elements including a plurality of user-modifiable fields associated with attributes of the new IoT device to allow the user to modify the attributes of the new IoT device;
  determining whether a virtual IoT device exists which corresponding to a configuration specified for the new IoT device, and generating the virtual IoT device corresponding to the configuration specified for the new IoT device responsive to determine that the virtual IoT device does not exist, wherein the virtual device comprising a virtualized representation of the new IoT device; and
  establishing a communication channel with a mobile app executed on a client device, the IoT virtual device dynamically transmits updates to the mobile app upon detecting updates to the attributes and/or presentation definitions of the new IoT device as the user modify the attributes of the new IoT device from the preview GUI.

16. The method as in claim 15 wherein the mobile app is to open a first communication channel with an IoT service on which the virtual IoT device is executed, the IoT service to associate the first communication channel with a user's account.

17. The method as in claim 16 wherein the configuration is specified for the new IoT device from a development application, the development application to open a second communication channel with the IoT service, the second communication channel independent of the first communication channel.

18. The method as in claim 16 wherein the preview GUI comprises one or more fields displaying current attribute values of the new IoT device and allowing the user to modify the current attribute values of the new IoT device, wherein upon detecting a modification to an attribute to a new attribute value, the new attribute value is to be updated within the IoT virtual device, and propagated out to the mobile app over the first communication channel.

* * * * *